(12) United States Patent
Evans et al.

(10) Patent No.: US 9,769,094 B2
(45) Date of Patent: Sep. 19, 2017

(54) NOTIFICATION DELIVERY SYSTEM

(75) Inventors: Scott A. Evans, Lenexa, KS (US);
Brett A. Lester, Overland Park, KS (US); Dan W. Schwartz, Belton, MO (US); Todd Smith, Lenexa, KS (US); Dirk A. Stubbs, Kansas City, KS (US)

(73) Assignee: CELERITASWORKS, LLC, Overland Park, KS (US)

( * ) Notice: Subject to any disclaimer, the term of this patent is extended or adjusted under 35 U.S.C. 154(b) by 110 days.

(21) Appl. No.: 13/463,765

(22) Filed: May 3, 2012
(Under 37 CFR 1.47)

(65) Prior Publication Data
US 2013/0191471 A1 Jul. 25, 2013

Related U.S. Application Data

(60) Provisional application No. 61/482,551, filed on May 4, 2011.

(51) Int. Cl.
*G06F 15/16* (2006.01)
*H04L 12/58* (2006.01)

(52) U.S. Cl.
CPC .............. *H04L 51/02* (2013.01); *H04L 51/14* (2013.01); *H04L 51/20* (2013.01)

(58) Field of Classification Search
CPC ............. G06F 17/30241; G06F 3/0481; G06F 17/3087; G06F 17/60; G06F 3/048; G06F 3/0482; G06F 9/4446; G06Q 50/06; G06Q 10/06311; G06Q 50/08; G06Q 10/063114
USPC ................... 709/206, 217, 218; 707/3, 6, 10
See application file for complete search history.

(56) References Cited

U.S. PATENT DOCUMENTS

| | | | |
|---|---|---|---|
| 5,032,989 A | 7/1991 | Tornetta | |
| 6,343,290 B1* | 1/2002 | Cossins | ............... H04L 41/0253 |
| 6,501,501 B1 | 12/2002 | Miyazawa | |
| 6,751,554 B1* | 6/2004 | Asher | ............... G06F 17/30973 |
| | | | 702/5 |
| 7,773,095 B1* | 8/2010 | Badrak et al. | ................ 345/619 |
| 2002/0078035 A1 | 6/2002 | Frank et al. | |
| 2003/0061211 A1 | 3/2003 | Shultz et al. | |
| 2004/0110515 A1 | 6/2004 | Blumberg et al. | |
| 2004/0243299 A1 | 12/2004 | Scaer et al. | |
| 2006/0085396 A1* | 4/2006 | Evans et al. | ..................... 707/3 |

(Continued)

OTHER PUBLICATIONS

Office Action 1 for U.S. Appl. No. 10/965,989, dated Jul. 16, 2007, 39 pp.

(Continued)

*Primary Examiner* — Benjamin M Thieu
(74) *Attorney, Agent, or Firm* — Konrad Raynes Davda & Victor LLP; Janaki K. Davda

(57) ABSTRACT

Provided are a computer implemented method, computer program product, and system for providing notifications. A ticket that specifies at least one activity to be performed, a location at which the activity is to be performed, and a period of time in which that activity is to occur is received. A message to be delivered is identified based on the activity, the location, and the period of time, wherein the message describes one or more measures to be taken based on the activity. The identified message describing the one or more measures is delivered to enable at least one of the measures to be taken before the activity occurs in the period of time specified in the ticket.

18 Claims, 60 Drawing Sheets

(56) References Cited

U.S. PATENT DOCUMENTS

| | | | | |
|---|---|---|---|---|
| 2006/0122794 | A1* | 6/2006 | Sprague | G06Q 10/06 702/32 |
| 2008/0021863 | A1 | 1/2008 | Evans et al. | |
| 2008/0154675 | A1* | 6/2008 | Lester | G06Q 30/0205 705/7.34 |
| 2008/0270198 | A1* | 10/2008 | Graves et al. | 705/7 |
| 2009/0018844 | A1 | 1/2009 | Baker | |
| 2009/0157418 | A1* | 6/2009 | Coleman et al. | 705/1 |
| 2009/0202112 | A1* | 8/2009 | Nielsen et al. | 382/113 |
| 2009/0204614 | A1* | 8/2009 | Nielsen et al. | 707/6 |
| 2009/0310764 | A1* | 12/2009 | Gerhart | 379/142.04 |
| 2009/0327024 | A1* | 12/2009 | Nielsen | G06Q 30/02 705/7.42 |
| 2010/0228588 | A1* | 9/2010 | Nielsen | G06Q 10/06 705/7.11 |
| 2011/0022433 | A1* | 1/2011 | Nielsen | G06Q 10/06 705/7.27 |
| 2011/0213631 | A1* | 9/2011 | Mislavsky | 705/7.11 |
| 2012/0046985 | A1* | 2/2012 | Richter et al. | 705/7.14 |
| 2015/0379041 | A1 | 12/2015 | Evans et al. | |

OTHER PUBLICATIONS

Response to Office Action 1 for U.S. Appl. No. 10/965,989, dated Jan. 16, 2008, 28 pp.
Final Office Action 1 for U.S. Appl. No. 10/965,989, dated Apr. 16, 2008, 45 pp.
Response to Final Office Action 1 for U.S. Appl. No. 10/965,989, dated Jun. 16, 2008, 39 pp.
Advisory Action 1 for U.S. Appl. No. 10/965,989, dated Jul. 1, 2008, 4 pp.
Second Response to Final Office Action 1 for U.S. Appl. No. 10/965,989, dated Oct. 16, 2008, 45 pp.
Office Action 3 for U.S. Appl. No. 10/965,989, dated Dec. 23, 2008, 36 pp.
Response to Office Action 3 for U.S. Appl. No. 10/965,989, dated May 26, 2009, 41 pp.
Final Office Action 2 for U.S. Appl. No. 10/965,989, dated Aug. 17, 2009, 44 pp.
Response to Final Office Action 2 for U.S. Appl. No. 10/965,989, dated Nov. 13, 2009, 44 pp.
Office Action 5 for U.S. Appl. No. 10/965,989, dated Feb. 1, 2010, 38 pp.
Response to Office Action 5 for U.S. Appl. No. 10/965,989, dated Aug. 2, 2010, 43 pp.
Final Office Action 3 for U.S. Appl. No. 10/965,989, dated Oct. 19, 2010, 55 pp.
Response to Final Office Action 3 for U.S. Appl. No. 10/965,989, dated Apr. 19, 2011, 28 pp.
Office Action 7 for U.S. Appl. No. 10/965,989, dated Jun. 2, 2011, 35 pp.
Response to Office Action 7 for U.S. Appl. No. 10/965,989, dated Dec. 16, 2011, 37 pp.
Final Office Action 4 for U.S. Appl. No. 10/965,989, dated Mar. 8, 2012, 44 pp.
Response to Final Office Action 4 for U.S. Appl. No. 10/965,989, dated Sep. 7, 2012, 34 pp.
Office Action 9 for U.S. Appl. No. 10/965,989, dated Jun. 20, 2013, 33 pp.
Response to Office Action 9 for U.S. Appl. No. 10/965,989, dated Dec. 20, 2013, 34 pp.
Notice of Allowance 1 for U.S. Appl. No. 10/965,989, dated Jun. 4, 2014, 42 pp.
Notice of Allowance 2 for U.S. Appl. No. 10/965,989, dated Sep. 22, 2014, 18 pp.
H.L. Smith Letter of Jul. 16, 2012 with attached documents, Total 495 pp. Uploaded as Part A (pp. 1-170), Part B (pp. 171-344), and Part C (pp. 345-495).
H.L. Smith Letter of Aug. 26, 2014, (signed version and unsigned version) Total 4 pp.
B.S. Campbell Affidavit of Aug. 29, 2014, without Exhibit, Total 5 pp.
K. Campbell Cover Letter with B.S. Campbell Affidavit of Aug. 29, 2014, with Exhibit, Total 43 pp.
Kiger Affidavit of Jul. 7, 2014, with Exhibits A, B, C, D, and E, Total 183 pp.
Notice of Allowance for U.S. Appl. No. 10/965,989, dated May 29, 2015, 21 pp.
Office Action 1 for U.S. Appl. No. 11/830,571, dated Jan. 18, 2008, 10 pp.
Response to Office Action 1 for U.S. Appl. No. 11/830,571, dated Jul. 18, 2008, 25 pp.
Final Office Action 1 for U.S. Appl. No. 11/830,571, dated Oct. 16, 2008, 36 pp.
Response to Final Office Action 1 for U.S. Appl. No. 11/830,571, dated Dec. 16, 2008, 33 pp.
Advisory Action for U.S. Appl. No. 11/830,571, dated Dec. 24, 2008, 3 pp.
Second Response to Final Office Action 1 for U.S. Appl. No. 11/830,571, dated Apr. 16, 2009, 35 pp.
Office Action 3 for U.S. Appl. No. 11/830,571, dated Jun. 24, 2009, 38 pp.
Response to Office Action 3 for U.S. Appl. No. 11/830,571, dated Oct. 26, 2009, 37 pp.
Final Office Action 2 for U.S. Appl. No. 11/830,571, dated Feb. 2, 2010, 40 pp.
Response to Final Office Action 2 for U.S. Appl. No. 11/830,571, dated Apr. 2, 2010, 38 pp.
Advisory Action for U.S. Appl. No. 11/830,571, dated Apr. 20, 2010, 5 pp.
Office Action 1, dated Aug. 26, 2016, for U.S. Appl. No. 14/846,658, dated Sep. 4, 2015, 31 pp.
Final Office Action 1, dated May 11, 2017, for U.S. Appl. No. 14/846,658, filed Sep. 4, 2015, 22 pp.

* cited by examiner

One-Call Gateway

LOGOUT evans-excavator

Ticket Search | E-Locate | Manage Account | Help

CREATE AN E-LOCATE REQUEST

Company Information

*Caller
JOE EXCAVATOR

*Company
NELON'S QUALITY CONSTRUCTION.

*Phone          Fax
(817) 401-6968  (940) 433-2338

*Address     *City   *State  *Zip
540 CR 4679  BOYD   TX      76023

Contact Information

*Contact Person
JOE EXCAVATOR

*Contact Phone    Alternate Phone    *Best Time To Call
(817) 401-6968                       08:00 AM  to  05:00 PM

*Email
evans@celeritas.com

FIG. 10

Work Information

*Start Date     *Start Time    *Duration
04/28/2011      04:00 PM       2  Units  Days
OR
☐ Calculate 48 hours notice.

*Nature of Work          *Work Done For
Fence Repair             Homeowner

*Blasting?      *Is area white-lined?   *Digging more than 16"?
○ Yes ● No     ○ Yes ● No              ● Yes ○ No

Location Information

*County
ROBERTS ▼

*City
MIAMI

Address    Prefix    *Street                Type  Suffix
                    505 HARVEY ST Please enter the street information of the closest street intersecting the dig address street. List one street name only. Please put any other information under Marking Instructions.

*Cross Street
[                    ]   [ CLOSE MAP ]

MAP

Mapsco                    TESS Grid #

All coordinates will be converted automatically into decimal degrees.

Latitude                  Longitude
35.68549323634733         -100.63635537665171
N 00 00 00.0 or -000.0123456789    N 00 00 00.0 or -000.0123456789

Marking Instructions

Mark the entire back yard 25 characters of 4000

Positive Response?

Positive response is the method you would like to be used by the utility companies to notify you if you are in conflict with their facilities or all clear.

☐ By Phone                    ☐ By Fax                     ☑ By Email
                                                            evans@yahoo.com
Enter only if different from above   Enter only if different from above   Enter only if different from above ☑ Site Markings
☐ Written Address            City            State              Zip
                                   Select State ▼

IMPORTANT

DO NOT submit emergencies! Call them into TEXAS811 at 1-800-344-8377.
Our members require a 2 WORKING DAY NOTICE to mark their facilities.
IT's THE LAW!

Water, sewer, and slurry facilities may not be notified.
Fax Number: 1-800-690-1291

[ CLICK HERE TO ACCEPT DISCLAIMER AND SUBMIT E-LOCATE ]   [ CANCEL ]

* LOCATE TICKET POSITIVE RESPONSE TO R AND R PIPELINE CONSTRUCTION AND REPAIR, INC. *

CenterPoint Energy has completed the following locate request:

Ticket Number: 11011414351378

Resolution: Marked

Date: 1/18/2011

Time: 08:10

Remarks: CenterPoint Energy's line is flagged through this section, was on site 01-18-11.   Joe Smith If you have any questions, or have received this message in error, please contact CenterPoint Energy at (999) 123-4567.

PR Notification #: 1446550

Stay Safe, Respect the Markers
For your safety, markers show the approximate location of pipelines and identify the companies that operate them. Markers may be anywhere along the right-of-way or directly over the pipeline. The pipeline may not follow a straight course between the markers. While markers are helpful in locating the pipelines, markers are limited in the information they provide. For example, markers provide no information on the depth or number of pipelines in the right-of-way. Markers may be commonly found where a pipeline intersects a street, highway or railway. These markers indicate the material transported in the pipeline, the name of the pipeline operator and the telephone number where the pipeline operator can be reached in the event of an emergency.

PIPELINE SAFETY
*In your community*

Respect the Markers

For your safety, markers show the approximate location of pipelines and identify the companies that operate them. Markers may be anywhere along the right-of-way or directly over the pipeline. The pipeline may not follow a straight course between the markers. While markers are helpful in locating the pipelines, markers are limited in the information they provide. For example, markers provide no information on the depth or number or pipelines in the right-of-way. Markers may be commonly found where a pipeline intersects a street, highway or railway. These markers indicate the material transported in the pipeline, the name of the pipeline operator and the telephone number where the pipeline operator can be reached in the event of an emergency.

Recognizing a Pipeline Leak
- A pool of liquid on the ground near a pipeline, a dense white cloud or fog over a pipeline, or discolored vegetation surrounding the pipeline, an unusual dry spot in an otherwise moist field, bubbling in marshland, rivers or creeks, or an oily sheen appearing on water surfaces may be signs of a leak.
- An unusual noise coming from the pipeline, such as a hissing or roaring sound, may be a sign of a leak.
- An unusual smell or gaseous odor will sometimes accompany a pipeline leak.
- Frozen ground at the pipeline in warm weather.
- Dirt blowing up from the ground. Many pipeline companies regularly inspect their rights-of-way using air, foot, and vehicle patrols. These trained inspectors look for potential danger to pipelines, such as construction activity, and signs of gas or liquid leaks. These systematic patrols along their pipeline route are to ensure the security and integrity of their lines.

| Table | Purpose |
|---|---|
| ADDRESS | For the stakeholders imported by the NDS 110, this represents the stakeholders mailing address. It is possible for more than one stakeholder to be associated with the same address. This might occur when two or more different contacts work for the same company and share the same company address. |
| ADDRESS_TYPE | Stakeholder addresses imported by the NDS 110 may be given an address type of 'MAILING'. |
| AUDIENCE_TYPE | Stakeholders imported by the NDS 110 may be given an audience type of 'stakeholders'. |
| COMPANY | The stakeholder's company information.<br><br>This table may be populated from the following view fields:<br>ONE_CALLTICKET_VW.STAKEHOLDER_COMPANY_NAME |
| COMPANY_PHONE | The stakeholder's company voice and facsimile phone information.<br><br>This table may be populated from the following view fields:<br>ONE_CALLTICKET_VW.STAKEHOLDER_COMPANY_PHONE<br>ONE_CALLTICKET_VW.STAKEHOLDER_COMPANY_facsimile<br><br>Company phone records may be created if available from the view. |
| EMAIL_ADDRESS | An emails address of the stakeholder.<br><br>This table may be populated from the following view fields:<br>ONE_CALLTICKET_VW.STAKEHOLDER_EMAIL_ADDRESS |
| EMAIL_ADDRESS_TYPE | The type of email address. The NDS 110 will import email addresses of type 'WORK - PRIMARY'. |
| EXCAVATION | Represents excavation information.<br><br>This table may be populated from the following view fields:<br>ONE_CALLTICKET_VW.EXCAVATION_WORK_DATE<br>ONE_CALLTICKET_VW.EXCAVATION_ADDRESS<br>ONE_CALLTICKET_VW.EXCAVATION_CITY<br>ONE_CALLTICKET_VW.EXCAVATION_STATE<br>ONE_CALLTICKET_VW.EXCAVATION_ZIPCODE<br>ONE_CALLTICKET_VW.EXCAVATION_COUNTY<br>ONE_CALLTICKET_VW.EXCAVATION_LATITUDE<br>ONE_CALLTICKET_VW.EXCAVATION_LONGITUDE |
| ONE_CALL_TICKET_VW | This is a View which pulls data from the ONE_CALL_TICKET table. See the description of this view below. |

FIG. 24A

| Table | Purpose |
|---|---|
| PHONE | A voice or facsimile phone number associated with an imported stakeholder. |
| PHONE_TYPE | The type of phone number represented. NDS 110 will import phone numbers either as type 'VOICE - PRIMARY' or type 'facsimile - PRIMARY'. |
| STAKEHOLDER | This represents a stakeholder contact.<br>This table may be populated from the following view fields:<br>ONE_CALLTICKET_VW.STAKEHOLDER_NAME |
| STAKEHOLDER_ADDRESS | This represents the address of a stakeholder.<br><br>This table may be populated from the following view fields:<br>ONE_CALLTICKET_VW.STAKEHOLDER_ADDRESS<br>ONE_CALLTICKET_VW.STAKEHOLDER_CITY<br>ONE_CALLTICKET_VW.STAKEHOLDER_STATE<br>ONE_CALLTICKET_VW.STAKEHOLDER_ZIPCODE |
| STAKEHOLDER_AUDIENCE_TYPE | The audience types associated with the stakeholder. The NDS 110 may use an audience type of 'stakeholders', and it is possible for a stakeholder to have more than one audience type. |
| STAKEHOLDER_EMAIL_ADDRESS | The stakeholder's email address.<br><br>This table may be populated from the<br>ONE_CALLTICKET_VW.STAKEHOLDER_EMAIL_ADDRESS<br>field. |
| STAKEHOLDER_EXCAVATION | This represents excavations reported by stakeholder stakeholders.<br><br>This table may be populated from the following view fields:<br>ONE_CALLTICKET_VW.ONE_CALL_TICKET_ID. See also the note on the EXCAVTION table. |
| STAKEHOLDER_PHONE | The stakeholder's phone and/or facsimile number.<br><br>This table may be populated from the following view fields:<br>ONE_CALLTICKET_VW.STAKEHOLDER_PHONE<br>ONE_CALLTICKET_VW.STAKEHOLDER_facsimile |
| TICKET_COLLECTION_CONTROL | This table may be used to control the import process by specifying the identifier of the last ticket imported. Future imports will import all tickets with ticket IDs greater than the current value of the ONE_CALL_TICKET_ID column. |

| Table | Purpose |
|---|---|
| COMMUNICATION_MESSAGE | Represents a communication message of a given message content type. Each message may be stored in the document repository as an individual document. Messages may be HTML, but may also be PDF, plian text, video etc.. A communication message may convey more than one message content type. |
| COMMUNICATION_MSG_CONTENT_TYPE | Represents the content types associated with a given communication message. |
| COMMUNICATION_SCHEDULE | Represents a collection of messages to be delivered on a given frequency and for a specific customer. |
| COMMUNICATION_SCHEDULE_MSG | Represents the association between the collection of available messages and the communication schedule. |
| DOCUMENT_REPOSITORY | Represents a collection of documents available for use by the system. Individual communication messages may be stored in the Document Repository and tracked through this table. |
| DATE_FREQUENCY | Represents the duration of a schedule. A frequency of zero signifies that the schedule has no cycle restrictions. A zero frequency may be used for just-in-time messages, since they are delivered as part of the ticket's Positive Response and, as a result, will occur as frequently as necessary. |
| GEOGRAPHY | Relative to communication scheduling, this table represents the geography (typically asset county) to be used to geographically limit the selection of schedules for a given stakeholder. For example, if the excavation event's excavation county is BASTROP, but the communication schedule has a geography that does not include BASTROP, then the given schedule will not be selected when message delivery scheduling is being performed. A communication schedule that does not include a GEOGRAPHY is not geographically limited. |

| Table | Purpose |
|---|---|
| GEOGRAPHY_ENTITY | Relative to communication scheduling, this will represent one of the asset counties of the schedule's geographic limitations. |
| LOGO | Represents a logo image (which is stored in the DOCUMENT_REPOSITORY). |
| LOGO_TYPE | The type of logo represented by the LOGO document. |
| MESSAGE_CONTENT_TYPE | A content type classification for a message. For example, a message content type of 'Call Before You Dig' would be used to classify a message as containing information related to the requirement to and benefits of calling the One Call to report an excavation prior to digging. |
| ORG_MSG_CONTENT_TYPE | Represents the message content types applicable to a given organization. |
| ORGANIZATION | Relative to the communications scheduling, this table represents organizations who are sponsoring one or more communication schedules. |
| ORGANIZATION_LOGO | Identifies the logo that are associated with a given organization. |
| SCHEDULE_CLASSIFICATION | Represents a schedule classification type. (e.g., gateway, just-in-time, triggered, etc.). |

FIG. 28B

| Table | Purpose |
|---|---|
| SCHEDULE_PARTICIPATION | This table represents the customer organizations that are sponsoring the schedule (the set of messages). A customer may choose to brand their communications with company logos and/or company names as specified by the BRANDED_COMM_IND column. Some customer may choose to geographically limit the extent of the communication by specifying an asset geography in the GEO_ID column.<br><br>PARTICIPATION_TYPE identifies the various types of scheduling participation types available to the system. Initial values may be:<br><br>• SPONSORED<br>• UNSPONSORED<br>• SOLICITATION<br><br>SPONSORED schedule participation occurs when a Damage Prevention customer has contracted to deliver a set of messages on the customer's behalf. Those messages may be customer specific or they may be generic in content.<br>UNSPONSORED schedule participation is associated with the default schedule.<br>SOLICITATION participation occurs when a product vendor wishes to advertise via the NDS 110. |

FIG. 28C

| CAC_CONTACT_LOAD_MAPPING.LOAD_FIELD | Source / Description |
|---|---|
| Vendor Unique ID | STAKEHOLDER.STAKEHOLDER_ID |
| Data Source | 'NDS' |
| Audience Type | 'Stakeholders' |
| Organization | COMPANY.COMPANY_NAME. Obtained from the STAKEHOLDER.COMPANY_ID reference. |
| First Name | STAKEHOLDER.FIRST_NAME |
| Last Name | STAKEHOLDER.LAST_NAME |
| Mailing Address Line 1 | ADDRESS.ADDRESS_LINE obtained via STAKEHOLDER_ADDRESS.ADDRESS_ID |
| Mailing Address Line 2 | ADDRESS.ADDRESS_DESIGNATORS obtained via STAKEHOLDER_ADDRESS.ADDRESS_ID |
| Mailing City | ADDRESS.CITY obtained via STAKEHOLDER_ADDRESS.ADDRESS_ID |
| Mailing State Abbreviation | ADDRESS.STATE obtained via STAKEHOLDER_ADDRESS.ADDRESS_ID |
| Mailing Zip Code | ADDRESS.ZIP_CODE obtained via STAKEHOLDER_ADDRESS.ADDRESS_ID |
| County Name | ADDRESS.COUNTY obtained via STAKEHOLDER_ADDRESS.ADDRESS_ID |
| SIC4 Code | "E100" |
| Primary Phone | PHONE.PHONE_NUMBER where PHONE_TYPE = 'VOICE - PRIMARY'. Obtained via STAKEHOLDER_PHONE.PHONE_ID |
| Alternative Phone 1 | PHONE.PHONE_NUMBER where PHONE_TYPE = 'VOICE - ALTERNATE'. Obtained via STAKEHOLDER_PHONE.PHONE_ID |
| Facsimile Number | PHONE.PHONE_NUMBER where PHONE_TYPE = 'facsimile - PRIMARY'. Obtained via STAKEHOLDER_PHONE.PHONE_ID |
| Email Address | EMAIL_ADDRESS.EMAIL_ADDRESS where EMAIL_ADDRESS_TYPE = 'WORK - PRIMARY'. Obtained via STAKEHOLDER_EMAIL_ADDRESS.EMAIL_ADDRESS_ID |
| Alternative Email Address | EMAIL_ADDRESS.EMAIL_ADDRESS where EMAIL_ADDRESS_TYPE = 'WORK - ALTERNATE'. Obtained via STAKEHOLDER_EMAIL_ADDRESS.EMAIL_ADDRESS_ID |
| Geocode Accuracy | ADDRESS.LOCATION_ACCURACY |
| Latitude | ADDRESS.LATITUDE obtained via STAKEHOLDER_ADDRESS.ADDRESS_ID |
| Longitude | ADDRESS.LONGITUDE obtained via STAKEHOLDER_ADDRESS.ADDRESS_ID |

FIG. 42

Stakeholder Compliance Communication Detail Report

This tool generates the Stakeholder Compliance Communication Detail report. This report summarizes the NDS compliance communication messages that have been delivered to Stakeholders on behalf of the specified member, within the given reporting period and state.

Reporting Period: [01/15/2010] to [12/31/2010]

Member Organization: [Acme Pipeline]

State: [Select a State]

County: [Select a State]

Report Format: ● HTML
○ PDF

[Run Report] [Clear]

◇ Indicates a required field.

FIG. 45

Notification Delivery System
Stakeholder Company Compliance Communication Detail
1/1/2011 to 1/31/2011
Prepared for Acme Pipeline January 7, 2011

Stakeholder State: TX  Stakeholder County: HARRIS

| Stakeholder Company | Stakeholder Company Address | PR Message Deliveries | JIT Message Deliveries | Scheduled Message Deliveries | Supplemental ROW Message Deliveries | Total Message Deliveries |
|---|---|---|---|---|---|---|
| Company Name | Company Address | 58 | 12 | 1 | 0 | 71 |
| Company Name | Company Address | 12 | 3 | 1 | 0 | 16 |
| Company Name | Company Address | 4 | 1 | 1 | 1 | 7 |
| Company Name | Company Address | 5 | 4 | 1 | 0 | 10 |
| Company Name | Company Address | 34 | 12 | 1 | 0 | 47 |
| Company Name | Company Address | 8 | 1 | 1 | 1 | 11 |
| Company Name | Company Address | 213 | 12 | 1 | 0 | 226 |
| Company Name | Company Address | 82 | 12 | 1 | 0 | 95 |
| Totals: | | 416 | 57 | 8 | 2 | 483 |

Stakeholder State: TX  Stakeholder County: HIDALGO

| Stakeholder Company | Stakeholder Company Address | PR Message Deliveries | JIT Message Deliveries | Scheduled Message Deliveries | Supplemental ROW Message Deliveries | Total Message Deliveries |
|---|---|---|---|---|---|---|
| Company Name | Company Address | 32 | 8 | 1 | 1 | 42 |
| Company Name | Company Address | 7 | 3 | 1 | 0 | 11 |
| Company Name | Company Address | 4 | 1 | 1 | 1 | 7 |
| Company Name | Company Address | 5 | 2 | 1 | 0 | 8 |
| Company Name | Company Address | 3 | 1 | 1 | 1 | 6 |
| Company Name | Company Address | 10 | 5 | 1 | 0 | 16 |
| Company Name | Company Address | 5 | 2 | 1 | 0 | 8 |
| Company Name | Company Address | 2 | 1 | 1 | 1 | 5 |
| Company Name | Company Address | 13 | 12 | 1 | 0 | 26 |
| Company Name | Company Address | 1 | 1 | 1 | 1 | 4 |
| Totals: | | 82 | 36 | 10 | 5 | 133 |

FIG. 47

| Report Field | Data Source(s) and Information |
|---|---|
| Prepared for | This may be the organization name of the sponsoring Member Organization selected through the report's tool. |
| Stakeholder | The name of the stakeholder. This may be obtained from the STAKEHOLDER table. |
| Company | This is the company name associated with the stakeholder through the STAKEHOLDER.COMPANY_ID field. |
| Address | This is the stakeholder's mailing address as identified by the stakeholder's STAKEHOLDER_ADDRESS record of address type 'MAILING'. If a mailing address is not available but a 'PHYSICAL' address is, use that address. |
| Contact ID | This is the contact ID of the contact that is associated with this stakeholder (if there is one).<br><br>This value can be obtained from the STAKEHOLDER_CONTACT table.<br><br>This report element is included if the report is generated in HTML format. This ID value may be a link to execute a contact search by ID and should result in a new search results tab being displayed with the single contact returned. |
| [Report Rows] | Each row of the report's detail is information related to a single communication event. The row's information will originate from the STAKEHOLDER_COMMUNICATION records associated with the ORG_STAKEHOLDER_COMMUNICATION records associated with the specified Member Organization. |
| Message Delivery Date | This report element may be populated from the STAKEHOLDER_COMMUNICATION.DELIVERY_DATE field. |
| Delivery Type | The report element will display one of the following values:<br>• one call gateway - ticket entry<br>• one call gateway - ticket search<br>• one call gateway - ticket update<br>• just-in-time<br>• triggered<br>• scheduled<br>• supplemental<br>• baseline |

| | |
|---|---|
| | Delivery Type is obtained by looking up the SCHEDULE_CLASSIFICATION of the COMMUNICATION_SCHEDULE associated with the COMMUNICATION_MESSAGE associated with the STAKEHOLDER_COMMUNICATION_MSG associated with the STAKEHOLDER_COMMUNICATION record. |
| Message Content Included | This element lists COMMUNICATION_MSG_CONTENT_TYPE message content types associated with the COMMUNICATION_MESSAGE that was delivered.<br><br>If multiple message content types are associated with a given message, they may be listed on separate lines within the same row. |
| Message Destination | This field represents the delivery destination of the message. The values for this field may be one of the following:<br>• Gateway<br>• Email<br>• Facsimile<br>• Address<br>Values for this field may be obtained from the STAKEHOLDER_COMMUNICATION.DELIVERY_EMAIL_ADDRE_ID or the STAKEHOLDER_COMMUNICATION.DELIVERY_facsimile_ID or the STAKEHOLDER_COMMUNICATION.DELIVERY-ADDRESS_ID, depending upon which of these fields is non-null. |
| Message | This may be a link to display the message that was delivered to the Stakeholder. This message will reside in the DOCUMENT_REPOSITORY table. If STAKEHOLDER_COMMUNICATION.COMMUNICATION_DOC_ID is not null then this is the document that may be linked to by this link; otherwise, the link should point to the document associated with the message delivered. |

FIG. 48B

Compliance Communication Executive Summary Report

This tool generates the Compliance Communication Executive Summary report. This report summarizes the NDS compliance communication messages that have been delivered to Stakeholders on behalf of the specified sponsoring member organization.

Member Organization: [Acme Pipeline ▾] ◁

Program Year: [2011 ▾]

Report Format: ● HTML
○ PDF

[Run Report] [Clear]

◁ Indicates a required field.

FIG. 49

| Report Field | Data Source(s) and Information |
|---|---|
| Program Year | This may be the program year value specified in the report tool. |
| Prepared for | This may be the organization name of the sponsoring Member Organization selected through the report's tool. |
| [Message Delivery Type section rows] | Each row of the Message Delivery Type section represents the number of messages of the specified type, per month, that have been delivered on behalf of the specified sponsoring member organization. |
| Message Delivery Type | This column will contain a static list of the four message delivery types listed in the prototype. Even if a member did not have messages of a type delivered, all four types may be listed. |
| Message Delivery Type - Jan through Dec. | These columns should list the monthly volume of messages delivered on behalf of the specified member organization. |
| [Message Content Type section rows] | Each row of the Message Content section represents the number of messages of the specified message content type (per month) that have been delivered on behalf of the specified sponsoring organization. |
| Message Content Type | This column will list the distinct set of message content types that have been included in messages delivered on behalf of the specified member organization. This column lists the message content types included in messages that have been delivered. |
| Message Content Type - Jan through Dec. | These columns list the monthly volume of messages delivered on behalf of the specified member organization which contained the given message content type. |

FIG. 51

Stakeholder Compliance Communication Summary Report

This tool generates the Stakeholder Compliance Communication Summary report. This report summarizes the NDS compliance communication messages that have been delivered to Stakeholders on behalf of the specified member, within the given reporting period and state.

Reporting Period: 01/15/2010 ▫ to 12/31/2010 ▫ ⬇ ⊖

Member Organization: Acme Pipeline ⌄ ⬇

State: Any State ⌄

County: Any County ⌄ ⬇

Report Format: ● HTML
○ PDF

[Run Report] [Clear]

⬇ Indicates a required field.

Notification Delivery System
Stakeholder Compliance Communication Summary
1/1/2011 to 1/31/2011
Prepared for Acme Pipeline

5300

January 7, 2011

State: TX    County: HARRIS

| Stakeholder Company | Stakeholder Name | Stakeholder Company Address | Date Added to Database | Period Excavations | Messages Delivered |
|---|---|---|---|---|---|
| Company Name | Stakeholder Name | Company Address | 1/2/2009 | 12 | 15 |
| Company Name | Stakeholder Name | Company Address | 3/9/2008 | 3 | 3 |
| Company Name | Stakeholder Name | Company Address | 12/1/2010 | 1 | 1 |
| Company Name | Stakeholder Name | Company Address | 6/7/2009 | 2 | 3 |
| Company Name | Stakeholder Name | Company Address | 3/2/2007 | 10 | 12 |
| Company Name | ROSE DIAZ | Company Address | 1/6/2011 | 1 | 1 |
| Company Name | Stakeholder Name | Company Address | 5/23/2007 | 32 | 40 |
| Company Name | Stakeholder Name | Company Address | 6/10/2008 | 12 | 8 |
|  |  | Totals: | | 73 | 83 |

State: TX    County: HIDALGO

| Stakeholder Company | Stakeholder Name | Stakeholder Company Address | Date Added to Database | Period Excavations | Messages Delivered |
|---|---|---|---|---|---|
| Company Name | Stakeholder Name | Company Address | 2/4/2008 | 8 | 9 |
| Company Name | Stakeholder Name | Company Address | 1/15/2009 | 3 | 3 |
| Company Name | Stakeholder Name | Company Address | 5/15/2010 | 1 | 1 |
| Company Name | Stakeholder Name | Company Address | 1/3/2011 | 2 | 3 |
| Company Name | Stakeholder Name | Company Address | 8/12/2009 | 1 | 1 |
| Company Name | Stakeholder Name | Company Address | 8/1/2009 | 5 | 5 |
| Company Name | Stakeholder Name | Company Address | 7/20/2008 | 2 | 2 |
| Company Name | Stakeholder Name | Company Address | 1/2/2011 | 1 | 1 |
| Company Name | Stakeholder Name | Company Address | 2/1/2009 | 12 | 7 |
| Company Name | Stakeholder Name | Company Address | 6/27/2007 | 1 | 1 |
|  |  | Totals: | | 36 | 33 |

| State Totals | Period New Excavators | Period Excavations | Messages Delivered |
|---|---|---|---|
| Texas | 3 | 109 | 116 |

FIG. 53

| Report Field | Data Source(s) and Information |
|---|---|
| Program Year | This may be the program year value specified in the report tool. |
| Prepared for | This may be the organization name of the sponsoring Member Organization selected through the report's tool. |
| Excavation State | The state associated with the data within the section. |
| County | The county associated with the data within the section. |
| Excavation Company | This is the company name associated with the stakeholder through the STAKEHOLDER.COMPANY_ID field. |
| Stakeholder Name | The name of the Stakeholder.<br><br>STAKEHOLDER.FIRST_NAME & STAKEHOLDER.LAST_NAME |
| Excavation Company Address | This is the stakeholder's mailing address as identified by the stakeholder's STAKEHOLDER_ADDRESS record of address type 'MAILING'. If a mailing address is not available but a 'PHYSICAL' address is, use that address. |
| Date added to Database | This value should come from the creation date of the contact associated with the stakeholder via the STAKEHOLDER_CONTACT record for the given stakeholder. If no STAKEHOLDER_CONTACT record exists for the stakeholder then list the creation date of the STAKEHOLDER record for the given stakeholder. |
| Period Excavations | The number of excavation executed by the stakeholder during the reporting period. This information can be obtained by counting the number of STAKEHOLDER_EXCAVATION records for the stakeholder where the EXCAVATION.EXCAVATION_DATE is within the reporting period. |

FIG. 55A

| Report Field | Data Source(s) and Information |
| --- | --- |
| Messages Delivered | The number of messages (of any SCHEDULE_CLASSIFICATION or MESSAGE_CONTENT_TYPE) delivered during the reporting period for the given stakeholder. This can be calculated by counting the number of ORG_STAKEHOLDER_COMMUNICATION records where the STAKEHOLDER_COMMUNICATION.DELIVERY_DATE is within the reporting period. |
| State Totals Subtotal Section | There may be one of these per state to total the number of new stakeholders, period activities (e.g., excavations, and messages delivered during the reporting period for the state being processed. |
| State Totals | The full state name of the state being processed. |
| Period New Stakeholders | The number of stakeholder stakeholders within the report state section who have been marked as new (e.g., colored green). |
| Period Excavations | This is a summary of the excavations within the state during the reporting period. |
| Messages Delivered | This is a summary of the message delivered within the state during the reporting period. |

FIG. 55B

Notification Delivery System
New Stakeholder Summary
1/1/2010 to 1/31/2011
Prepared for Acme Pipeline State: Texas                                                                                              February 7, 2011

/— 5700

| Stakeholder Company | Stakeholder Name | Stakeholder Company Address | Date New to Member | Period Excavations | Messages Delivered |
|---|---|---|---|---|---|
| Company Name | Stakeholder Name | Company Address | 1/11/2011 | 12 | 15 |
| Company Name | Stakeholder Name | Company Address | 1/9/2011 | 3 | 3 |
| Company Name | Stakeholder Name | Company Address | 1/31/2011 | 1 | 1 |
| Company Name | Stakeholder Name | Company Address | 1/7/2011 | 2 | 3 |
| Company Name | Stakeholder Name | Company Address | 1/2/2011 | 10 | 12 |
| Company Name | Stakeholder Name | Company Address | 1/6/2011 | 1 | 1 |
| Company Name | Stakeholder Name | Company Address | 1/23/2011 | 32 | 40 |
| Company Name | Stakeholder Name | Company Address | 1/10/2011 | 12 | 8 |
| Company Name | Stakeholder Name | Company Address | 1/4/2011 | 8 | 9 |
| Company Name | Stakeholder Name | Company Address | 1/5/2011 | 3 | 3 |
| Company Name | Stakeholder Name | Company Address | 1/15/2011 | 1 | 1 |
| Company Name | Stakeholder Name | Company Address | 1/3/2011 | 2 | 3 |
| Company Name | Stakeholder Name | Company Address | 1/12/2011 | 1 | 1 |
| Company Name | Stakeholder Name | Company Address | 1/21/2011 | 5 | 5 |
| Company Name | Stakeholder Name | Company Address | 1/20/2011 | 2 | 2 |
| Company Name | Stakeholder Name | Company Address | 1/2/2011 | 1 | 1 |
| Company Name | Stakeholder Name | Company Address | 1/1/2011 | 12 | 7 |
| Company Name | Stakeholder Name | Company Address | 1/27/2011 | 1 | 1 |
| | | State Totals: | | 109 | 116 |
| | | Grand Totals: | | 109 | 116 |

| Report Field | Data Source(s) and Information |
|---|---|
| [Reporting Period Date Range] | This may be the date range. |
| Prepared for | This may be the organization name of the sponsoring Member Organization selected through the report's tool. |
| Excavation Company | This is the company name associated with the stakeholder through the STAKEHOLDER.COMPANY_ID field. |
| Stakeholder Name | The name of the Stakeholder. STAKEHOLDER.FIRST_NAME & STAKEHOLDER.LAST_NAME |
| Excavation Company Address | This is the stakeholder's mailing address as identified by the stakeholder's STAKEHOLDER_ADDRESS record of address type 'MAILING'. If a mailing address is not available but a 'PHYSICAL' address is, use that address. |
| Date New to Member | This value should come from the date of the earliest ORG_STAKEHOLDER_COMMUNICATION record for the Stakeholder during the report period. |
| Period Excavations | The number of excavation executed by the stakeholder during the reporting period. This information can be obtained by counting the number of ORG_STAKEHOLDER_EXCAVATION records for the stakeholder where the EXCAVATION.EXCAVATION_DATE is within the reporting period. |
| Messages Delivered | The number of messages (of any SCHEDULE_CLASSIFICATION or MESSAGE_CONTENT_TYPE) delivered during the reporting period for the given stakeholder. This can be calculated by counting the number of ORG_STAKEHOLDER_COMMUNICATION records where the STAKEHOLDER_COMMMUNICATION.DELIVERY_DATE is within the reporting period. |
| State Totals | The total Period Excavations and Messages Delivered within the state. |
| Grand Totals | The total Period Excavations and Messages Delivered within all states reported. |

FIG. 58

NOTIFICATION DELIVERY SYSTEM

CROSS-REFERENCE TO RELATED APPLICATIONS

This application is a non-provisional of and claims priority to U.S. Provisional Application No. 61/482,551, filed May 4, 2011, the entire contents of which are incorporated herein by reference.

FIELD

Embodiments of the invention relate to a notification delivery system for delivering various messages.

BACKGROUND

Industries that rely on the transmission of materials and data through underground conduit such as pipes, electrical transmission lines, fiber optic lines and others must record the location of such lines. Likewise, these industries must be able to quickly recall the location of underground conduit for repairs, emergencies, and to inform the public or government entities or other contractors who may excavate or dig near the location of the underground conduit and facilities.

The ability to quickly recall the location of these underground conduits and related facilities is critical. When these facilities or conduits are struck from excavating or digging equipment, the facilities or conduits may be damaged and may injure the equipment operator and harm the environment. For example, a break in an underground electricity transmission line may not only result in electrocution, but may also disrupt power to homes and businesses, may result in losses of revenue and perishable products, and may put the health and safety of the public at risk.

Those in the industry of utilizing underground facilities include electrical and gas companies, telecommunication and data transmission companies, and utilities, such as sewer and water. In response to the need to recall the location of underground conduits and facilities, the industry has created contact centers for the public and businesses to call and request information regarding any underground facilities before excavating or digging. For example, if a resident decides to install an in-ground swimming pool on the resident's property or replace a septic tank, the resident may call the contact center and inquire whether there are any underground lines or other hazards in the area before excavating or digging.

In the last 25 years, the expansion of underground lines and facilities has rapidly increased. Electrical and telecommunications lines are typically buried, and the increase in popularity of broadband and cable services has also increased the numbers of buried facilities. Due to this increase in underground facilities and the large number of businesses and utilities that install and utilize them, the information in the contact centers may be inaccurate or incomplete. For example, information used by these contact centers, such as above the ground reference markers—the location of buildings and fences, etc.—often change over time without notifications of the changes being sent to contact centers.

Similarly, counties and cities may also be able to collect and provide information to the public to identify the location of property boundaries, utility easements, condemned structures and underground aquifers. These records may be inaccurate due to changes in the topography, improvements in the area, and encroachments.

Deep excavation is also a concern, and identifying the locations of underground facilities before excavating is important. Many times this excavation is occurring along or near pipelines carrying extremely volatile or toxic products such as natural gas, ammonia, hydrogen sulfide, or other chemicals. In many cases, the individuals performing the excavation are not aware of the safety precautions that should be followed or the hazards involved when excavating near such pipelines. Pipeline operators often take steps to educate those the business of deep excavation by providing various types of safety messages via postal mail, face-to-face meetings, and open training seminars; it is however, very difficult for a pipe or utility to accurately identify all of the companies and individuals that may perform some form of excavation along their pipeline assets. Even when the appropriate excavation professional is identified and provided with safety information, the messages are often too late or too early to be as effective as possible.

SUMMARY

Provided are a computer implemented method, computer program product, and system for providing notifications. A ticket that specifies at least one activity to be performed, a location at which the activity is to be performed, and a period of time in which that activity is to occur is received. A message to be delivered is identified based on the activity, the location, and the period of time, wherein the message describes one or more measures to be taken based on the activity. The identified message describing the one or more measures is delivered to enable at least one of the measures to be taken before the activity occurs in the period of time specified in the ticket.

BRIEF DESCRIPTION OF THE SEVERAL VIEWS OF THE DRAWINGS

In the drawings, like reference numbers represent corresponding parts throughout.

FIG. 7 is a screenshot of a user interface for displaying data for a work request ticket listing company information, work information, and remarks on the left side, and showing safety and hazard information in text on the right side in accordance with certain embodiments.

FIG. 8 is a screenshot of a user interface displaying data for a work request ticket listing company information, work information, and remarks on the left side, and listing a map of an excavation site on the right side in accordance with certain embodiments.

FIG. 10 is a screenshot of a user interface requesting a user to input data for company information and contact information for creation of a geocode location and updated site information in accordance with certain embodiments.

FIG. 11 is a continuation of the screenshot of a user interface as shown in FIG. 10 requesting a user to input work information to be done and by whom to enable delivery of information to a requestor in accordance with certain embodiments.

FIG. 12 is a continuation of the screenshot of a user interface as shown in FIGS. 10 and 11 requesting the user to input work location information, including maps and latitude and longitude, to enable delivery of information to a requestor in accordance with certain embodiments.

FIG. 13 is a continuation of the screenshot of a user interface as shown in FIGS. 10, 11, and 12 requesting the user to input marking information and positive response information, including contact information for utility companies to notify and warning information, to enable delivery of information to a requestor in accordance with certain embodiments.

FIG. 18 is a screenshot of a user interface to enable a user to contact an NDS operator for assistance in accordance with certain embodiments.

FIG. 19 is a screenshot of a user interface allowing a user to input information to become a registered user of the NDS in accordance with certain embodiments.

FIG. 21 illustrates an example of a positive response message with a safety message appended in accordance with certain embodiments.

FIG. 22 illustrates an example of a just-in-time positive response message in accordance with certain embodiments.

FIG. 24 illustrates information on tables illustrated in FIG. 23 in accordance with certain embodiments. FIG. 24 is formed by FIGS. 24A and 24B.

FIG. 28 illustrates information on tables illustrated in FIG. 27 in accordance with certain embodiments. FIG. 28 is formed by FIGS. 28A, 28B, and 28C.

FIG. 42 illustrates fields for a contact load mapping table in accordance with certain embodiments.

FIG. 45 illustrates a user interface provided by the NDS for generating a stakeholder compliance communication detail report in accordance with certain embodiments.

FIG. 47 illustrates a stakeholder compliance communication detail report in accordance with certain embodiments.

FIG. 48 illustrates report fields and data sources/information for a stakeholder compliance communication detail report in accordance with certain embodiments. FIG. 48 is formed by FIGS. 48A and 48B.

FIG. 49 illustrates a user interface provided by the NDS for generating a compliance communication executive summary report in accordance with certain embodiments.

FIG. 51 illustrates report fields and data sources/information for a compliance communication executive summary report in accordance with certain embodiments.

FIG. 52 illustrates a user interface provided by the NDS for generating a stakeholder compliance communication summary report in accordance with certain embodiments.

FIG. 53 illustrates a stakeholder compliance communication summary report in accordance with certain embodiments.

FIG. 55 report fields and data sources/information for a stakeholder compliance communication summary report accordance with certain embodiments. FIG. 55 is formed by FIGS. 55A and 55B.

FIG. 57 illustrates a new stakeholder summary report in accordance with certain embodiments.

FIG. 58 illustrates report fields and data sources/information for a new stakeholder summary report in accordance with certain embodiments.

FIG. 59 is formed by FIGS. 59A and 59B.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As required, detailed aspects of the disclosed subject matter are disclosed herein; however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. This terminology will include the words specifically mentioned, derivatives thereof and words of similar meaning.

Figure 1:
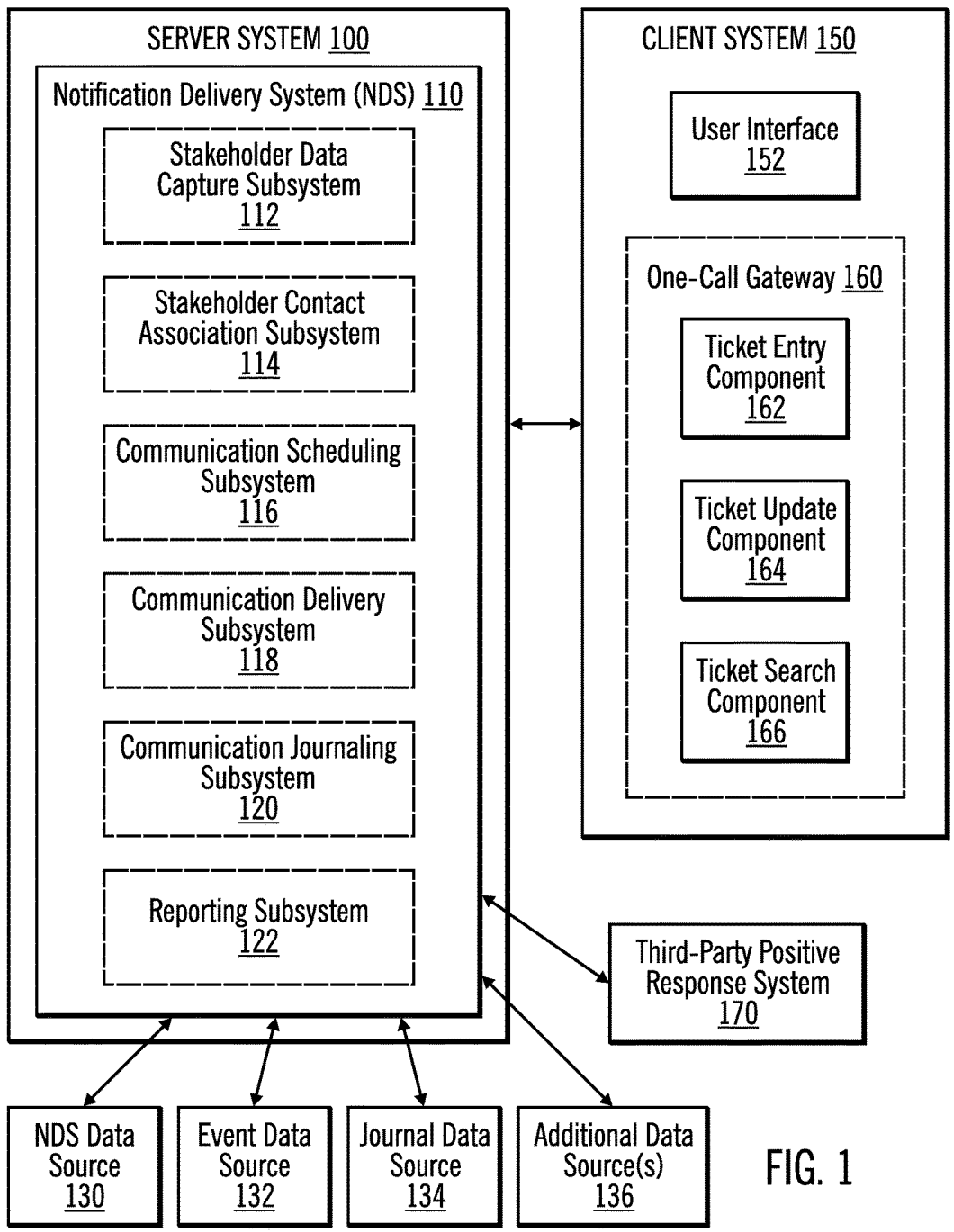
FIG. 1 illustrates, in a block diagram, a computing environment in accordance with certain embodiments.

FIG. 1 illustrates, in a block diagram, a computing environment in accordance with certain embodiments. A server system 100 is coupled to a client system 150. The server system 100 includes a Notification Delivery System (NDS) 110. U.S. Provisional Application No. 61/482,551 described a one-call gateway. The NDS 110 includes the functionality of this one-call gateway 160. In certain embodiments, the one-call gateway 160 is at the client system 150.

The client system 150 includes a user interface 152 and the one-call gateway 160. The one-call gateway 160 includes a ticket entry component 162, a ticket update component 164, and a ticket search component 166. In certain embodiments, the client system is a World Wide Web (WWW or "web") server, and the user interface 152 is a web browser. In certain embodiments, the server system 100 and the client system 150 are part of a cloud environment. In a cloud environment, the NDS provides a service of delivering notifications to end-recipients. The term cloud may be described as including networks, systems, resources, and applications.

In certain embodiments, the NDS 110 includes the following subsystems: a stakeholder data capture subsystem 112, a stakeholder contact association subsystem 114, a communication scheduling subsystem 116, a communication delivery subsystem 118, a communication journaling subsystem 120, and a reporting subsystem 122. The NDS 110 is coupled to a NDS data store 130, an event data store 132, a journal data store 134, and one or more other data sources 136. Various data and databases discussed herein may be stored in these data stores 130, 132, 134 and/or 136. In various embodiments, the data stores 130, 132, 134, 136 may be directly coupled to the server system 100 or may be coupled via a network to the server system 100. In certain embodiments, the functionality of the subsystems 112, 114, 116, 118, 120, and 122 may be combined in any manner (e.g., combining all of the functionality of the subsystems into one system). Herein, although there may be references to the NDS 110 performing processing, the processing may be performed by a subsystem of the NDS 110.

The NDS 110 enables a user at the client system 150 (e.g., a one-call gateway) to enter information when requesting that a location be identified for an operation. Such a request is sometimes referred to as a ticket (sometimes referred to as a locate request), and it may be used, for example, by utility and state call centers to determine if the user may perform the operation at the site location, such as to dig at the requested site location. A ticket may be described as a set of information that describes an activity to be performed (e.g., excavation), a location at which the activity is to be performed (e.g., an excavation operation near a pipeline or a centerline at which excavation may occur), and a time period in which the activity will take place (e.g., a range of dates). A centerline may be described as a line along a center of a utility (e.g., a pipeline). Also, one-call gateway 160 assigns a ticket ID to each ticket. Moreover, a ticket may initially generated through a third-party (e.g., a utility or state) call center may, and such a call center may assign a ticket number to a ticket. The third-party call center may then route the ticket to the NDS 110, and the one-call gateway 160 may then also assign a ticket ID to that ticket.

The NDS 110 may also be coupled to a third party positive response system 170. A positive response may be described as a notification from an operator that indicates (1) that the operator has marked a location at which the operator has assets and (2) whether there is a conflict (e.g., the operator indicates that there is no conflict if an activity by a user would not affect the assets, and the operator indicates that there is a conflict if the activity by the user may affect the assets (e.g., digging may cause the operator's pipe to be damaged)). An operator may be described as any organization operating or owning an asset. An asset may be described as in-ground or above-ground facilities or conduits (e.g., such as utility pipeline, telecommunication lines, commodity transport lines, etc.). An operator may be a member using the NDS 110.

The NDS 110 enables the user at the client system 150 to mark a location of an operation, including an excavation operation, a construction operation, underground boring or other boring, trenching, a facility operation, such as installation, maintenance, or removal of a utility or communication line or pipe, or another operation. The NDS 110 may be used for other operations, including determining whether or not the user is complying with regulations, such as regulations requiring a selected distance for construction of a building from a property line and a determination whether or not a permit may be received for a selected operation, such as for excavating or building in a selected geographic location. By doing this, the user creates a ticket.

Figure 2:
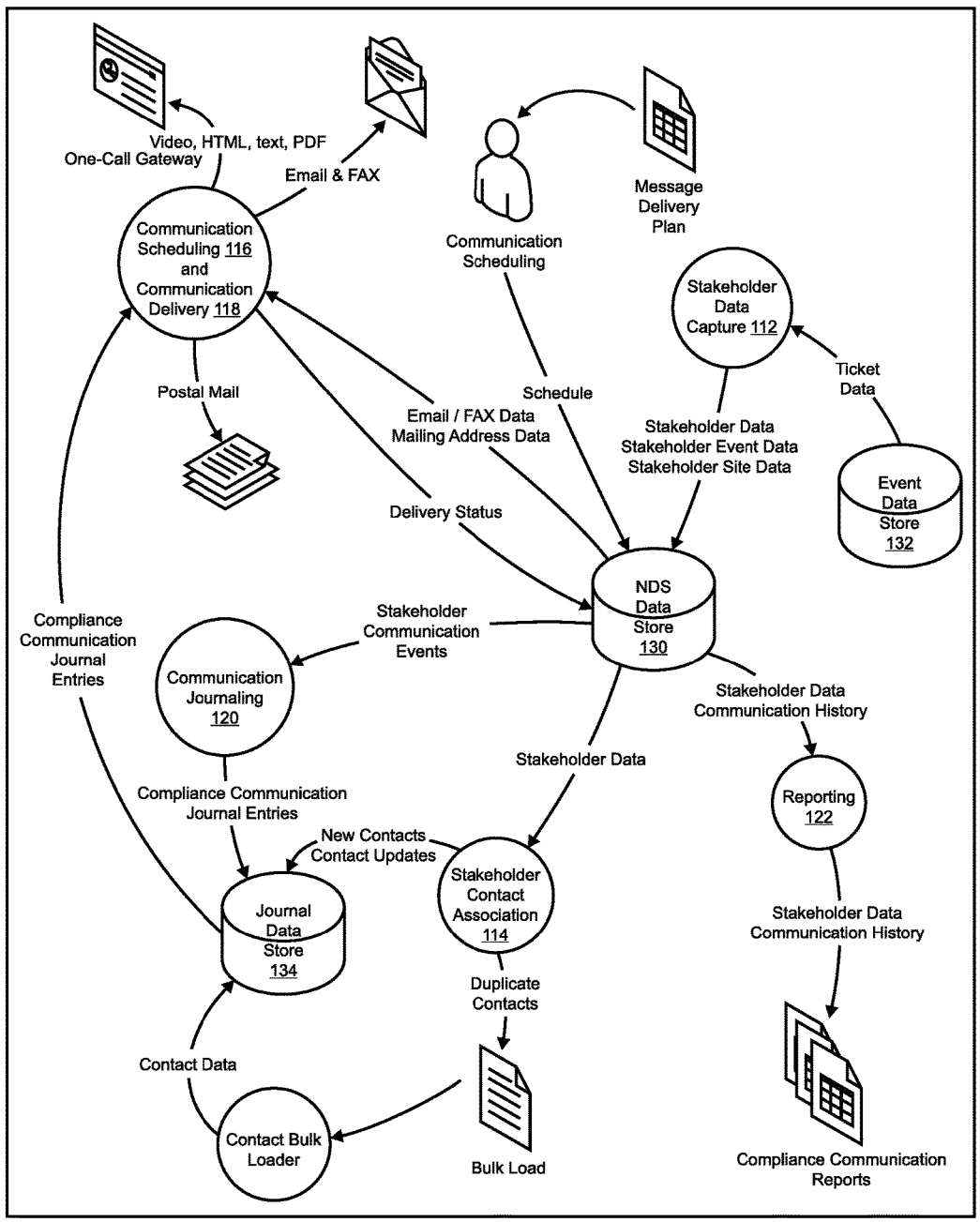
FIG. 2 illustrates Notification Delivery System (NDS) subsystems and a high level data flow diagram for the NDS subsystems in accordance with certain embodiments.

FIG. 2 illustrates NDS subsystems and a high level data flow diagram for the subsystems in accordance with certain embodiments. The NDS can be logically broken down into a number of subsystems for execution of desperate functions (listed below). In certain embodiments, the subsystems 112, 114, 116, 118, 120, and 122 correlate to the physical processes (i.e., applications) that provide the NDS 110 functionality. In certain embodiments, the communication scheduling subsystem 116 includes a user interface for the purpose of maintaining a schedule for notifications.

Referring to FIG. 2, an event in the event data store 132 may trigger ticket data to be sent to the stakeholder data capture subsystem 112. The stakeholder data capture subsystem 112 extracts stakeholder data, stakeholder event data, and stakeholder site data from the ticket data and forwards the extracted data to the NDS data store 130.

The stakeholder contact association subsystem 114 receives or retrieves stakeholder data from the NDS data store 130. The stakeholder contact association subsystem 114 removes duplicate contacts for a contact bulk loader, which loads contact information in bulk into the journal data store 134. The stakeholder contact association subsystem 114 also stores new contacts and/or contact updates into the journal data store 134.

Also, a message delivery plan (e.g., a schedule for providing notifications) may be created by a user and forwarded to the NDS data store 130 for storage.

The communication scheduling subsystem 116 determines when it is time to issue one or more notifications, and the communication delivery subsystem 118 determines which notifications to send and delivers those notifications (e.g., via postal mail (e.g., United States Postal Service (USPS) mail), electronic mail (email), facsimile, and/or video, HyperText Markup Language (HTML) document, text document, Portable Document Format (PDF) document, etc.). The communication delivery subsystem 118 may send Comma Separated Value (CSV) files to a print house for delivery via postal mail. The communication delivery subsystem 118 may provide the notifications to a user via a one-call gateway (e.g., the client system 150). In certain embodiments, the one-call gateway enables a user to create a ticket using a ticket entry component, update the ticket using a ticket update component, and to search for (i.e., locate) tickets using a ticket search component.

The communication delivery subsystem 118 obtains the delivery information (e.g., email address, facsimile number, mailing address, etc.) from the NDS data store 130. The communication delivery subsystem 118 forwards a delivery states to the NDS data store 130. The communication delivery subsystem 118 receives compliance communication journal entries from the journal data store 134, and these journal entries may be used to determine which notifications are to be delivered and how. In this manner the communication delivery subsystem 118 can select notifications that were not previously sent to the same recipient.

The communication journaling subsystem 120 receives or retrieves stakeholder communication events from the NDS data store 130. The communication journaling subsystem 120 generates compliance communication journal entries to log communications from/to stakeholders to enable showing compliance with any regulations requiring notifications. The communication journaling subsystem 120 stores the compliance communication journal entries in the journal data store 134.

The reporting subsystem 122 receives or retrieves stakeholder data and communication history from the NDS data store 130 and outputs the stakeholder data and communication history in compliance communication reports.

The NDS 110 automates the delivery of information (e.g., safety and compliance related information) to stakeholders via various forms of communication (e.g., postal mail, email, facsimile, video, HTML document, text document, PDF document, etc.). In certain embodiments, the form of communication is selected to minimize the delivery time and costs (e.g., email and facsimile may be selected). The NDS 110 targets stakeholders for delivery of certain messages based on their activities associated with assets (e.g., excavators may be sent messages with regard to excavating along an operator's pipeline assets). Stakeholder information for the NDS 110 may be obtained from ticket data from various sources so that safety and compliance communications can be delivered to active stakeholders in a just-in-time fashion.

The NDS 110 provides a means of delivering automated, just-in-time, industry mandated, safety and compliance messages to active stakeholders; provides documentation (for audit purposes) of the delivery of these safety and compliance messages through journal entries (e.g., created within tracking reports); provides a way of delivering custom and/or branded messages to the stakeholders who are active along their centerlines (e.g., a line along center of an asset, such as a pipeline), thereby increasing the effectiveness and timeliness of the safety and compliance communications; enables distributing information in small segments to avoid having the message content being ignored or being treated as "junk mail" and/or spam mail; ensures that each active stakeholder receives as many different message segments as possible so as to provide them with a complete set of compliance messages over time; increases the data available to a mailing program by providing additional stakeholder information and by capturing the relationship between different stakeholders and sites (e.g., between excavation companies and where they excavate). For example, the mailings may be sent to individuals who live and/or work near an asset (e.g., a pipeline).

Merely to enhance understanding, examples herein may refer to specific stakeholders or activities (e.g., excavators or excavations). These are merely examples and it is to be understood that embodiments are not limited to such examples.

In certain embodiments, there are five primary message delivery options: a one-call gateway safety message delivery ("one-call gateway"), a just-in-time (JIT) positive response (PR) safety message delivery ("JIT-PR"), a triggered safety message delivery ("triggered"), a scheduled safety message delivery (scheduled), and a scheduled supplemental option ("supplemental"). Each of these options differs by the method of delivery, the message format, and the frequency of delivery. The purpose of these options is to deliver damage prevention messages to stakeholders as a supplement to other (e.g., standard) forms of message communication.

The following describes the one-call gateway safety message delivery option in accordance with certain embodiments:

Format: Brief safety/damage prevention message in the form of a video (e.g., 30 to 60 seconds in length) or textual message.

Frequency: Once per ticket entry by a user, ticket search by a user, or ticket update by a user, initiated from the one-call gateway.

Content: Content should include a brief damage prevention/safety message in video or HTML text form. The content may be member specific based on the members associated with the excavation work area or collaborative. One or more message content types will be conveyed in the content. The message content may be randomized so that each stakeholder receives a different video or text message with each message delivered, until all scheduled message options have been exhausted, at which point the message selections may begin repeating.

Targets: Stakeholders excavating near sponsoring member's assets. These stakeholders may be identified via their one-call gateway user accounts or, in the case of an anonymous ticket search operation, may be identified though the tickets searched. A sponsor may be described as an operator who pays for the service of having the NDS 110 issue notifications (e.g., safety messages).

Selection: Messages may be selected based on the sponsoring member companies associated with an excavation work area.

Delivery: Video and Text based messages may be delivered via the ticket search, ticket entry, and ticket update components of the one-call gateway.

Collaboration: This message class may be collaborative but may be operator or commodity specific.

Source: One-call gateway operation (ticket entry, ticket search or ticket update).

The following describe the JIT-PR safety message delivery option in accordance with certain embodiments:

Format: Very brief safety/damage prevention message in HTML format appended to the end of the positive response message.

Frequency: Once per positive response.

Content: Content includes a single brief damage prevention/safety message and may include subscribing member's logos. The content messages may be member specific based on the member associated with the positive response. One message content type is conveyed in the content.

Content may also vary based on whether the excavation member ticket was cleared or marked. The message content may be randomized so that each stakeholder receives a different message each time a message is delivered, until all scheduled message options have been exhausted, at which point the messages may begin repeating.

Targets: Stakeholders excavating near sponsoring member's assets.

Selection: Based on the sponsoring member companies associated with an excavation.

Delivery: Email or facsimile (as part of a positive response message).

Collaboration: This message class is non-collaborative. Each positive response message is sent on behalf of a single operator.

Source: Ticket One-call ticket

The following describe the triggered safety message delivery option in accordance with certain embodiments:

Format: Safety/Damage Prevention message in HTML format. The safety message is generally kept to one page.

Frequency: Once per month.

Content: Content should include only a single brief damage prevention/safety message and may include subscribing member's logos. Typically, more than one message content type may be conveyed in the content of the message.

The message content may be randomized so that each stakeholder receives a different message each time a message is delivered, until all scheduled message options have been exhausted, at which point the messages may begin repeating.

Targets: Stakeholders excavating near sponsoring member's assets.

Selection: Based on the sponsoring member companies associated with an excavation.

Delivery: Email or facsimile.

Collaboration: This message form is collaborative. All sponsoring members associated with excavations that have occurred since the last message may be referenced in the message and may be credited for the message delivery.

Source: One-call ticket

The following describe the scheduled safety message delivery option in accordance with certain embodiments.

Format: E-Newsletter or other brief publication (e.g., HTML).

Frequency: On a customer designated frequency (e.g., annual, biannual or quarterly).

Content: Damage prevention content should generally be brief. Content should include damage prevention/public awareness safety messages in addition to other content which may be considered helpful or desirable to Stakeholders. Content may include company logos, commodity specific messages and advertising.

Targets: All known stakeholders within sponsor's geographies.

Selection: Based on the asset county of sponsoring organizations or on the sponsoring member companies associated with an excavation.

Delivery: Email, facsimile or postal mail (e.g., in that order of preference) as available.

Collaboration: Messages may be collaborative or non-collaborative.

Collaborative communications may be selected based on a commonality of the sponsoring operator's asset counties, the publication and the desired delivery frequency. Ad Hoc, non-collaborative communications may be scheduled as well.

Source: One-call tickets, third-party commercial sources or industry sources (e.g., liaisons).

The following describe the scheduled supplemental message communication delivery option in accordance with certain embodiments:

Format: Brochure, magazine, newsletter, calendar or brief printed publication.

Frequency: On a customer designated frequency (e.g., annual or biannual).

Content: Content will typically include a complete set of public awareness messages but may also include other content (as would be the case with a magazine or calendar).

Targets: All stakeholders within sponsor's geographies who have not received a baseline set of messages for the designated period.

Selection: Based on asset county of sponsoring organizations or sponsoring member companies associated with an excavation.

Delivery: Postal mail.

Collaboration: Messages may be collaborative or non-collaborative.

Collaborative communications may be selected based on a commonality of the sponsoring operator's asset counties, one or more publication documents, and the desired delivery frequency.

Source: One-call tickets, third-party commercial sources or industry sources (e.g., liaisons).

Certain embodiments provide geographic scheduling of delivery. Certain embodiments provide message scheduling and delivery for emergency official (EO) and public official (PO) audience types.

Figure 3:
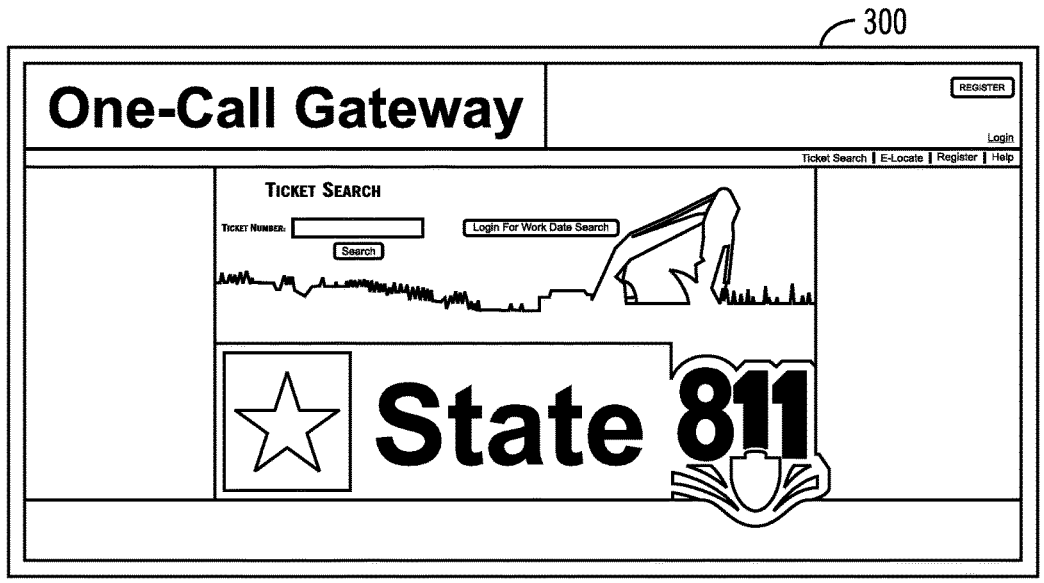
FIG. 3 is a screenshot of a user interface for a performing a ticket search by ticket number in accordance with certain embodiments.

FIG. 3 is a screenshot 300 of a user interface for a performing a ticket search by ticket number in accordance with certain embodiments.

Figure 4:
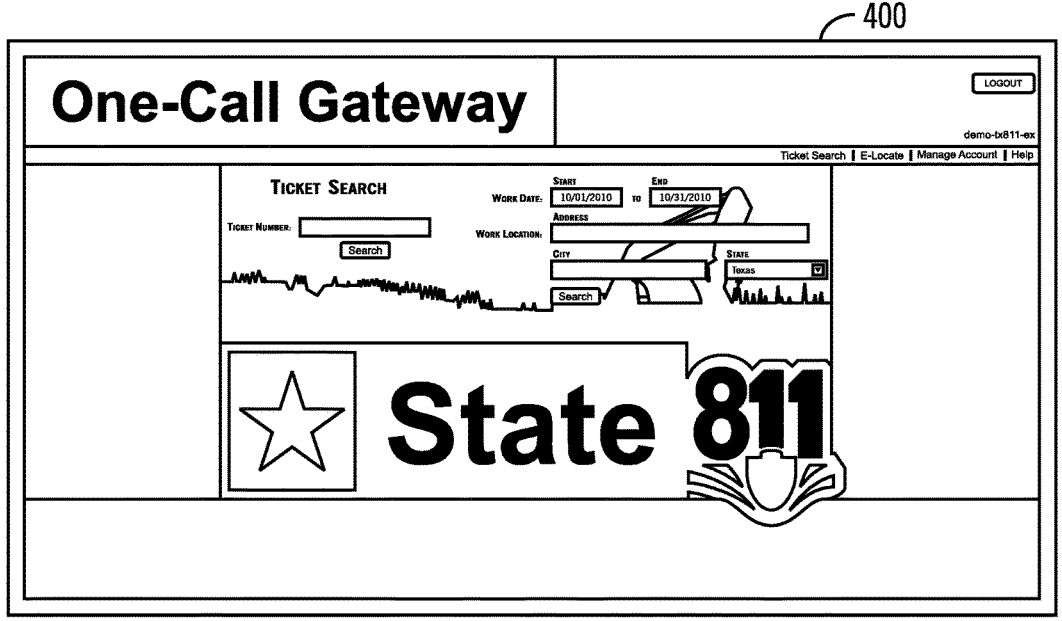
FIG. 4 is a screenshot of a user interface for performing a ticket search by a work date in accordance with certain embodiments. Also, a ticket search may be performed by location.

FIG. 4 is a screenshot 400 of a user interface for performing a ticket search by a work date in accordance with certain embodiments. Also, a ticket search may be performed by location.

Figure 5:
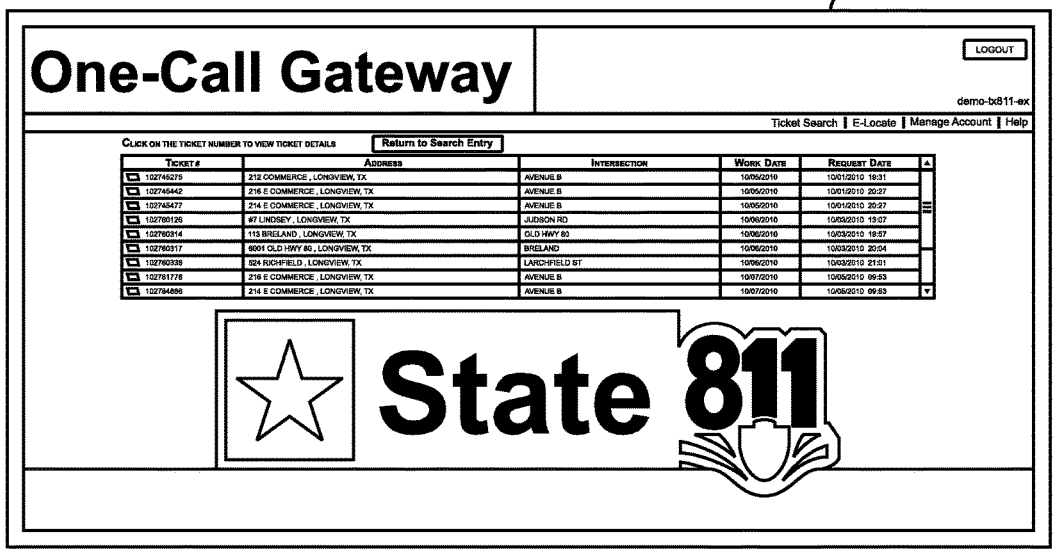
FIG. 5 is a screenshot of a user interface displaying data returned for a requested work date search in accordance with certain embodiments.

FIG. 5 is a screenshot 500 of a user interface displaying data returned for a requested work date search in accordance with certain embodiments.

Figure 6:
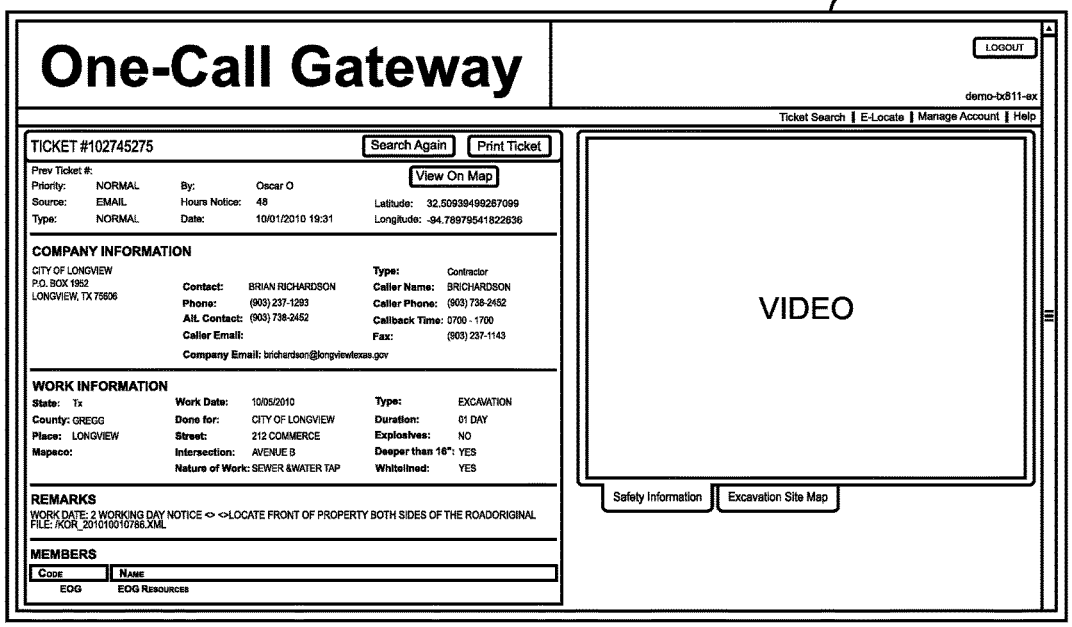
FIG. 6 is a screenshot of a user interface displaying data for a work request ticket listing: company information, work information, and remarks on the left side, and showing a safety video on the right side, with options for selecting "Safety Information" or "Excavation Site map" in accordance with certain embodiments.

FIG. 6 is a screenshot 600 of a user interface displaying data for a work request ticket listing: company information, work information, and remarks on the left side, and showing a safety video on the right side, with options for selecting "Safety Information" or "Excavation Site map" in accordance with certain embodiments.

Figures 7, 8:
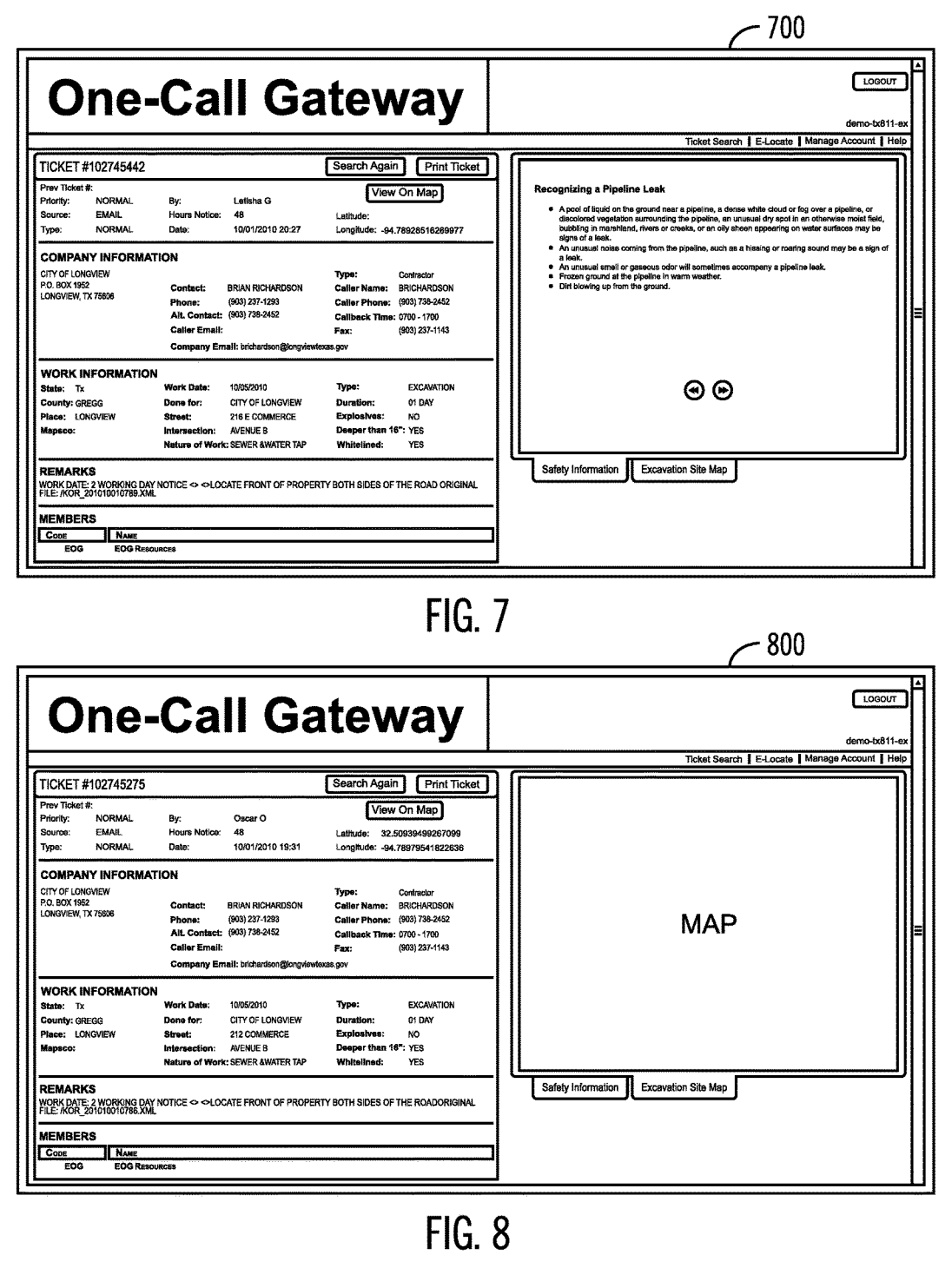

FIG. 7 is a screenshot 700 of a user interface for displaying data for a work request ticket listing company information, work information, and remarks on the left side, and showing safety and hazard information in text on the right side in accordance with certain embodiments.

FIG. 8 is a screenshot 800 of a user interface displaying data for a work request ticket listing company information, work information, and remarks on the left side, and listing a map of an excavation site on the right side in accordance with certain embodiments.

Figure 9:
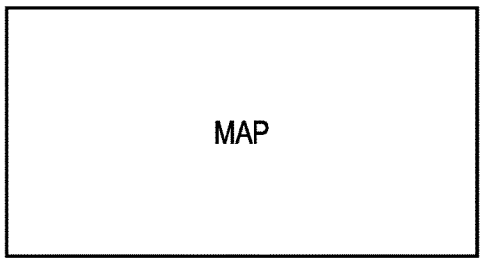
FIG. 9 is a screenshot of a user interface displaying more detailed data for a ticket request in accordance with certain embodiments.

FIG. 9 is a screenshot 900 of a user interface displaying more detailed data for a ticket request in accordance with certain embodiments.

FIG. 10 is a screenshot 1000a of a user interface requesting a user to input data for company information and contact information for creation of a geocode location and updated site information in accordance with certain embodiments.

FIG. 11 is a continuation of the screenshot 1000b of a user interface as shown in FIG. 10 requesting a user to input work information to be done and by whom to enable delivery of information to a requestor in accordance with certain embodiments.

FIG. 12 is a continuation of the screenshot 1000c of a user interface as shown in FIGS. 10 and 11 requesting the user to input work location information, including maps and latitude and longitude, to enable delivery of information to a requestor in accordance with certain embodiments.

FIG. 13 is a continuation of the screenshot 1000d of a user interface as shown in FIGS. 10, 11, and 12 requesting the user to input marking information and positive response information, including contact information for utility companies to notify and warning information, to enable delivery of information to a requestor in accordance with certain embodiments.

Figure 14:
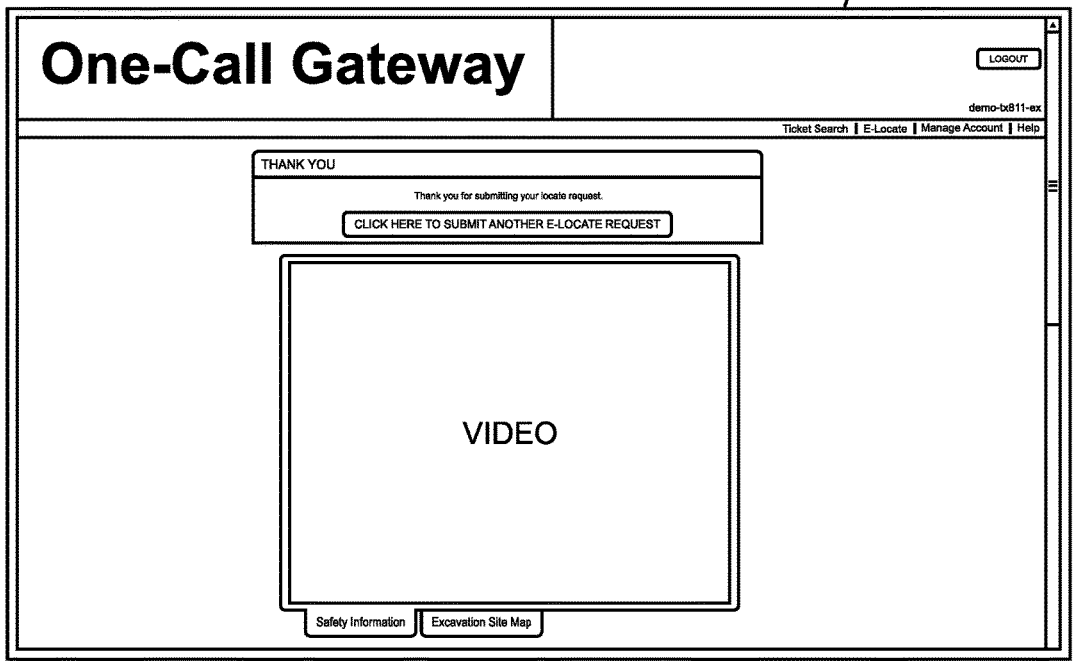
FIG. 14 is a screenshot of a user interface indicating that the ticket data has been submitted and saved for the location. that provides the user an option to read additional safety information, and that displays safety information in video form in accordance with certain embodiments.

FIG. 14 is a screenshot 1400 of a user interface indicating that the ticket data has been submitted and saved for the location. that provides the user an option to read additional safety information, and that displays safety information in video form in accordance with certain embodiments.

Figure 15:
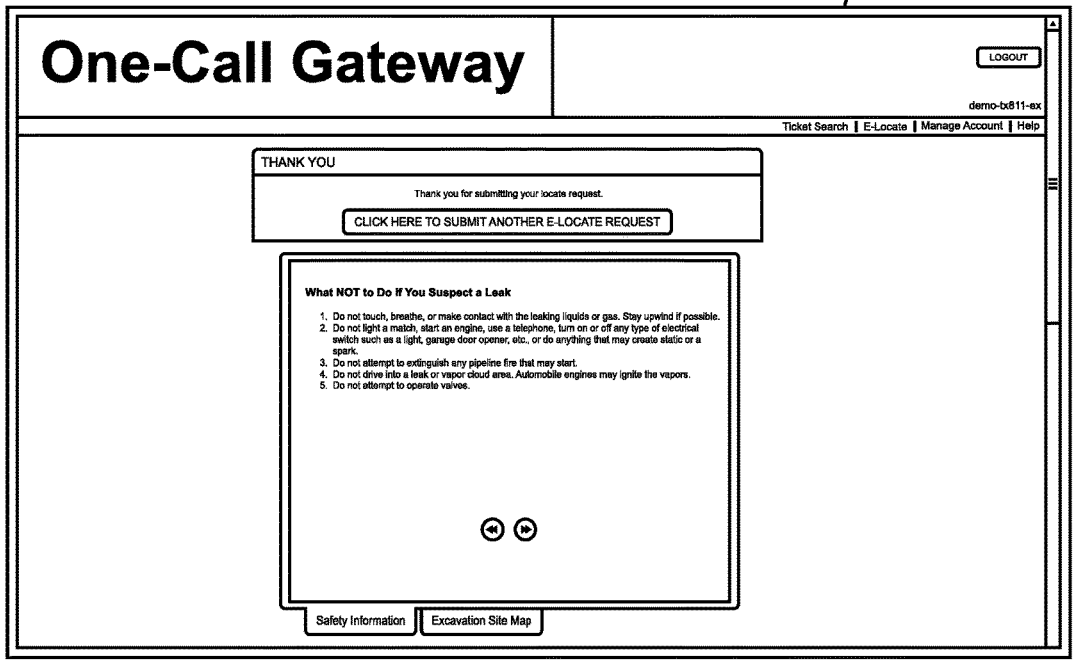
FIG. 15 is a screenshot of a user interface indicating that the ticket data has been submitted and saved for the location. that provides the user an option to read additional safety information, and that displays safety information in text form in accordance with certain embodiments.

FIG. 15 is a screenshot 1500 of a user interface indicating that the ticket data has been submitted and saved for the location. that provides the user an option to read additional safety information, and that displays safety information in text form in accordance with certain embodiments. For example, FIG. 15 illustrates information on what not to do if a leak is suspected.

Figure 16:
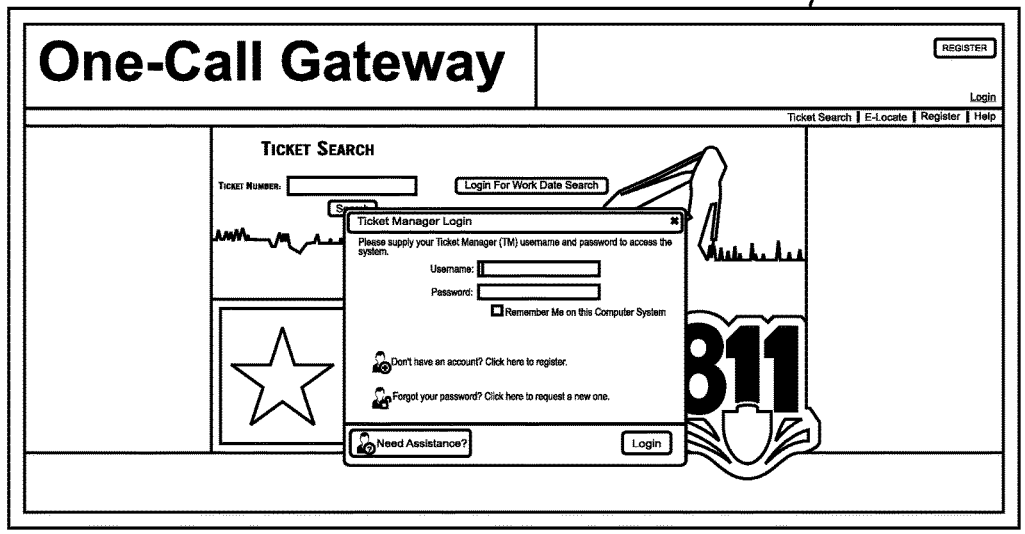
FIG. 16 is a screenshot of a user interface for logging into the NDS to input up to date information in accordance with certain embodiments.

FIG. 16 is a screenshot 1600 of a user interface for logging into the NDS 110 to input up to date information in accordance with certain embodiments.

Figure 17:
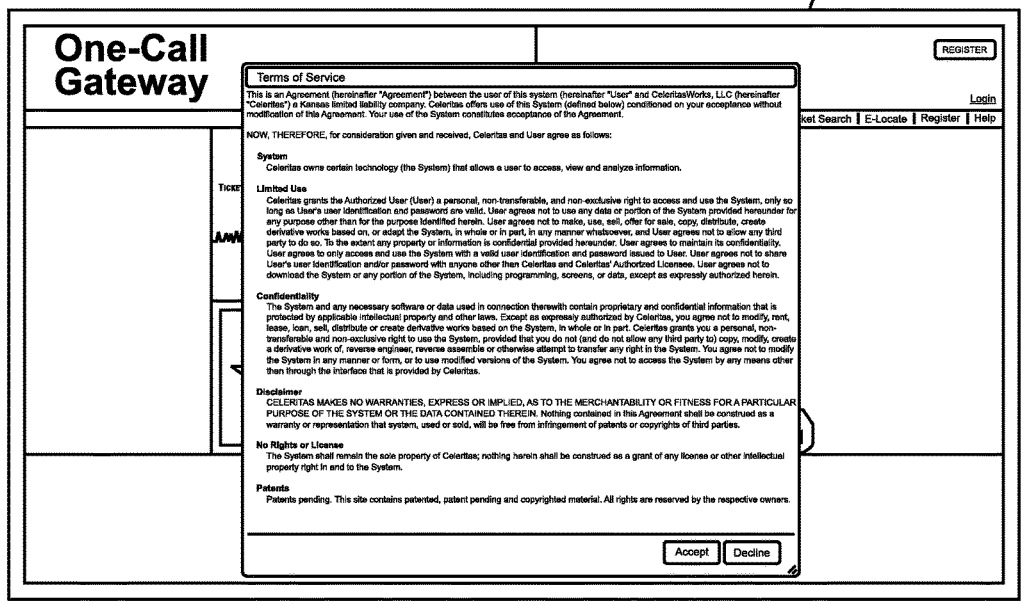
FIG. 17 is a screenshot of a user interface illustrating terms and conditions in accordance with certain embodiments.

FIG. 17 is a screenshot 1700 of a user interface illustrating terms and conditions in accordance with certain embodiments.

Figures 18, 19:
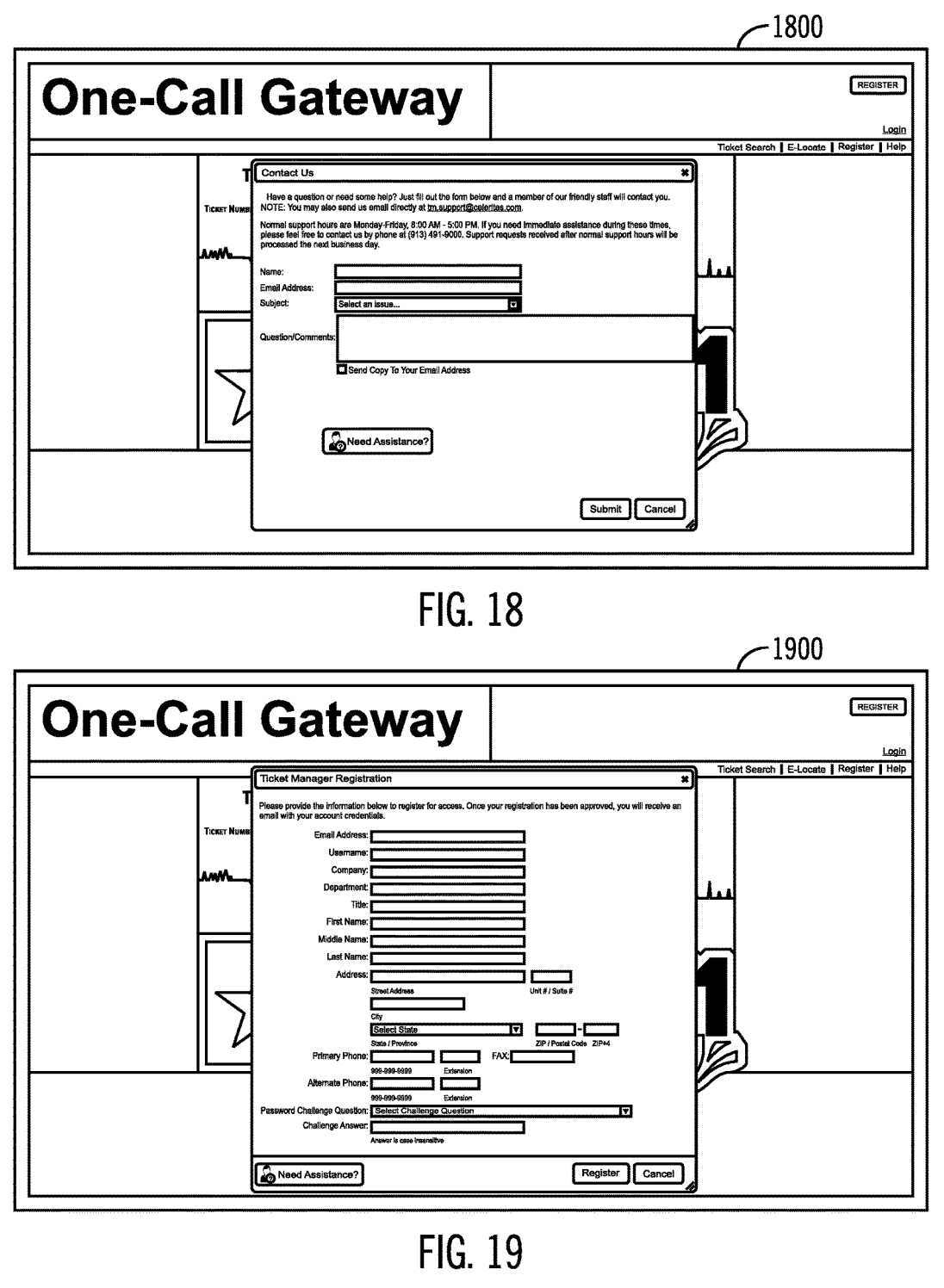

FIG. 18 is a screenshot 1800 of a user interface to enable a user to contact an NDS operator for assistance in accordance with certain embodiments.

FIG. 19 is a screenshot 1900 of a user interface allowing a user to input information to become a registered user of the NDS 110 in accordance with certain embodiments.

Figure 20:
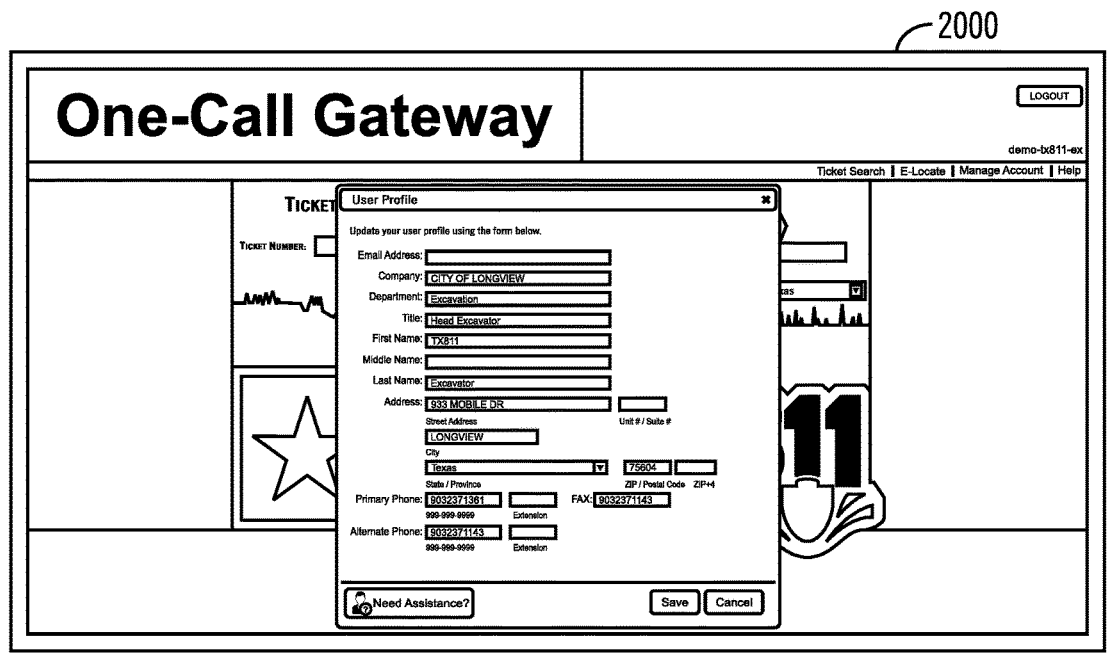
FIG. 20 is a screenshot of a user interface allowing a user to create a user profile in accordance with certain embodiments.

FIG. 20 is a screenshot 2000 of a user interface allowing a user to create a user profile in accordance with certain embodiments.

FIG. 21 illustrates an example of a positive response message 2100 with a safety message appended in accordance with certain embodiments. For example, the positive response message 2100 indicates that the operator has marked a location at which the operator has assets ("Marked").

FIG. 22 illustrates an example of a just-in-time positive response message 2200 in accordance with certain embodiments. For example, the just-in-time positive response message 2200 provides information on recognizing a pipeline leak. This allows an individual to be able to recognize a leak and take actions accordingly to avoid harm to people, animals, property, etc.

Stakeholder Data Capture

Figure 23:
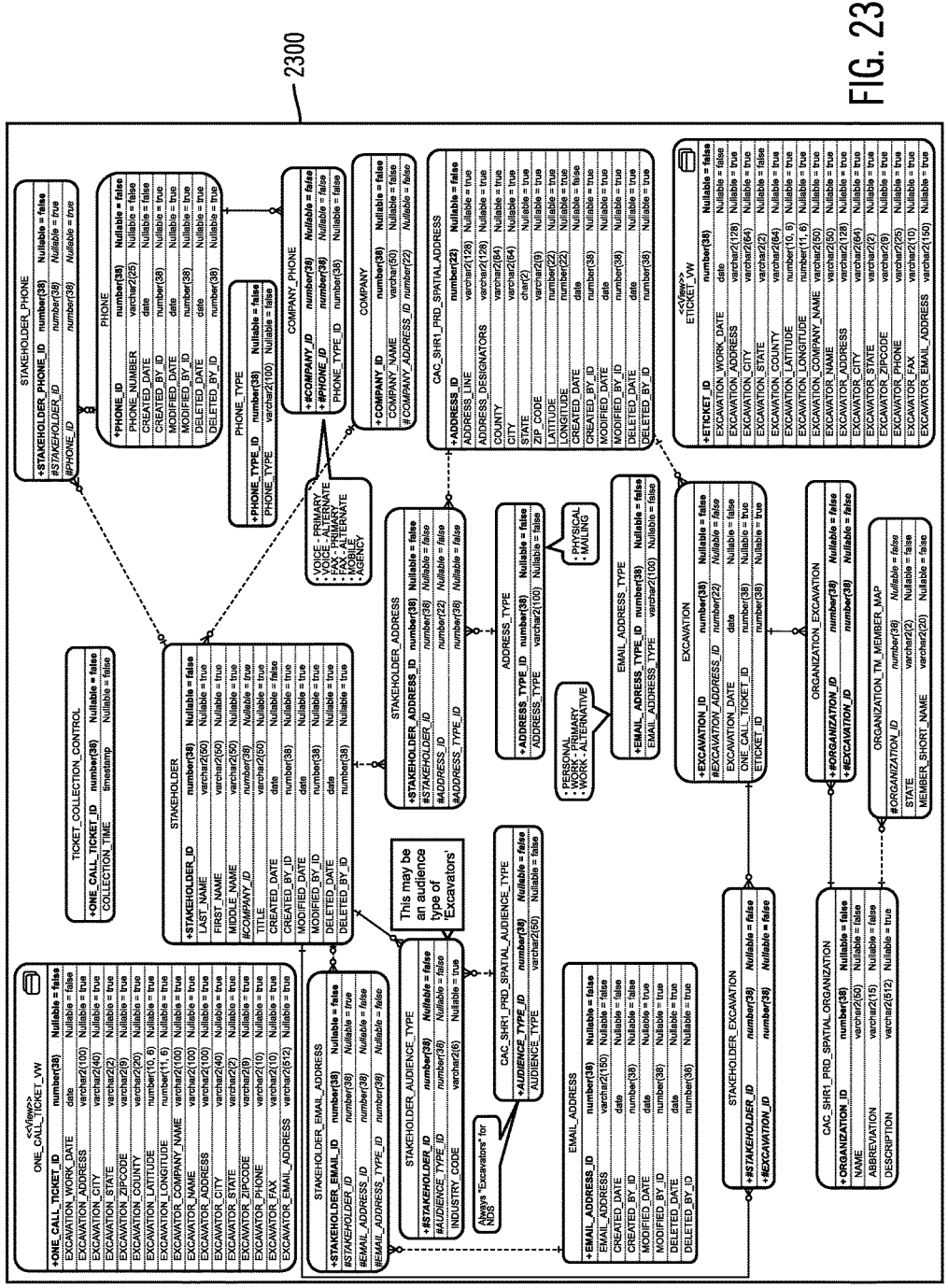
FIG. 23 illustrates tables used to import and store stakeholder information in accordance with certain embodiments.

The NDS 110 obtains stakeholder information (e.g., name, address, email, phone, facsimile, etc.) from one or more sources and stores this stakeholder information in the NDS data source 130. In certain embodiments, the one or more sources for the stakeholder information are ticket databases that hold ticket data. FIG. 23 illustrates tables 2300 used to import and store stakeholder information in accordance with certain embodiments. In certain embodiments, the stakeholder information may be standardized and duplicates may be eliminated. The stakeholder data capture subsystem 112 may import ticket data from one or more ticket databases on a regular basis (e.g., throughout the day with a set frequency, such as every five minutes).

In certain embodiments, collection of new tickets may be controlled through the TICKET_COLLECTION_CONTROL table. Every time a ticket data collection cycle is started, the current value of the ONE_CALL_TICKET_ID column may be used as the ID of the last ticket processed. Once the processing cycle is complete (i.e., new stakeholder data has been collected from unprocessed tickets), the ID value of the last ticket processed as well as the completion time of the collection cycle may be stored in the TICKET_COLLECTION_CONTROL table.

Stakeholder data may be obtained from the one-call ticket and member ticket views ONE_CALL_TICKET_VW and MEMBER_TICKET_VW respectively. These views reside in a database and access the respective associated ticket tables in different databases through database link synonyms. In certain embodiments, database link synonyms may be described as built-in facility within the database to access one disparate database from another.

FIG. 24 illustrates information 2400a, 2400b on tables illustrated in FIG. 23 in accordance with certain embodiments. FIG. 24 is formed by FIGS. 24A and 24B. The information 2400 includes the table name of each table in FIG. 23 and the purpose of each table with respect to import processing, Stakeholder contact information (company name, name, phone, facsimile and email) may be pulled from the ONE_CALL_TICKET_VW view.

Unique Stakeholder contact information (stakeholder full name and address associations) may be stored in the STAKEHOLDER table. Stakeholder names may be standardized using a StandardizedPersonName class. The standardized stakeholder names may be stored in uppercase. The stakeholders imported by the NDS 110 may be classified with a Stakeholders audience type.

If a Stakeholder does not exist for a given stakeholder address, a new stakeholder may be created; even if there is an existing ADDRESS record match. Multiple stakeholders who are located at the same address may be associated to a common ADDRESS record through the STAKEHOLDER_ADDRESS table. ADDRESS records are not duplicated.

Regardless of whether a new STAKEHOLDER record is created from a ticket or not, a new record may be created in the STAKEHOLDER_EXCAVATION table for every ticket processed. The data will represent a historical view of the ticket to stakeholder relationship and provide the date a given ticket was imported.

The stakeholder's company information may be stored in the COMPANY table and linked to the STAKEHOLDER via the COMPANY_ID column.

Figure 25:
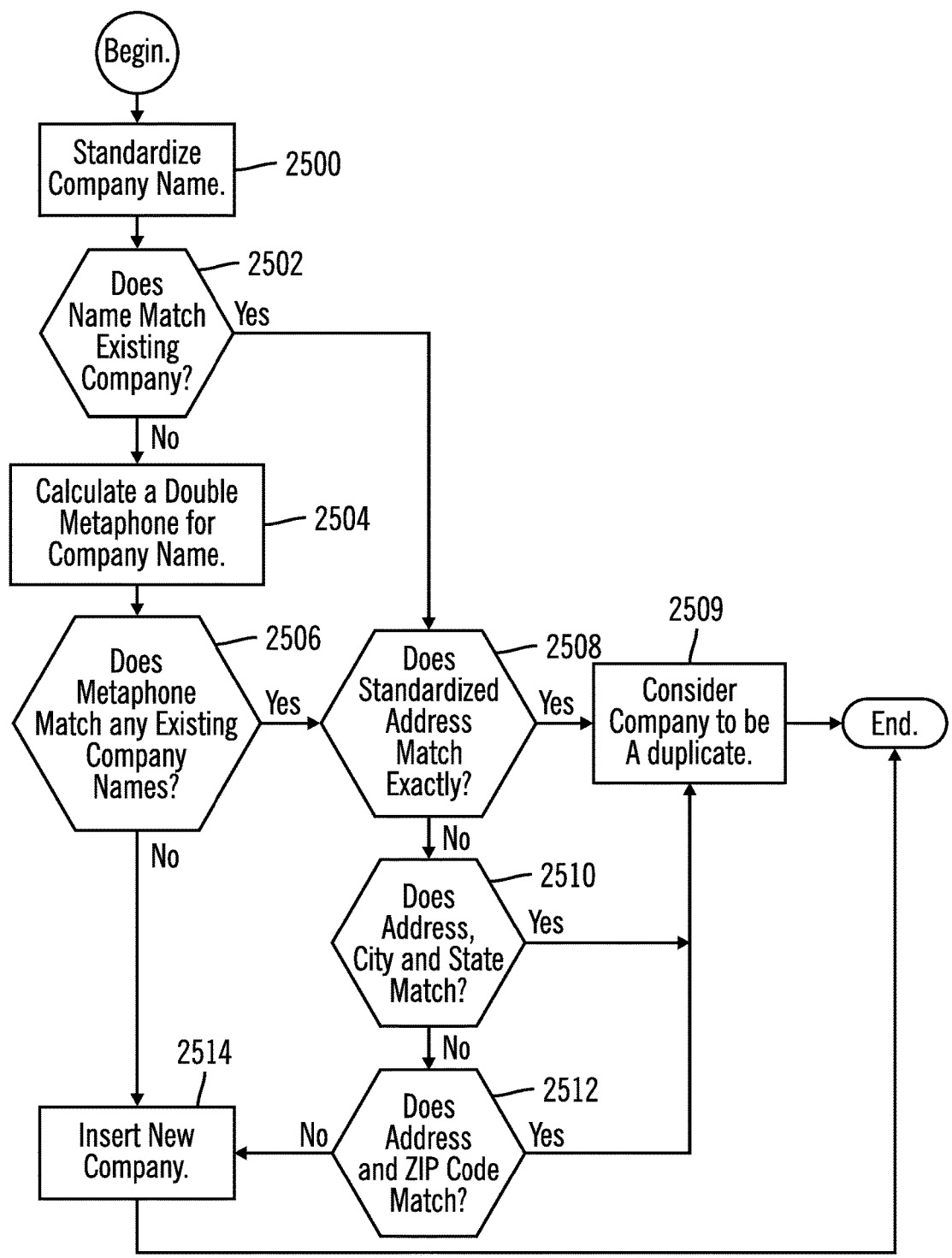
FIG. 25 illustrates, in a flow diagram, operations for duplicate company name detection in accordance with certain embodiments.

FIG. 25 illustrates a flow diagram for operations for duplicate company name detection in accordance with certain embodiments. In block 2500, the NDS 110 standardizes the company name. A StandardizedCompanyName class may be created to generate standardized company names. This class should provide a static method standardizeName that does the following:
1. Converts the name to uppercase.
2. Removes leading and trailing spaces. Removes extra internal spacing.
3. Abbreviates common company name components (e.g. "Incorporated" converted to "INC", "COMPANY" to "CO", "L L C" to "LLC", "SVC" to "SERVICE", "SVCS" to "SERVICES", "CO OP" to "COOP", "COOPERATIVE" to "COOP", etc.).
4. Removes periods.
5. Replaces occurrences of "," (comma followed by a space) with " " (a single space).

The NDS 110 avoids duplicating company information. In block 2502, the NDS 110 determines whether the company name matches an existing company name. If so, processing continues to block 2508, otherwise, processing continues to block 2504. Thus, if a company name does not match exactly to any existing company name, in block 2504, the NDS 110 compares the company name's double metaphone encoding to that of existing companies to try to find a match. A double metaphone encoding can be calculated with various techniques. In block 2506, the NDS 110 determines whether there is a match based on the double metaphone encode. If so, processing continues to block 2508, otherwise, processing continues to block 2514.

In block 2508, the NDS 110 determines whether the address matches exactly. If so, processing continues to block 2509, otherwise, processing continues to block 2512. In block 2509, the NDS 110 considers the company name to be a duplicate of an existing company name.

If a match on the company name cannot be found, but a match on street address, city and state (block 2510) or a match on street address and zip code (block 2512) can be found, the NDS 110 uses the double metaphone encoding of both company names to determine whether the companies can be considered duplicates.

Otherwise, if there is no match of the company name to an existing company name, the NDS 110 inserts a new company (block 2514).

A unique constraint on COMPANY.COMPANY_NAME is for unique company names. The phone number associated with the stakeholder may be stored as a COMPANY_PHONE. If a new company phone number is encountered, any existing VOICE—PRIMARY company phone number may be switched to a VOICE—ALTERNATE number, and the new number may become the primary voice number. For newly created COMPANY records, the stakeholder's address associated with the ticket may be stored as the company address via the COMPANY_ADDRESS_ID column.

Unique email addresses for a given stakeholder may be stored in the STAKEHOLDER_EMAIL_ADDRESS table. Any different (unique) email address for a stakeholder may be assumed to be classified as the WORK—PRIMARY address. If an existing WORK—PRIMARY email address already exists for the stakeholder, that email address may be switched to a WORK—ALTERNATE type, and the newer email address may become the WORK—PRIMARY address. A stakeholder may have many unique WORK—ALTERNATE email addresses, but one WORK—PRIMARY email address. In certain embodiments, the NDS 110 does not duplicate email addresses within a given stakeholder, regardless of type. In other words, the NDS 110 does not create duplicate email addresses for stakeholders which are of a different EMAIL_ADDRESS_TYPE.

Unique facsimile numbers for a given stakeholder may be stored in the STAKEHOLDER_PHONE table. New unique facsimile numbers may be stored with a PHONE_TYPE type of facsimile—PRIMARY. If there is an existing unique facsimile—PRIMARY type phone number for the stakeholder, it should reclassified to a type of facsimile—ALTERNATE. A stakeholder may have many unique facsimile—ALTERNATE phone numbers, but one facsimile—PRIMARY phone number. In certain embodiments, the NDS 110 does not duplicate phone numbers for a given stakeholder, regardless of type.

Unique voice numbers for a given stakeholder may be stored in the STAKEHOLDER_PHONE table. New unique voice numbers may be stored with a PHONE_TYPE type of VOICE—PRIMARY. If there is an existing unique VOICE—PRIMARY type phone number for the stakeholder, it should reclassified to a type of VOICE—ALTERNATE. A stakeholder may have many unique VOICE—ALTERNATE phone numbers, but one VOICE—PRIMARY phone number. In certain embodiments, the NDS 110 does not duplicate phone numbers for a given stakeholder, regardless of type.

Unique stakeholder address information may be stored in the STAKEHOLDER_ADDRESS table. Upon import, Stakeholder addresses may be standardized using the exiting StandardizedAddress class. If the standardized stakeholder address does not already exist in the ADDRESS table, a new record is created. Standardized addresses may be stored in uppercase. Each new address is classified as a Mailing Address (ADDRESS_TYPE of MAILING'). The stakeholder relationship to this address is stored in the STAKEHOLDER_ADDRESS table.

The stakeholder address information may be pulled from the ONE_CALL_TICKET_VW view.

Figure 26:
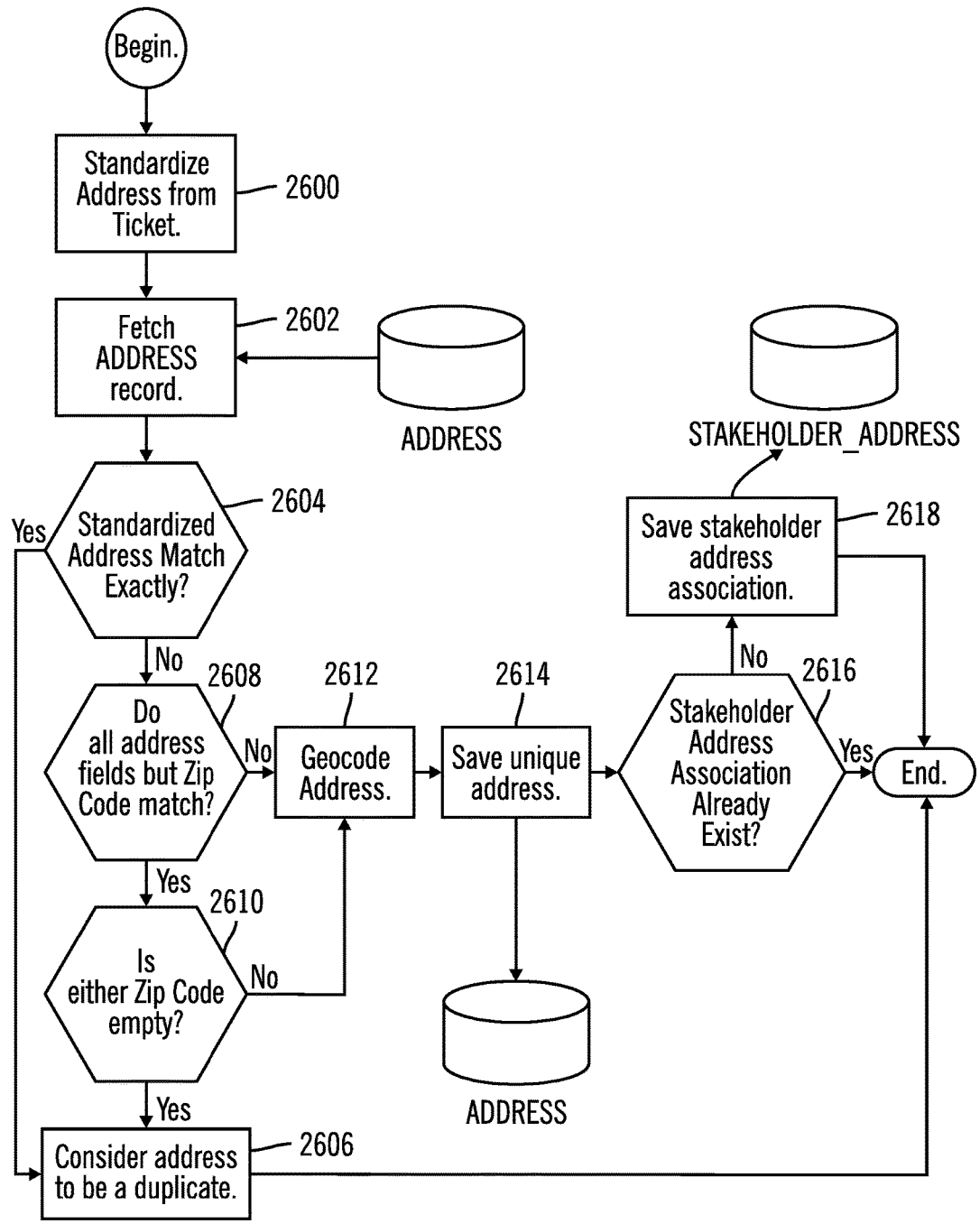
FIG. 26 illustrates, in a flow diagram, operations for stakeholder address collection in accordance with certain embodiments.

FIG. 26 illustrates, in a flow diagram, operations for stakeholder address collection in accordance with certain embodiments. Control begins at block 2600 with the NDS 110 standardizing an address from a ticket. In block 2602, the NDS 110 fetches an address record on which to perform matching from a data store. In block 2604, the NDS 110 determines whether the standardized address matches exactly. If so, processing continues to block 2606, otherwise, processing continues to block 2608. In block 2606, the NDS 110 considers the address to be a duplicate.

In block 2608, the NDS 110 determines whether the address fields other than the zipcode match. If so, processing continues to block 2610, otherwise, processing continues to block 2612. In block 2610, the NDS 110 determines whether either zipcode is empty. If so, processing continues to block 2612, otherwise, processing continues to block 2606. In block 2612, the NDS 110 geocodes the address. In block 2614, the NDS 110 saves the unique address in a data store. In block 2616, the NDS 110 determines whether the stakeholder address association already exists. If so, processing ends, otherwise, processing continues to block 2618. In block 2618, the NDS 110 saves the stakeholder address association in a data store. The stakeholder address association may be described as a relationship of the stakeholder to an address. A stakeholder may be associated with one or more addresses, and one address may be associated with one or more stakeholders.

Communication Scheduling

Communication scheduling involves scheduling communications to various stakeholder groups such that the desired communications are delivered to the appropriate stakeholders at the desired time.

Figure 27:
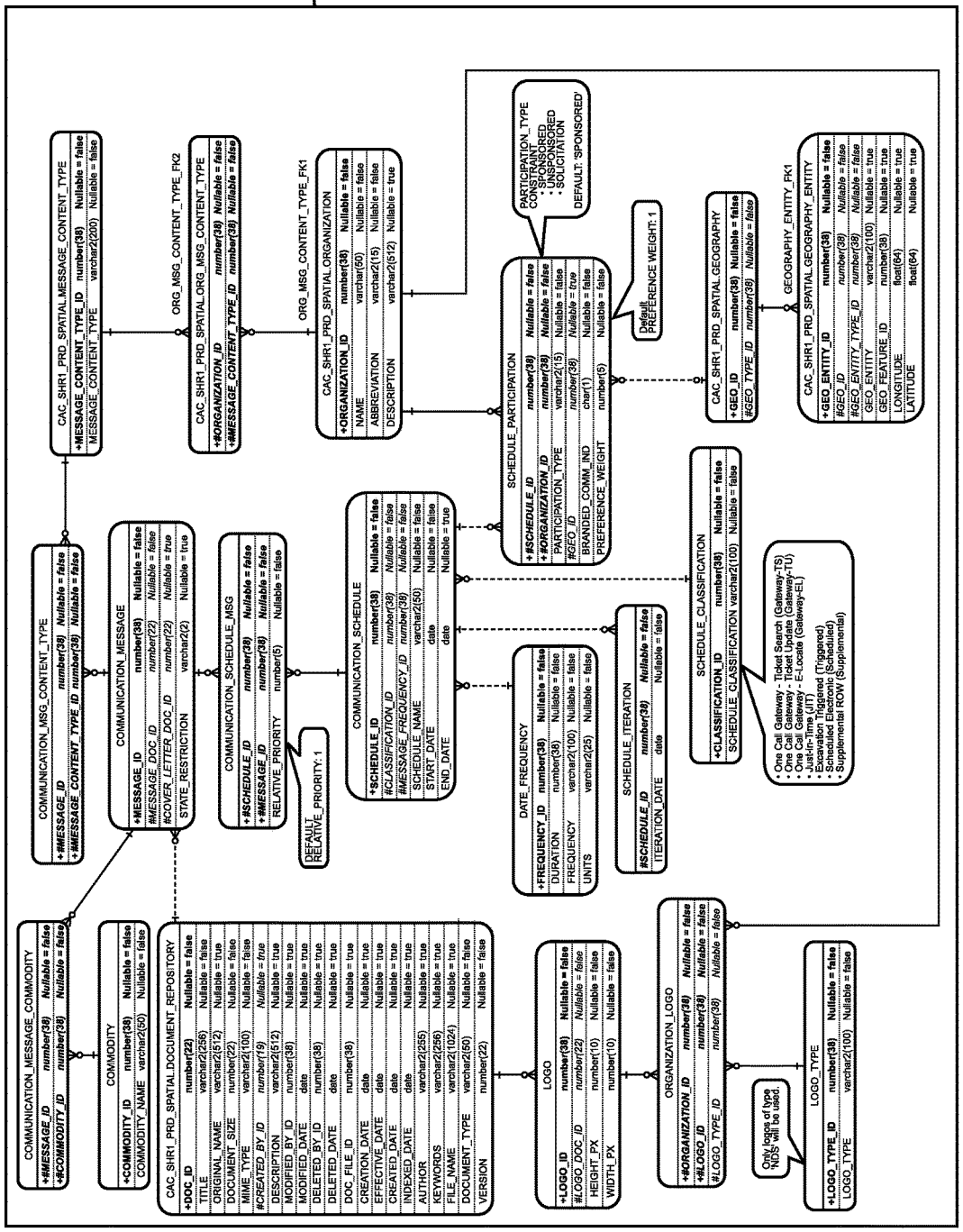
FIG. 27 illustrates tables used to support communication scheduling and delivery in accordance with certain embodiments.

In certain embodiments, the schedule database tables provide the means for controlling the following: message content, delivery frequency, inclusion of customer logos, and association of message to asset geography. FIG. 27 illustrates tables 2700 used to support communication scheduling and delivery in accordance with certain embodiments.

Figure 29:
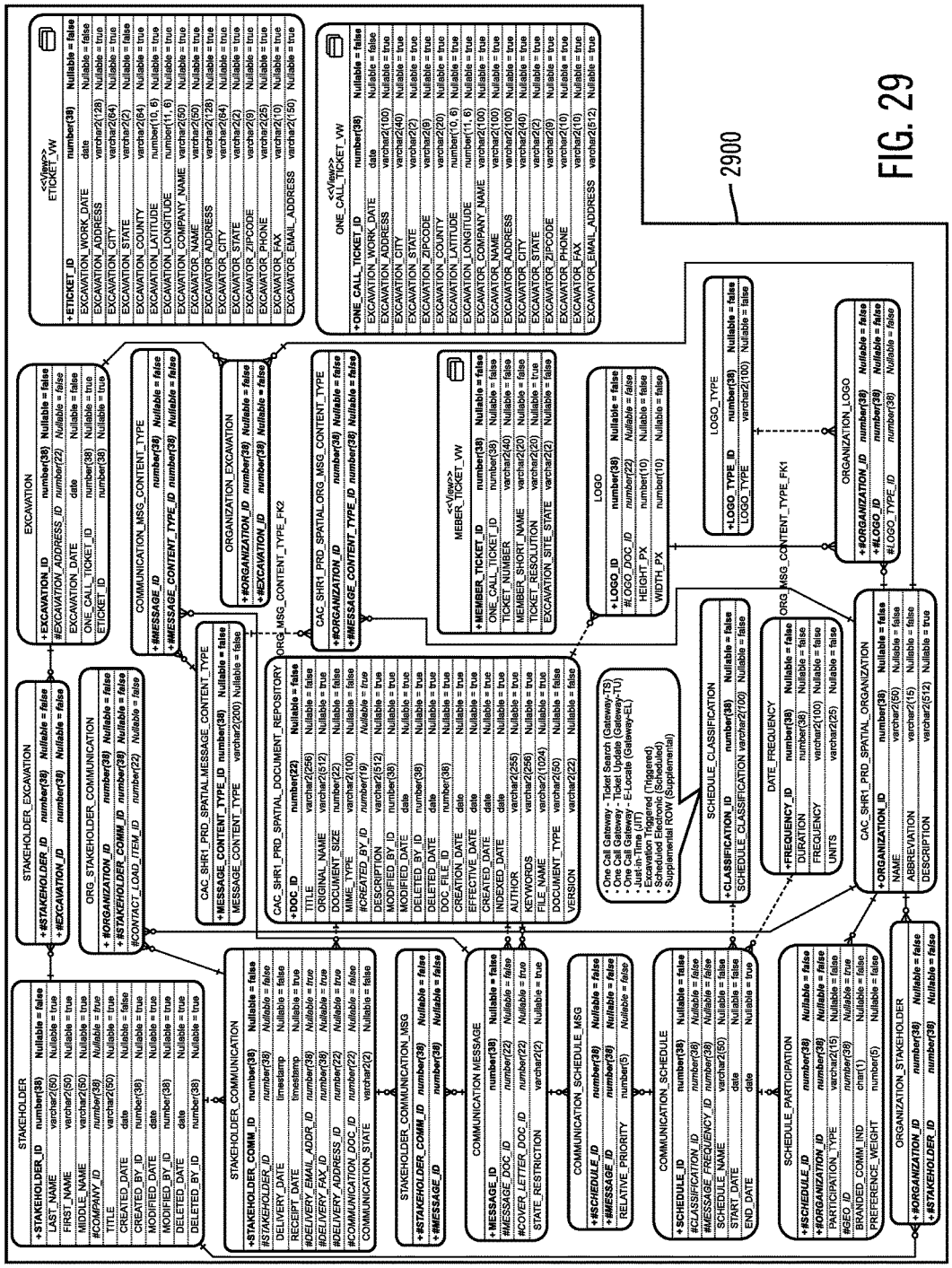
FIG. 29 illustrates tables used for communication delivery in accordance with certain embodiments.

FIG. 28 illustrates information 2800a, 2800b, 2800c on tables illustrated in FIG. 27 in accordance with certain embodiments. FIG. 28 is formed by FIGS. 28A, 28B, and 28C. The information 2800 includes the table name of each table in FIG. 27 and the purpose of each table with respect to communication scheduling, Communication Delivery Communication delivery includes the selection and delivery of safety and damage prevention messages to stakeholders (e.g., to excavators who are or have excavated near the centerline assets of a sponsoring operator). FIG. 29 illustrates tables 2900 used for communication delivery in accordance with certain embodiments.

One-Call Gateway Safety Message Delivery (One-Call Gateway)

Messages for the one-call gateway class of communication may be delivered to stakeholders as part of their interaction with the ticket search, ticket update or ticket creation components of the one-call gateway. The one-call gateway messages may be in the form of short videos, HTML text messages, etc. When the NDS 110 selects a message for delivery to the one-call gateway, certain types of messages (e.g., video messages) may be given a higher priority than other types of messages in a random selection process.

Figure 30:
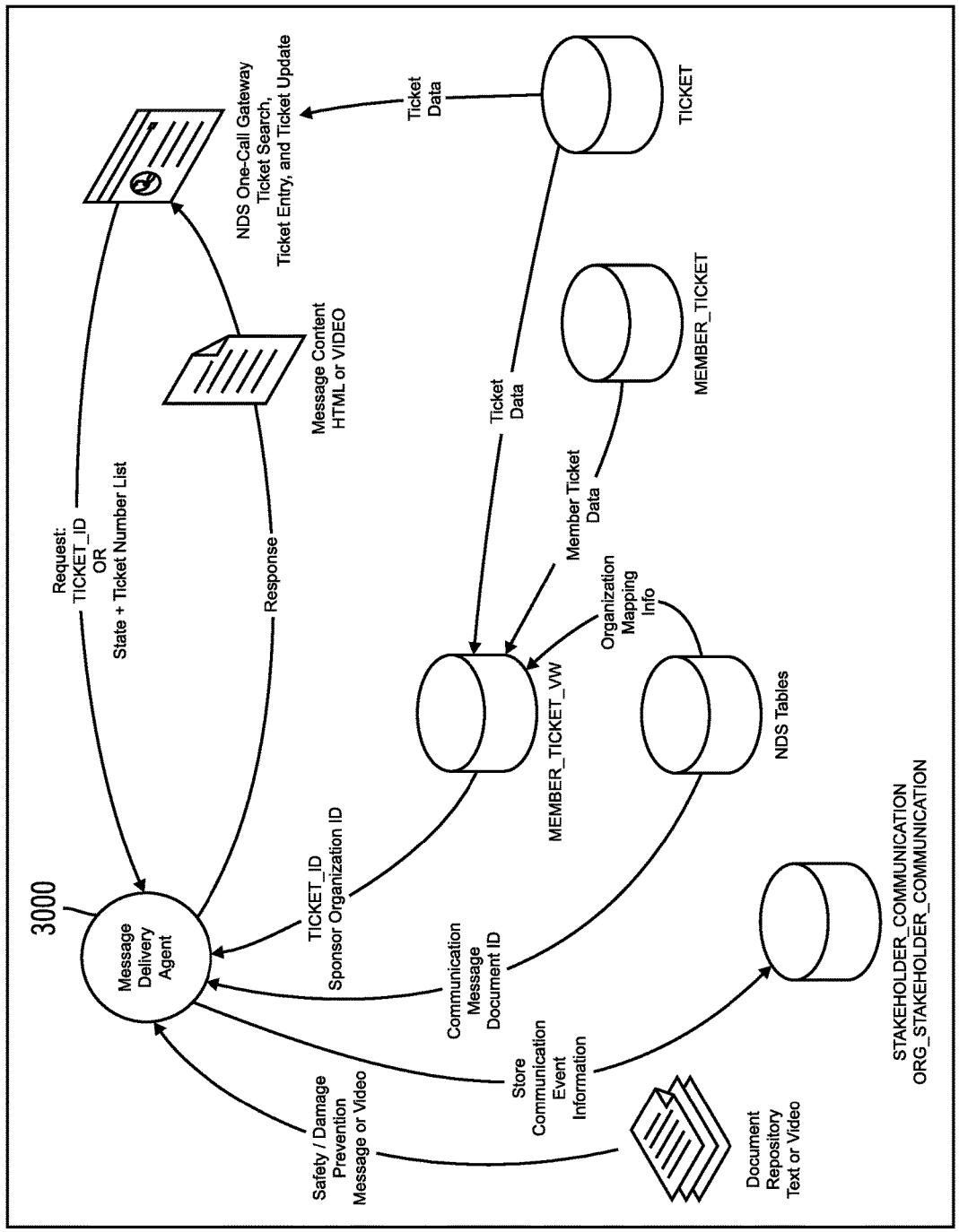
FIG. 30 illustrates flow of data and processing involving a message delivery agent when a request for a message is being made from the one in accordance with certain embodiments.

FIG. 30 illustrates flow of data and processing involving a message delivery agent when a request for a message is being made by the one-call gateway in accordance with certain embodiments. In FIG. 30, a message delivery agent 3000 of the NDS 110 receives a request, and, in response to the request, delivers a response with message content to a stakeholder at the one-call gateway. The request and/or response may be sent using Representational State Transfer (REST) over Hypertext Transfer Protocol (HTTP)

Ticket Search Messages

The message content may be delivered to the ticket search component whenever a user displays the details of a specific ticket (i.e., when a user searches for a ticket). The ticket search component initiates the request for a message. In certain embodiments, the ticket search component allows both authenticated and unauthenticated users to display ticket details.

Regardless of whether the one-call gateway user is authenticated or not, any one-call gateway message delivery completed via the ticket search component may be attributed to the stakeholder associated with the ticket being displayed.

For message requests from the ticket search component, the message delivery agent determines what message (if any) may be delivered for a ticket display operation.

Figure 31:
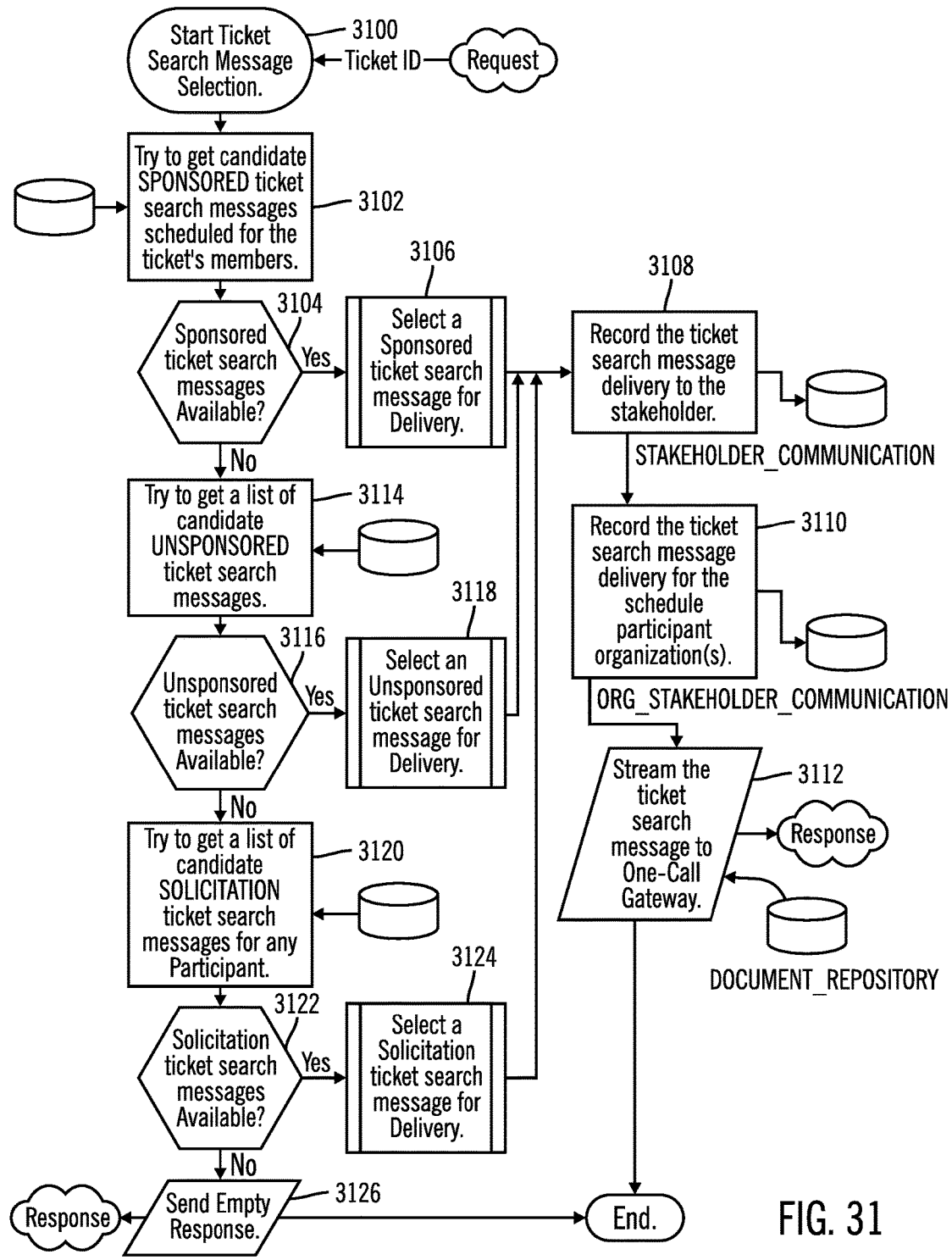
FIG. 31 illustrates, in a flow diagram, operations for determining which ticket search message to deliver for display at the one-call gateway in accordance with certain embodiments.

FIG. 31 illustrates, in a flow diagram, operations for determining which ticket search message to deliver for display at the one-call gateway in accordance with certain embodiments. Control begins at block 3100 when a request is received with a ticket identifier (ID) from a user performing a ticket search from the one-call gateway, and ticket search message selection begins. The one-call gateway assigns a unique ticket ID to each ticket.

A sponsored message (e.g., a safety message) may be described as one for which an operator pays. An unsponsored message (e.g., a safety message) may be described as one for which no operator is paying. A solicitation may described as an advertisement.

In certain embodiments message content type is taken into consideration when choosing a message for delivery to avoid sending two messages in a row which contain the same message content. For example, the NDS 110 avoids sending two messages in a row which contain "Call Before You Dig" message content.

In block 3102, the NDS 110 tries to get candidate sponsored ticket search messages scheduled for the ticket's members.

For example, the members may be companies that have assets that are affected by an excavation recorded on the ticket. In block 3104, the NDS 110 determines whether sponsored ticket search messages are available. If so, processing continues to block 3106, otherwise, processing continues to block 3114.

In block 3106, the NDS 110 selects a sponsored ticket search message for delivery. In certain embodiments, a ticket search message is selected within the schedule based on the priority of the ticket search message and the number of members sponsoring the same ticket search message, while trying to avoid sending the same ticket search message more than once. If a ticket search message is repeated, it may be repeated in a round-robin order. Also, the schedule ticket search messages at the same priority may be randomly chosen.

In block 3108, the NDS 110 records the ticket search message delivery to the stakeholder. In block 3110, the NDS 110 records the ticket search message delivery for one or more schedule participant organizations. In certain embodiments, for unsponsored and solicitation type ticket search messages, the communication may be attributed to the organization associated with the schedule participant. Participant organizations (as referenced as sponsors) may be described as organizations that participate in a communications schedule. By participating, they are sponsoring the ticket search messages which will be delivered. For example, participating organizations may be pipeline operators. Ticket search messages from the schedule may be chosen based on the organizations that participate in the schedule and the geographical relationship of the triggering activity (e.g., excavation) to the organizations' assets.

In the case of unsponsored type ticket search messages, a schedule participant may be described as an interested party that is not necessarily directly related to the activity (e.g., excavation) that triggered the communication. In the case of solicitation type ticket search messages, a schedule participant may be described as an organization wishing to advertise to the targets of the ticket search messages. In this case, the ticket search message is an advertisement.

In block 3112, the NDS 110 streams the ticket search message (e.g., HTML text, a video via URL, etc.) to the one-call gateway.

In block 3114, the NDS 110 tries to get a list of candidate unsponsored ticket search messages. In block 3116, the NDS 110 determines whether unsponsored ticket search messages are available. If so, processing continues to block 3118, otherwise, processing continues to block 3120. In block 3118, the NDS 110 selects an unsponsored ticket search message for delivery. In certain embodiments, a ticket search message is selected among all of the unsponsored schedules based on the RELATIVE_PRIORITY of the ticket search message, while trying to avoid sending the same ticket search message more than once. If a ticket search message is repeated, it may be repeated in a round-robin order. Also, the schedule ticket search messages at the same priority may be randomly chosen. From block 3118, processing continues to block 3108.

In block 3120, the NDS 110 tries to get a list of candidate solicitation ticket search ticket search messages for any participant (i.e., any sponsor that is advertising to the stakeholders via the ticket search messages being communicated). In block 3122, the NDS 110 determines whether solicitation ticket search messages are available. If so, processing continues to block 3124, otherwise, processing continues to block 3126. In block 3124, the NDS 110 selects a solicitation message for delivery. In certain embodiments, a ticket search message is selected among all of the solicitation schedules based on the RELATIVE_PRIORITY multiplied by PREFERENCE_WEIGHT of the ticket search message, while trying to avoid sending the same ticket search message more than once. If a ticket search message is repeated, it may be repeated in a round-robin order. Also, the schedule ticket search messages at the same priority may be randomly chosen. From block 3118, processing continues to block 3108.

In block 3126, the NDS 110 sends an empty response.

In certain embodiments, Structured Query Language (SQL) queries may be used to model the database access needed to retrieve candidate ticket search messages for sponsored, unsponsored and solicitation class messages for the ticket search message selection process.

Ticket Entry Messages

The message content may be delivered to the ticket entry component when the user successfully completes the request entry (as part of the presentation of the confirmation screen). Users are authenticated to utilize the ticket entry component. In certain embodiments, ticket entry requests result in the generation of a dig ticket, and ticket entry requests may be imported into the NDS excavation related tables at the time the ticket entry is completed to allow for immediate message attribution to the stakeholder associated with the ticket entry request.

Figure 32:
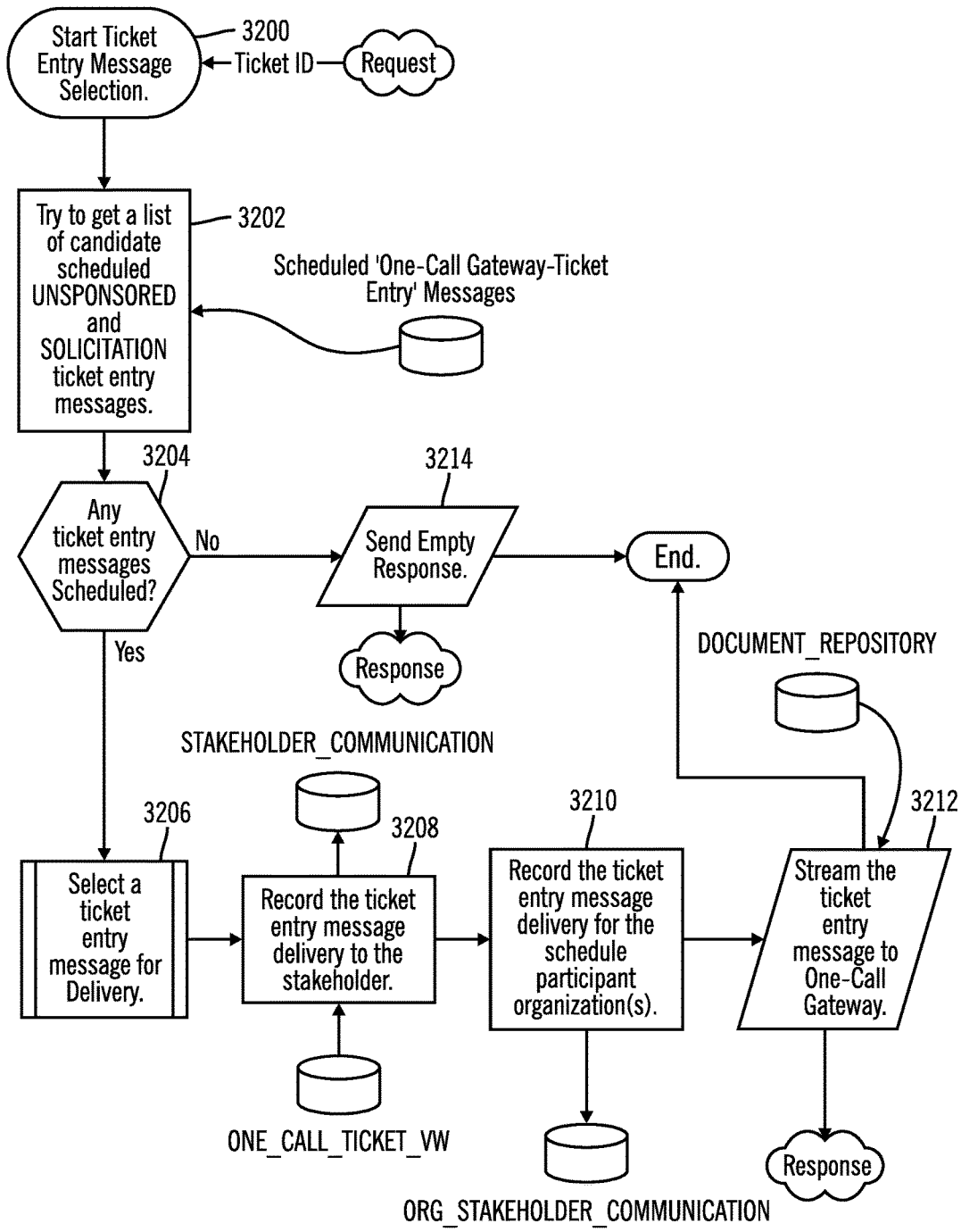
FIG. 32 illustrates, in a flow diagram, operations for determining which ticket entry message to deliver for display at the one-call gateway in accordance with certain embodiments.

FIG. 32 illustrates, in a flow diagram, operations for determining which ticket entry message to deliver for display at the one-call gateway in accordance with certain embodiments. Control begins at block 3200 when a request with a ticket identifier (ID) is received from the one-call gateway from a user performing a ticket entry, and the ticket entry message selection begins. In certain embodiments, such a ticket that is created may be referred to as an eticket, and a ticket entry message may also be referred to as an e-locate ticket message. In block 3202, the NDS 110 tries to get a list of candidate, scheduled unsponsored and solicitation ticket entry messages. In block 3204, the NDS 110 determines whether any ticket entry messages are scheduled. If so, processing continues to block 3206, otherwise, processing continues to block 3214. In block 3206, the NDS 110 selects a ticket entry message for delivery. In certain embodiments, ticket entry messages are sent in priority order, while trying to avoid sending ticket entry messages that have already been distributed to the associated stakeholder. If all scheduled ticket entry messages have already been sent, the least recently distributed message may be sent first.

In block 3208, the NDS 110 records the ticket entry message delivery to the stakeholder. In block 3210, the NDS 110 records the ticket entry message delivery for one or more schedule participant organizations. In certain embodiments, ticket entry messages displayed by the ticket entry component are not branded with logos. In block 3212, the NDS 110 streams the ticket entry message (e.g., HTML text, a video via URL, etc.) to the one-call gateway. In block 3214, the NDS 110 sends an empty response.

In certain embodiments SQL queries may be used queries may be used to model the database access needed to retrieve candidate ticket entry messages for unsponsored and solicitation class messages for the ticket entry message selection process.

Ticket Update Messages

The message content may be delivered to a one-call gateway ticket update component when a user successfully completes the update request entry (as part of the presentation of the confirmation screen). User may be authenticated to utilize the ticket update component. Message delivery attribution may be given to the authenticated user. In such cases, the user has a stakeholder record and may be associated, as a stakeholder, to every one of the tickets included in the update request. The NDS 110 avoids duplicating stakeholders and/or duplicating STAKEHOLDER associations (e.g., the STAKEHOLDER_EXCAVATION association). In certain embodiments, one STAKEHOLDER_COMMUNICATION may be recorded for all tickets referenced in the update request.

Figure 33:
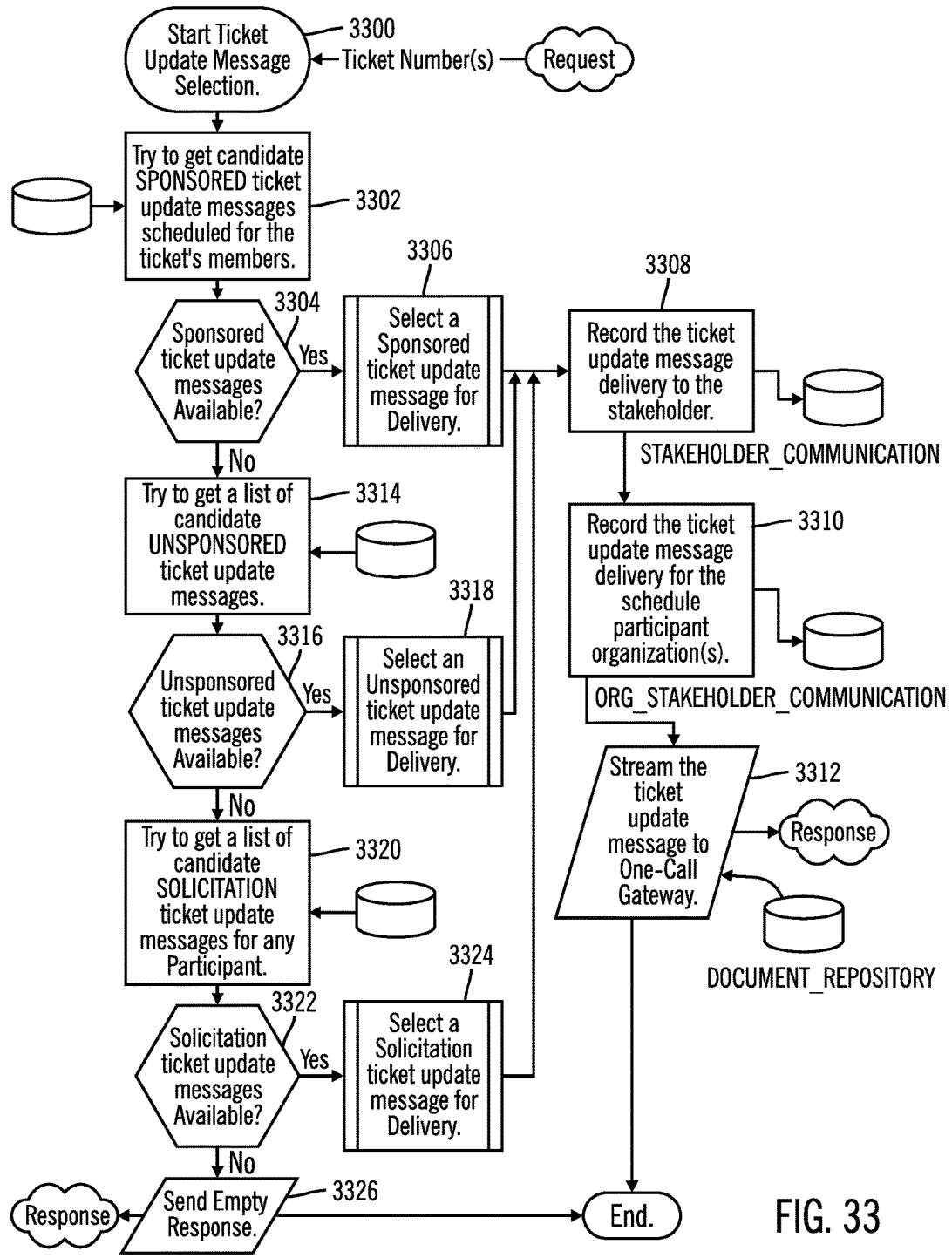
FIG. 33 illustrates, in a flow diagram, operations for determining which ticket update message to deliver for display at the one-call gateway in accordance with certain embodiments.

FIG. 33 illustrates, in a flow diagram, operations for determining which ticket update message to deliver for display at the one-call gateway in accordance with certain embodiments. Control begins at block 3300 when a request is received with a one-call ticket identifier (ID) from a user performing a ticket, and ticket update message selection begins.

In block 3302, the NDS 110 tries to get candidate sponsored ticket update messages scheduled for the ticket's members. In certain embodiments, the NDS 110 looks for at least one sponsored ticket update message for any of the members associated with any of the tickets being updated at the same time. In block 3304, the NDS 110 determines whether sponsored ticket update messages are available. If so, processing continues to block 3306, otherwise, processing continues to block 3314.

In block 3306, the NDS 110 selects a sponsored ticket update message for delivery. In certain embodiments, a ticket update message is selected within the schedule based on the priority of the ticket update message and the number of members sponsoring the same ticket update message, while trying to avoid sending the same ticket update message more than once. If a ticket update message is repeated, it may be repeated in a round-robin order. Also, the schedule ticket update messages at the same priority may be randomly chosen.

In block 3308, the NDS 110 records the ticket update message delivery to the stakeholder. In block 3310, the NDS 110 records the ticket update message delivery for one or more schedule participant organizations. In certain embodiments, for unsponsored and solicitation type ticket update messages, the communication may be attributed to the organization associated with the schedule participant. In block 3312, the NDS 110 streams the ticket update message (e.g., HTML text, a video via URL, etc.) to the one-call gateway.

In block 3314, the NDS 110 tries to get a list of candidate unsponsored ticket update messages. In block 3316, the NDS 110 determines whether unsponsored ticket update messages are available. If so, processing continues to block 3318, otherwise, processing continues to block 3320. In block 3318, the NDS 110 selects an unsponsored ticket update message for delivery. In certain embodiments, a ticket update message is selected among all of the unsponsored schedules based on the RELATIVE_PRIORITY of the ticket update message, while trying to avoid sending the same ticket update message more than once. If a ticket update message is repeated, it may be repeated in a round-robin order. Also, the schedule ticket update messages at the same priority may be randomly chosen. From block 3318, processing continues to block 3308.

In block 3320, the NDS 110 tries to get a list of candidate solicitation ticket update messages for any participant. In block 3322, the NDS 110 determines whether solicitation ticket update messages are available. If so, processing continues to block 3324, otherwise, processing continues to block 3326. In block 3324, the NDS 110 selects a solicitation ticket update message for delivery. In certain embodiments, a ticket update message is selected among all of the solicitation schedules based on the RELATIVE_PRIORITY multiplied by PREFERENCE_WEIGHT of the ticket update message, while trying to avoid sending the same ticket update message more than once. If a ticket update message is repeated, it may be repeated in a round-robin order. Also, the schedule ticket update messages at the same priority may be randomly chosen. From block 3318, processing continues to block 3308.

In block 3326, the NDS 110 sends an empty response.

In certain embodiments, SQL queries may be used to model the database access needed to retrieve candidate ticket update messages for sponsored, unsponsored and solicitation class messages for the ticket update message selection process.

Just-In-Time Positive Response (JIT-PR) Messages

Figure 34:
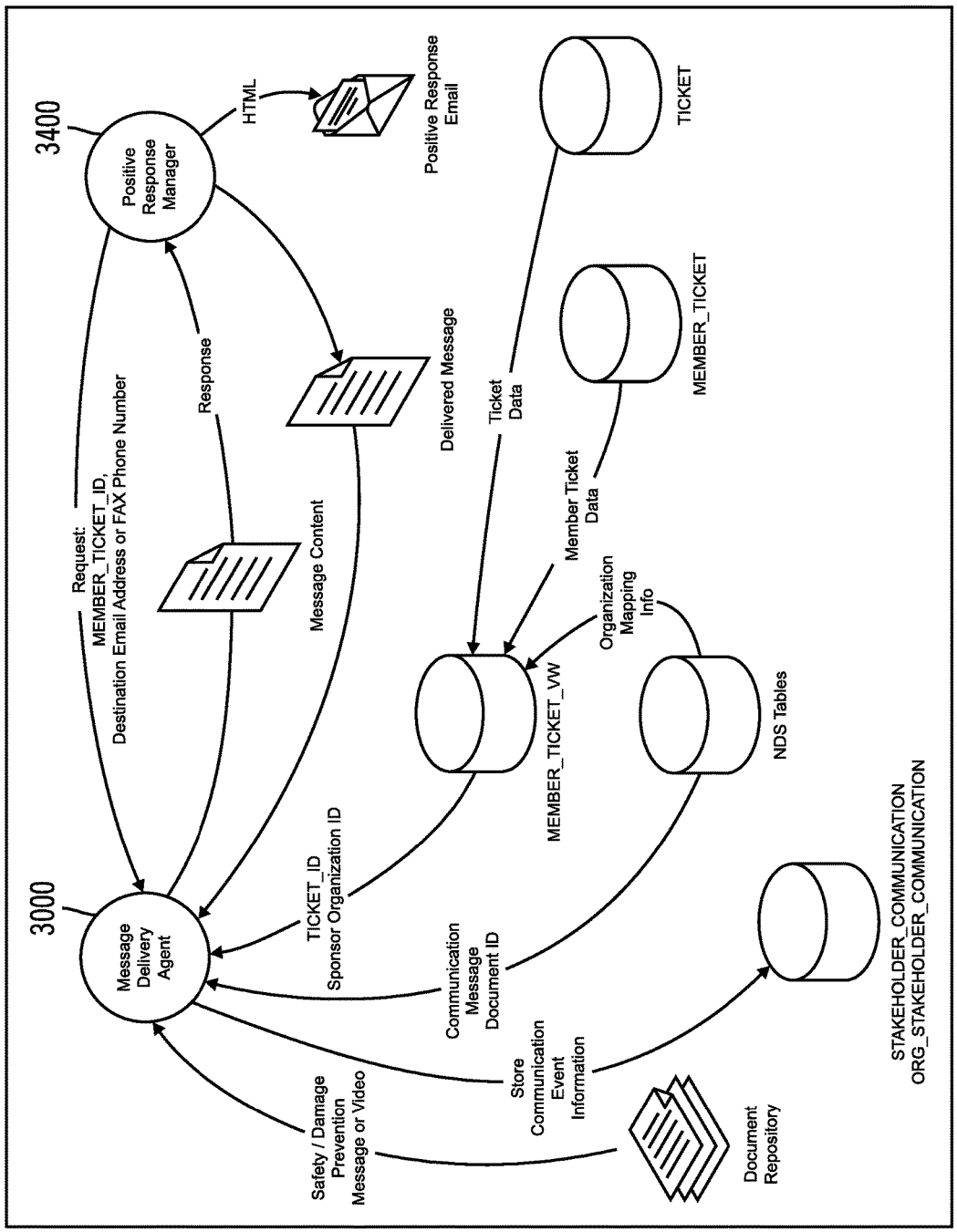
FIG. 34 illustrates flow of data and processing involving a message delivery agent 3000 when a request for an NDS message is made by a positive response manager in accordance with certain embodiments.

Messages for the JIT-PR (positive response triggered) class of communication may be delivered as part of a positive response email/facsimile message. FIG. 34 illustrates flow of data and processing involving a message delivery agent 3000 when a request for an NDS message is made by a positive response manager in accordance with certain embodiments. In FIG. 34, a message delivery agent 3000 of the NDS 110 receives a request from a positive response manager 3400, and, in response to the request, delivers a response with message content to the positive response manager 3400. The request and/or response may be sent using Representational State Transfer (REST) over Hypertext Transfer Protocol (HTTP).

The positive response manager 3400 supports a new token ("%%NDS-MESSAGE%%") which specifies when and where an NDS safety message is to be included in a positive response. In certain embodiments, the token is present in the positive response template. Thus, if the token is present, then request may be made to the NDS message delivery agent. This message delivery agent 3000 makes a determination as to whether a message may be added to the positive response and, if so, which message may be added.

Figure 35:
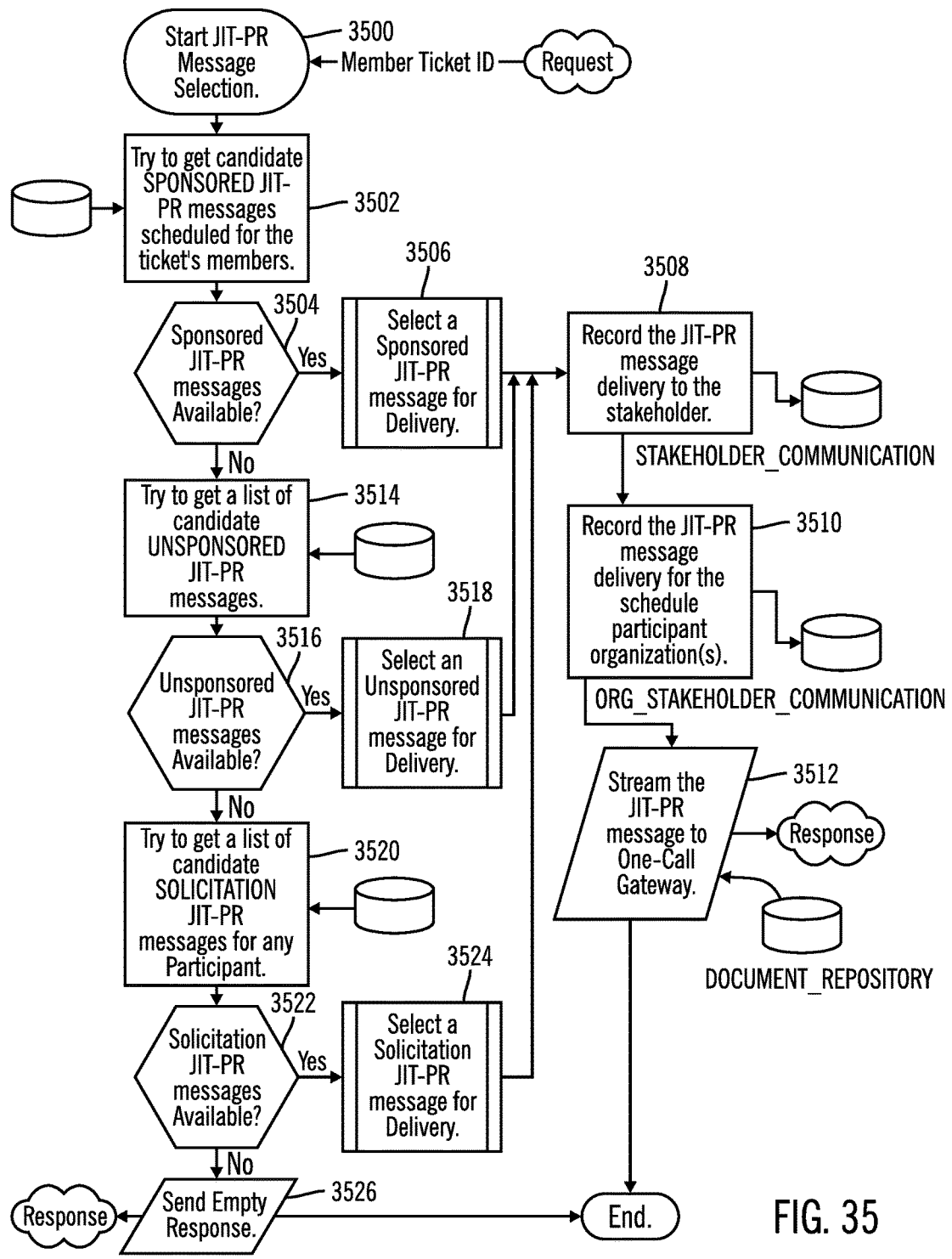
FIG. 35 illustrates, in a flow diagram, operations for determining which just-in-time positive response message to deliver for display at the one-call gateway in accordance with certain embodiments.

FIG. 35 illustrates, in a flow diagram, operations for determining which JIT-PR message to deliver by email or facsimile accordance with certain embodiments. Control begins at block 3500 when a positive response has been received with a member ticket identifier (ID), and JIT-PR message selection begins. In certain embodiments, a member is an operator or owner of an asset. Each member has a member ticket ID.

In block 3502, the NDS 110 tries to get candidate sponsored JIT-PR messages scheduled for the ticket's members. In certain embodiments, the NDS 110 looks for at least one sponsored JIT-PR message for any of the members associated with any of the tickets being updated at the same time. In block 3504, the NDS 110 determines whether sponsored JIT-PR messages are available. If so, processing continues to block 3506, otherwise, processing continues to block 3514.

In block 3506, the NDS 110 selects a sponsored JIT-PR message for delivery. In certain embodiments, a JIT-PR message is selected within the schedule based on the priority of the JIT-PR message and the number of members sponsoring the same JIT-PR message, while trying to avoid sending the same JIT-PR message more than once. If a JIT-PR message is repeated, it may be repeated in a round-robin order. Also, the schedule JIT-PR messages at the same priority may be randomly chosen.

In block 3508, the NDS 110 records the JIT-PR message delivery to the stakeholder. In block 3510, the NDS 110 records the JIT-PR message delivery for one or more schedule participant organizations. In certain embodiments, for unsponsored and solicitation type JIT-PR messages, the communication may be attributed to the organization associated with the schedule participant. In block 3512, the NDS 110 streams the JIT-PR message (e.g., HTML text, a video via URL, etc.) to the one-call gateway.

In block 3514, the NDS 110 tries to get a list of candidate unsponsored JIT-PR message. In block 3516, the NDS 110 determines whether unsponsored JIT-PR messages are available. If so, processing continues to block 3518, otherwise, processing continues to block 3520. In block 3518, the NDS 110 selects an unsponsored JIT-PR message for delivery. In certain embodiments, a JIT-PR message is selected among all of the unsponsored schedules based on the RELATIVE_PRIORITY of the JIT-PR message, while trying to avoid sending the same JIT-PR message more than once. If a JIT-PR message is repeated, it may be repeated in a round-robin order. Also, the schedule JIT-PR messages at the same priority may be randomly chosen. From block 3518, processing continues to block 3508.

In block 3520, the NDS 110 tries to get a list of candidate solicitation JIT-PR messages for any participant. In block 3522, the NDS 110 determines whether solicitation JIT-PR messages are available. If so, processing continues to block 3524, otherwise, processing continues to block 3526. In block 3524, the NDS 110 selects a solicitation JIT-PR message for delivery. In certain embodiments, a JIT-PR message is selected among all of the solicitation schedules based on the RELATIVE_PRIORITY multiplied by PREFERENCE_WEIGHT of the JIT-PR message, while trying to avoid sending the same JIT-PR message more than once. If a JIT-PR message is repeated, it may be repeated in a round-robin order. Also, the schedule JIT-PR messages at the same priority may be randomly chosen. From block 3518, processing continues to block 3508.

In block 3526, the NDS 110 sends an empty response.

In certain embodiments, SQL queries may be used to model the database access needed to retrieve candidate JIT-PR messages for sponsored, unsponsored and solicitation class messages for the JIT-PR message selection process.

In certain embodiments, if the one-call ticket associated with the positive response being processed has not been imported prior to the time of the request, the one-call ticket may be imported before the JIT-PR message selection processing continues. Typically, however, the one-call ticket associated with the positive response being processed will have been imported by the NDS 110 prior to when the positive response triggers the request for a JIT-PR message.

Figure 36:
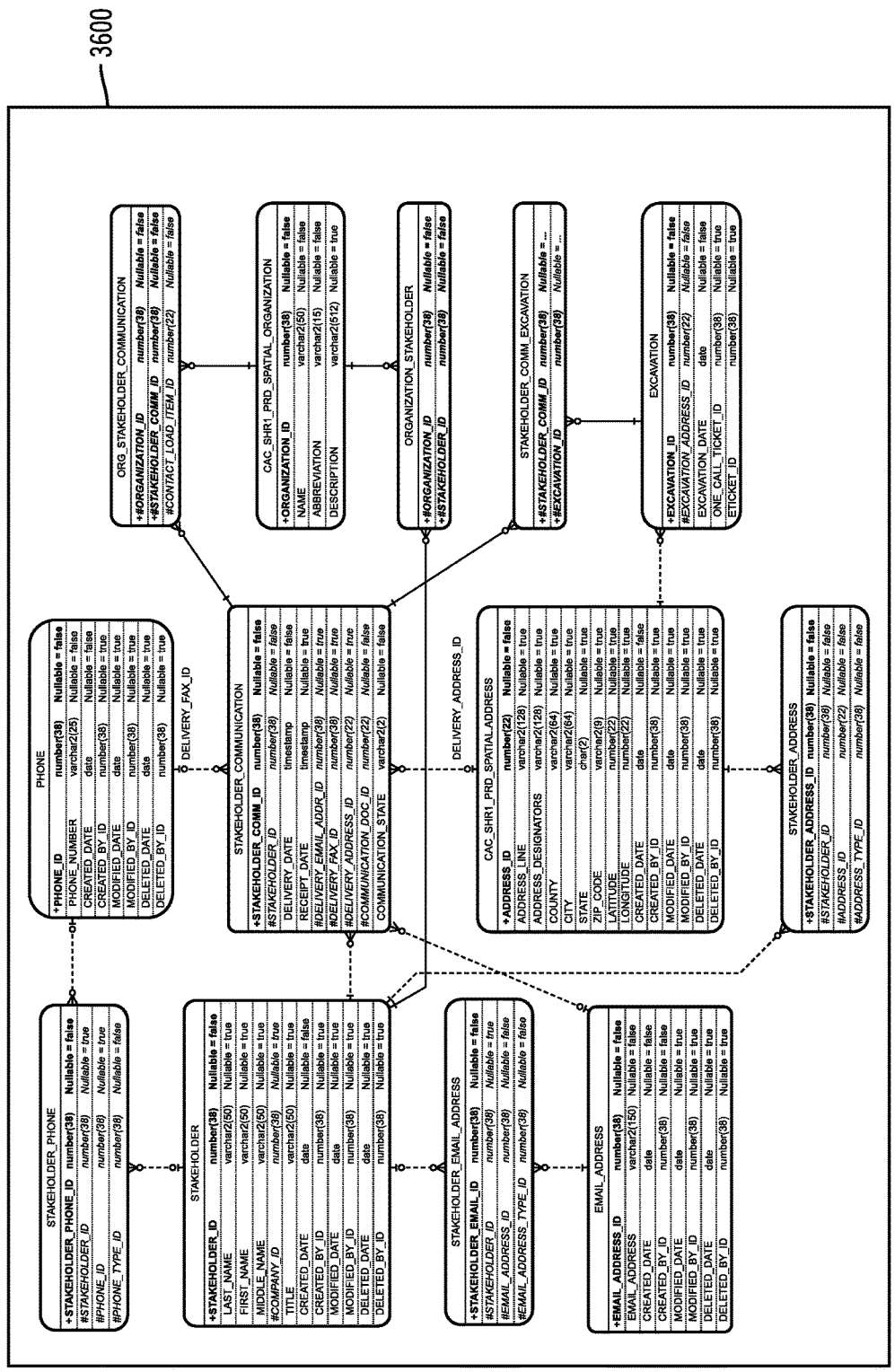
FIG. 36 illustrates tables used for storing stakeholder related information in accordance with certain embodiments.

FIG. 36 illustrates tables used for storing stakeholder related information in accordance with certain embodiments. If a message is distributed from the NDS 110 to either the positive response manager or the one-call gateway, records may be inserted into the STAKEHOLDER_COMMUNICATION and ORG_STAKEHOLDER_COMMUNICATION tables to record the fact that the message was distributed to the associated stakeholder on behalf of the associated sponsor organization.

If the message was distributed to the positive response manager, either the DELIVERY_EMAIL_ADDR_ID or the DELIVERY_PHONE_ID column may be populated with a reference to the email address or facsimile phone number used to deliver the positive response. This email address or facsimile phone number may already exist for the stakeholder (as one of the email addresses or phone numbers created during import).

A copy of the resulting communication, in its complete form, may be stored in the document repository. and a link to the document may be stored in the STAKEHOLDER_COMMUNICATION table within the COMMUNICATION_DOC_ID column. For JIT-PR class messages (sent as part of the positive response), a copy of the message may be returned from the positive response manager when the JIT-PR message has successfully been delivered.

Triggered Messages

Triggered messages (e.g., excavation triggered messages) may be selected and delivered based on the NDS communication schedule. Active stakeholders may be selected as targets. In certain embodiments, this message class is referred to as Excavation Triggered because they are initiated as a result of excavation activity. Triggered communications generally occur within a close temporal proximity to the excavation work date, unless a qualifying message has already been delivered to the given stakeholder during the schedule frequency.

Figure 37:
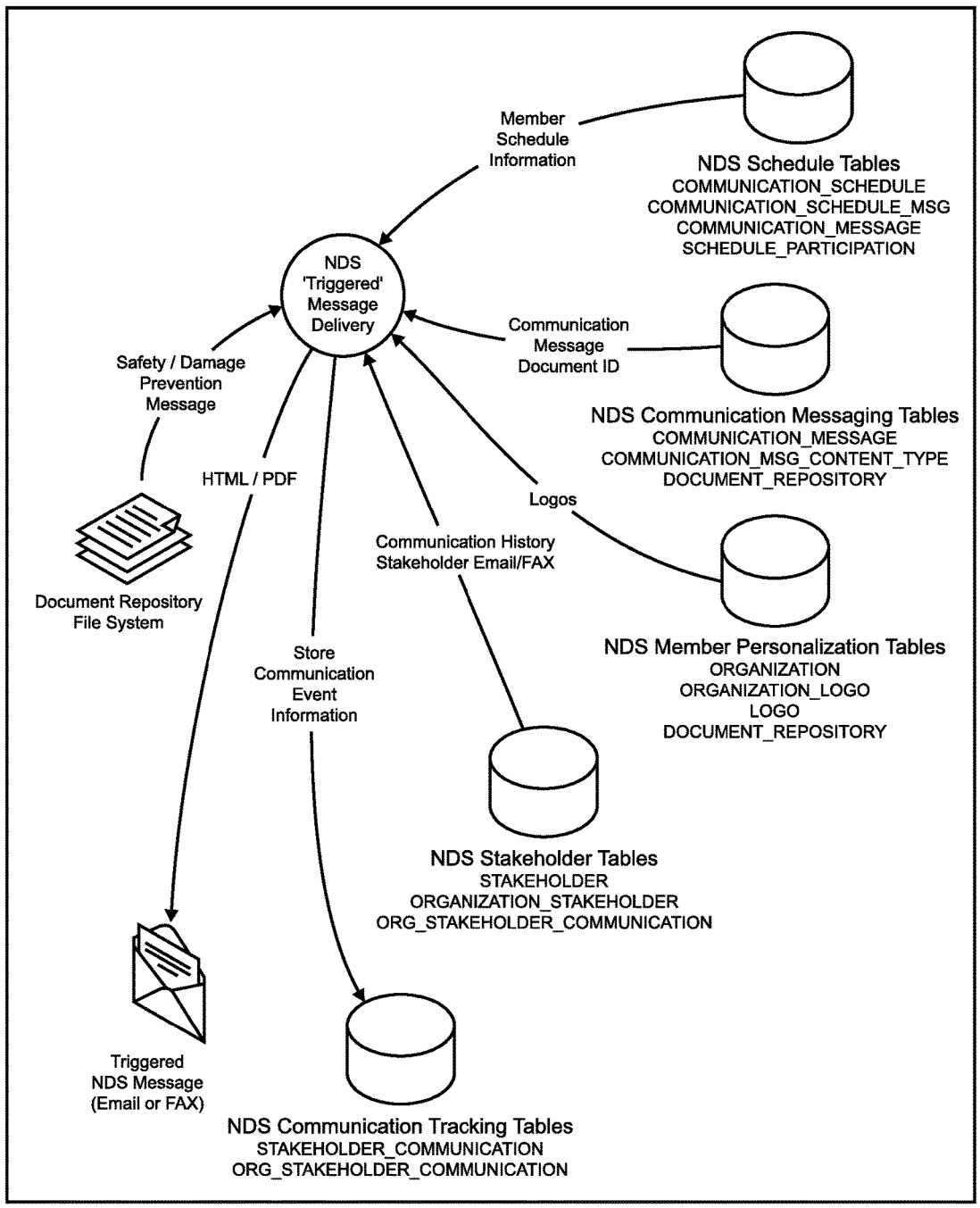
FIG. 37 illustrates flow of data and processing involving triggered message delivery in accordance with certain embodiments.

FIG. 37 illustrates flow of data and processing involving triggered message delivery in accordance with certain embodiments.

Figure 38:
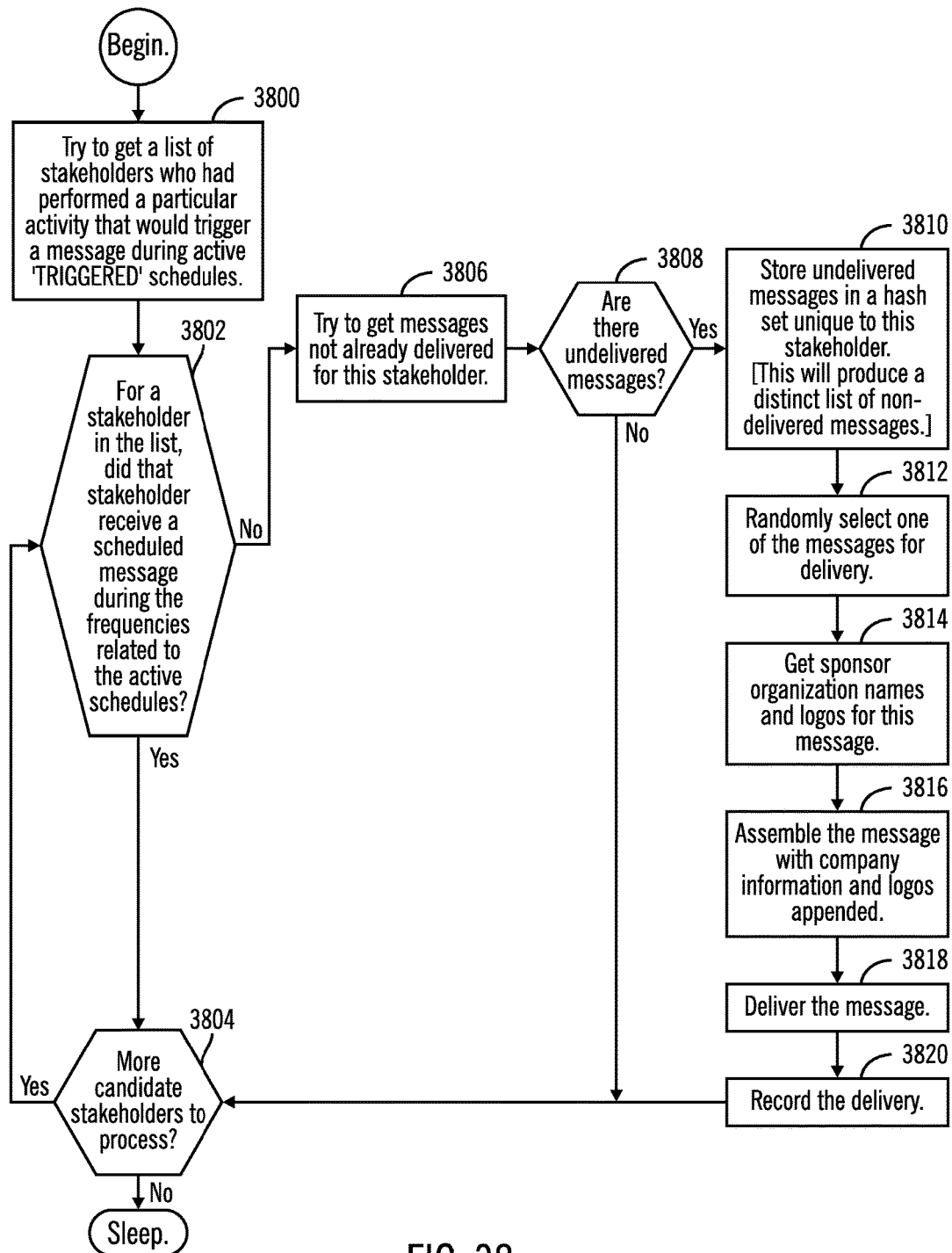
FIG. 38 illustrates, in a flow diagram, operations for determining which triggered message to deliver for display at the one-call gateway in accordance with certain embodiments.

FIG. 38 illustrates, in a flow diagram, operations for determining which triggered message to deliver to the stakeholder via email or facsimile in accordance with certain embodiments. Control begins at block 3800 with the NDS 110 trying to get a list of stakeholders who had performed a particular activity that would trigger a message (e.g., excavations) during active TRIGGERED schedules. These stakeholders are delivery candidates. This yields a set of stakeholders who may need to have a message delivered from the associated schedule. TRIGGERED schedules may be described as schedule that are setup to control trigger message delivery. A schedule can be active or inactive based on the start and end dates associated with the schedule. A schedule is active on or after the start date until the end date.

In block 3802, for a stakeholder in the list, the NDS 110 determines whether or not a stakeholder has received a scheduled message during the frequencies related to the active schedules. If so, the stakeholder is removed from the list and processing continues to block 3804, otherwise, processing continues to block 3806.

In block 3804, the NDS 110 determines whether there are more candidate stakeholders to process from the list. If so, processing continues to block 3802, otherwise, processing sleeps.

In block 3806, the NDS 110 tries to get one or more messages that have not already been delivered for this stakeholder.

In block 3808, the NDS 110 determines whether there are undelivered messages. If so, processing continues to block 3810, otherwise, processing continues to block 3804.

In block 3810, the NDS 110 stores undelivered messages in a hash set unique to this stakeholder. This will produce a distinct list of non-delivered messages. In certain embodiments, the NDS 110 stores the message IDs in a hash set by stakeholder ID to create a condensed (unique) set of message IDs for each stakeholder. In certain embodiments, more than one schedule may be applicable to a stakeholder, and those schedules may have overlapping messages.

In block 3812, the NDS 110 randomly select one of the messages for delivery. In block 3814, the NDS 110 gets sponsor organization names and logos for this message. In block 3816, the NDS 110 assembles the message with company information and logos appended. In block 3818, the NDS 110 delivers the message (e.g., via email, etc.). In block 3820, the NDS 110 records the delivery (e.g., in a database). From block 3820, processing continues to block 3804. In particular, the NDS 110 may record the message delivery in the STAKEHOLDER_COMMUNICATION and ORG_STAKEHOLDER_COMMUNICATION tables.

Thus, the processing of blocks 3802-3820 is performed for each of the stakeholders in the list generated in block 3800.

Stakeholder to Contact Association

Figure 39:
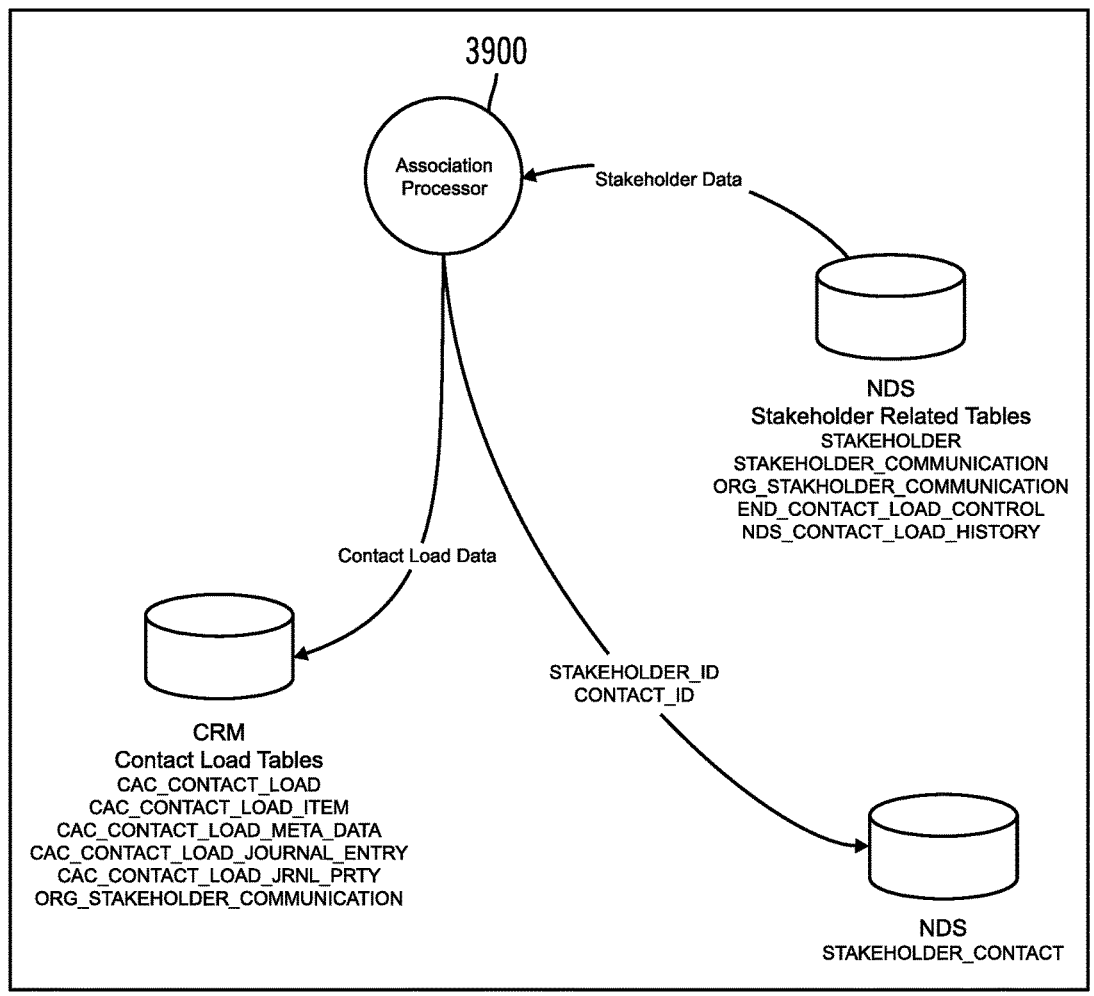
FIG. 39 illustrates flow of data and processing for associating stakeholders to contacts in accordance with certain embodiments.

In order to track communication distributed by the NDS 110 at the contact level, the NDS 110 matches unique stakeholders with existing contacts. To accomplish the matching of stakeholders created during the NDS import process, the NDS 110 may run this processing periodically (e.g., run once daily during the off-peak processing hours). The NDS 110 performs: associating stakeholders to existing contacts, creating new contacts when existing associations cannot be found, and recording message activity in the form of contact journal entries. FIG. 39 illustrates flow of data and processing 4000 for associating stakeholders to contacts in accordance with certain embodiments. In FIG. 39, an association processor 3900 access stakeholder data and contact data to match stakeholders and contacts.

Contact Association

Figure 40:
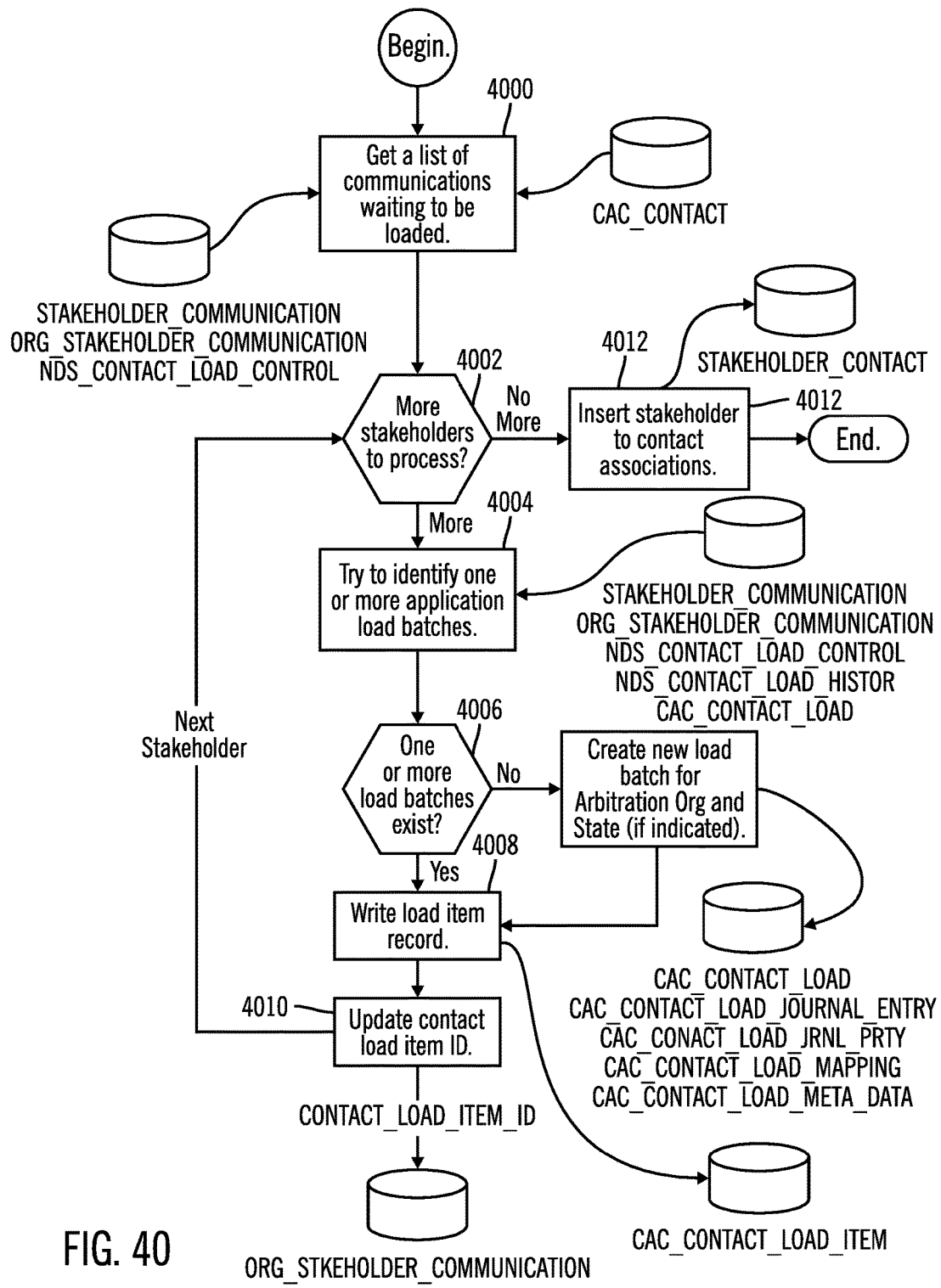
FIG. 40 illustrates, in a flow diagram, operations for associating stakeholder communications to one or more contacts in accordance with certain embodiments.

The NDS 110 associates stakeholder communications to one or more contacts (e.g., through a bulk load process). Once stakeholder communications have been loaded, the resulting contact to stakeholder associations may be recorded so the past and present stakeholder to contact relationships can be easily recognized. FIG. 40 illustrates, in a flow diagram, operations for associating stakeholder communications to one or more contacts in accordance with certain embodiments. Control begins at block 4000 with the NDS 110 getting a list of communications waiting to be loaded. In block 4002, the NDS 110 determines whether there are more stakeholders to process. If so, processing continues to block 4004, otherwise, processing continues to block 4012.

In block 4004, the NDS 110 tries to identify one or more applicable load batches. In block 4006, the NDS 110 whether one or more load batches exist. If so, processing continues to block 4008, otherwise, processing continues to block 4014. In block 4008, the NDS 110 writes a load item record. In block 4010, the NDS 110 updates a contact load item ID. From block 4010, processing continues to block 4002.

In block 4012, the NDS 110 inserts stakeholder to contact associations into a data store.

In block 4014, the NDS 110 creates a new load batch. From block 4014, processing continues to block 4008. In certain embodiment, the load batch is created with a LOAD_STATUS of NDS_HOLD to prevent the load batch from loading automatically.

In certain embodiments, one active load batch may be maintained for every unique arbitration organization and state combination represented by the entries of the NDS_CONTACT_LOAD_CONTROL table and the stakeholder communications to be loaded. An active load batch has a LOAD_STATUS of NDS_HOLD. When a data administrator for the associated arbitrator decides it is time to process the contact load, the data administrator releases the batch from holding status (through a release operation). After the load batch has been manually released, the subsequent stakeholder communications for that arbitrator/state combination may be written to a new load batch.

Figure 41:
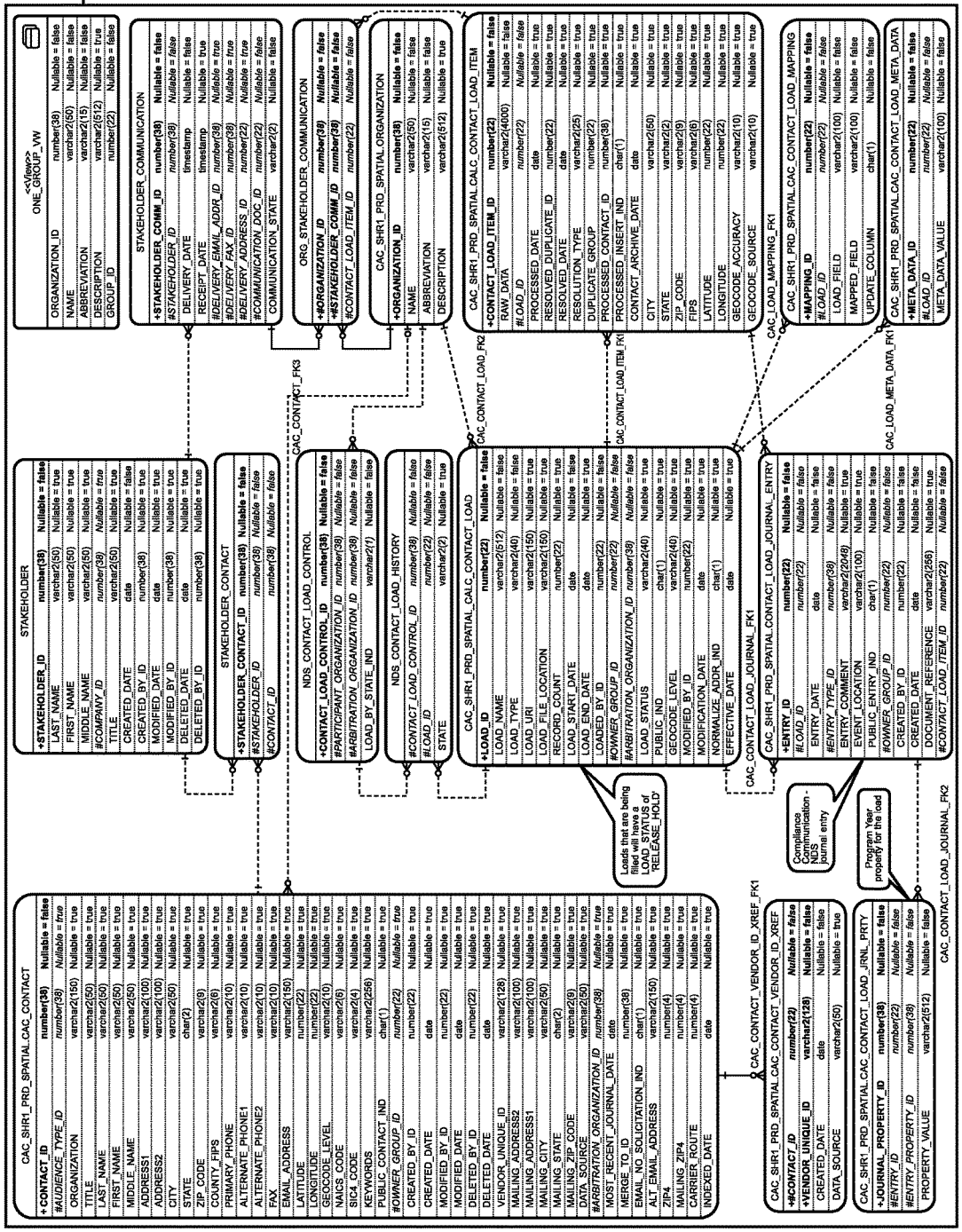
FIG. 41 illustrates tables used for stakeholder to contact association in accordance with certain embodiments.

FIG. 41 illustrates tables 4100 used for the stakeholder to contact association in accordance with certain embodiments. A stakeholder may be associated with one or more contacts and arbitration organizations.

Figure 43:
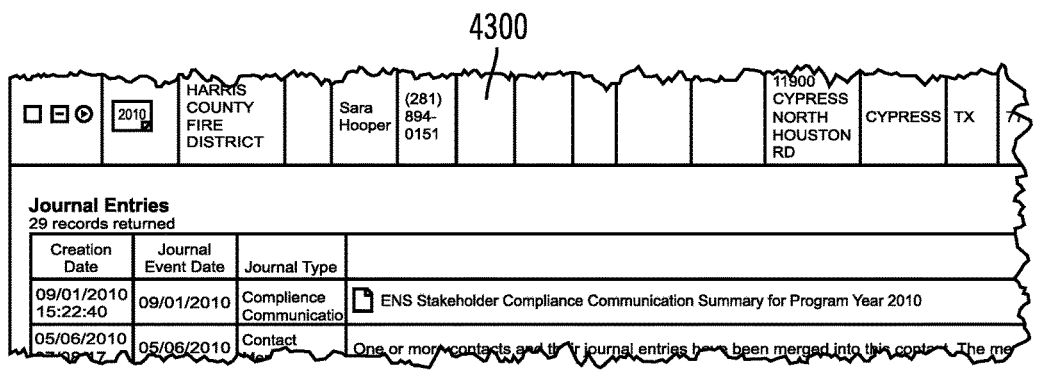
FIG. 43 illustrates an example journal entry in accordance with certain embodiments.

FIG. 42 illustrates fields 4200 for a contact load mapping table in accordance with certain embodiments. In certain embodiments, contact data may be loaded from the NDS 110 to other, third-party systems. The contact load mapping table may be populated with the following values in an order that corresponds to the fields 4200 in FIG. 42:

1. STAKEHOLDER_ID
2. NDS_DATA_SOURCE
3. AUDIENCE_TYPE
4. COMPANY.COMPANY_NAME
5. STAKEHOLDER.FIRST_NAME
6. STAKEHOLDER.LAST_NAME
7. STAKEHOLDER.ADDRESS_LINE
8. STAKEHOLDER.ADDRESS_DESIGNATORS
9. STAKEHOLDER.CITY
10. STAKEHOLDER.STATE
11. STAKEHOLDER.ZIP_CODE
12. STAKEHOLDER.COUNTY
13. NDS_SIC4_CODE
14. STAKEHOLDER.PRIMARY PHONE
15. STAKEHOLDER.ALTERNATE PHONE
16. STAKEHOLDER.facsimile
17. STAKEHOLDER.EMAIL_ADDRESS
18. STAKEHOLDER.ALTERNATE_EMAIL
19. STAKEHOLDER.GEOCODE_ACCURACY
20. STAKEHOLDER.LONGITUDE
21. STAKEHOLDER.LATITUDE Contact Journal Entries Message delivery is recorded at the contact level within the associated contact's journal entries. In certain embodiments, for some stakeholders, the level of activity (e.g., excavation activity) may be too frequent to record as individual journal entries for each delivery event; consequently, a single Compliance Communication—NDS journal entry may be created per program year. This NDS journal entry contains a dynamic link that appears as a document with a title of "NDS Stakeholder Compliance Communication Summary". FIG. 43 illustrates an example journal entry 4300 in accordance with certain embodiments.

The journal entry used to record the message delivery activities that have occurred throughout the program year may be created as follows:

The journal entry type may be Compliance Communication—NDS.

The journal date may be the date of creation.

The entry date may be the date of the earliest message delivery for the given program year.

The message body may be a report link.

The journal entry's Program Year property may be set to the appropriate program year.

Reporting

Figure 44:
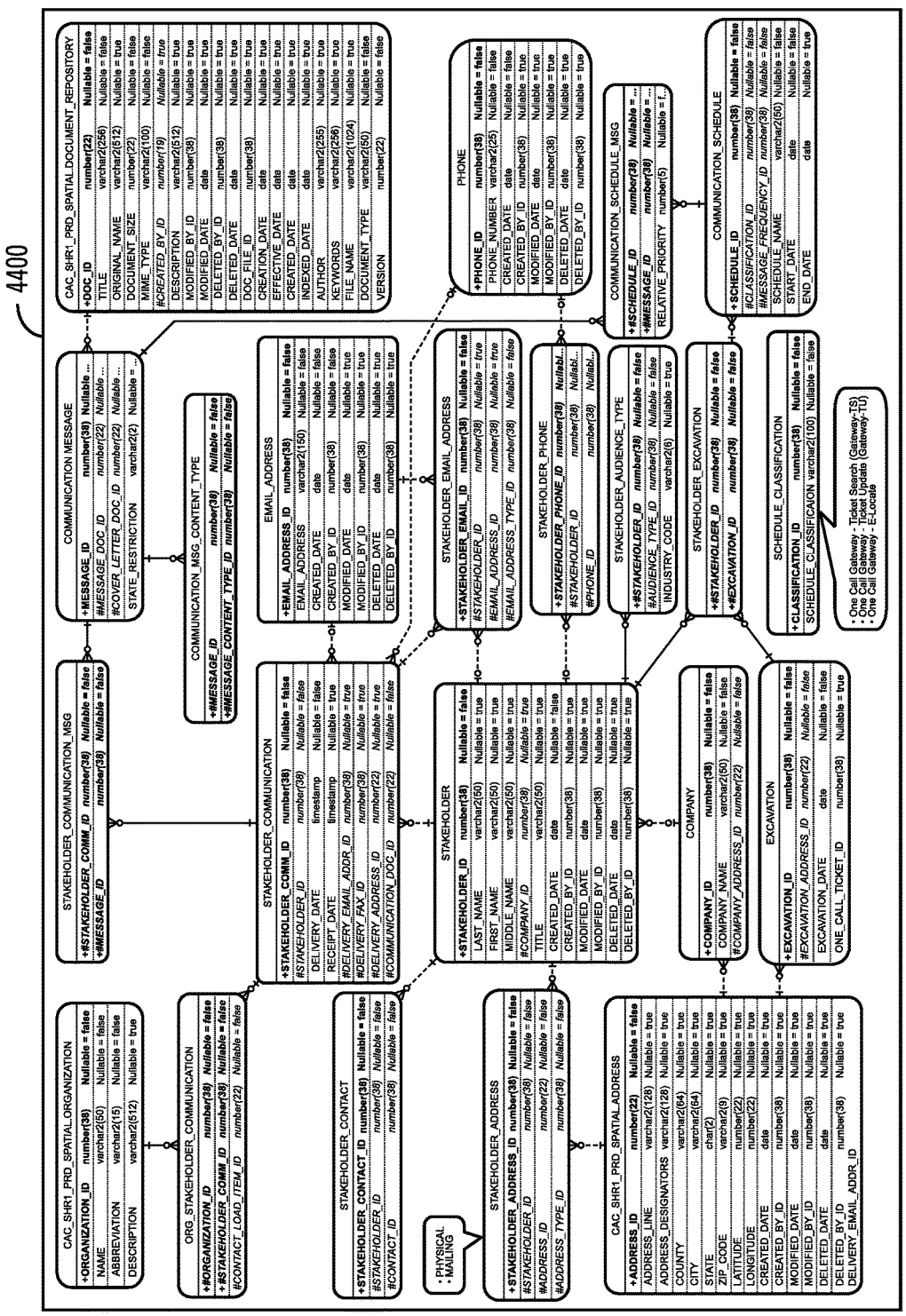
FIG. 44 illustrates tables that may be used for the generation of the reports in accordance with certain embodiments.

The NDS 110 provides various reports. FIG. 44 illustrates tables 4400 that may be used for the generation of the reports in accordance with certain embodiments.

Stakeholder Compliance Communication Detail Report

The stakeholder compliance communication detail report documents the details of NDS communication that has occurred to a stakeholder during a given reporting period (e.g., a program year). The stakeholder compliance communication detail report may be accessible from a Compliance Communication—NDS journal entry as either a PDF or HTML report, from a drill-down from other NDS reports (e.g., HTML format) or from within the NDS Reports. FIG. 45 illustrates a user interface provided by the NDS 110 for generating a stakeholder compliance communication detail report 4500 in accordance with certain embodiments. The stakeholder compliance communication detail report restricts the stakeholders chosen for the report to those that have performed an activity (e.g., excavated) along the given member's assets. The member organization drop down may be populated with organization names to which the user has access via permissions. The reporting period may be restricted to the years allowed by these same permissions. The state dropdown may be restricted to the states allowed by these same permissions.

The state drop down may be populated with the states where data exists for the given organization. For example, this can be determined by looking at the states associated with the excavations (STAKEHOLDER_EXCAVATION) associated with the stakeholders pointed to by the ORG_STAKEHOLDER_COMMUNICATION records for the given organization. The county drop down may be restricted by the state selected.

Figure 46:
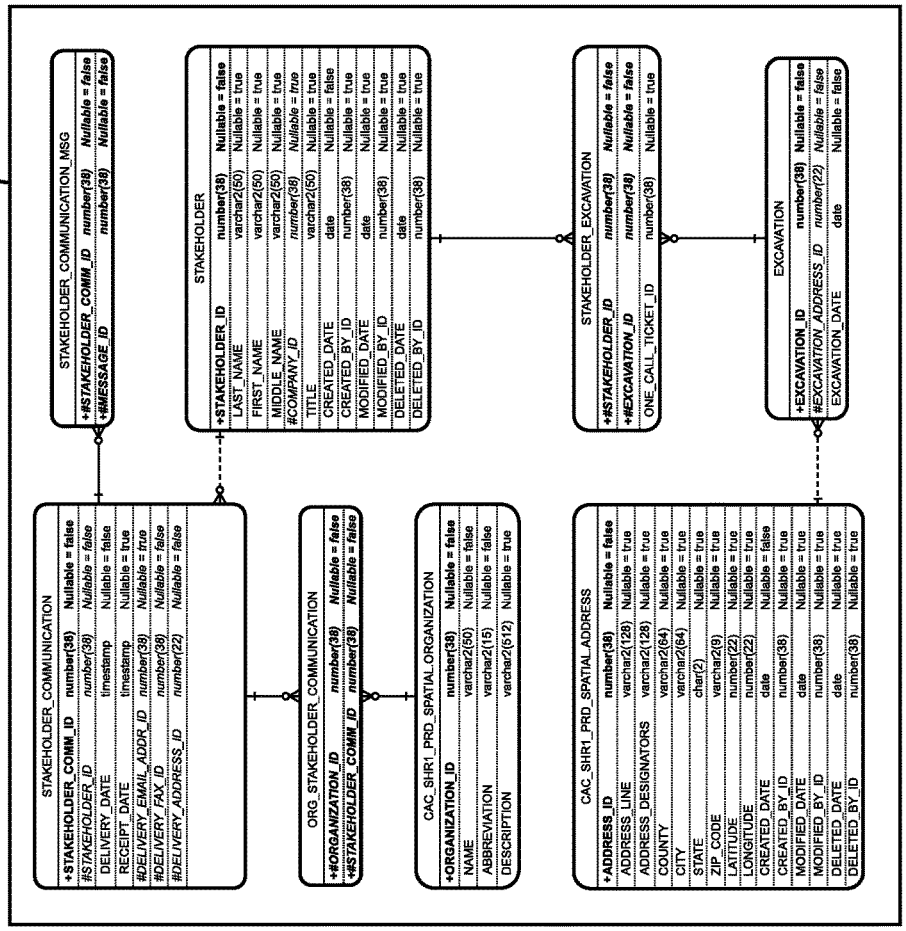
FIG. 46 illustrates tables used for the stakeholder compliance communication detail report in accordance with certain embodiments.

FIG. 46 illustrates tables 4600 used for the stakeholder compliance communication detail report in accordance with certain embodiments. FIG. 47 illustrates a stakeholder compliance communication detail report 4700 in accordance with certain embodiments. FIG. 48 illustrates report fields and data sources/information 4800a, 4800b for a stakeholder compliance communication detail report in accordance with certain embodiments. FIG. 48 is formed by FIGS. 48A and 48B.

Compliance Communication Executive Summary Report

The compliance communication executive summary report documents the NDS communication activities that have occurred on behalf of a given sponsoring member for a given program year. The compliance communication executive summary report includes high level message volumes by message delivery form and message content. FIG. 49 illustrates a user interface 4900 provided by the NDS 110 for generating a compliance communication executive summary report in accordance with certain embodiments. The member organization drop down may be populated with organization names to which the user has access to via permissions. The compliance communication executive summary report has a page for each state within the specified member organization's associated excavation footprint. Additionally, the first page of the compliance communication executive summary report summarizes all states.

Figure 50:
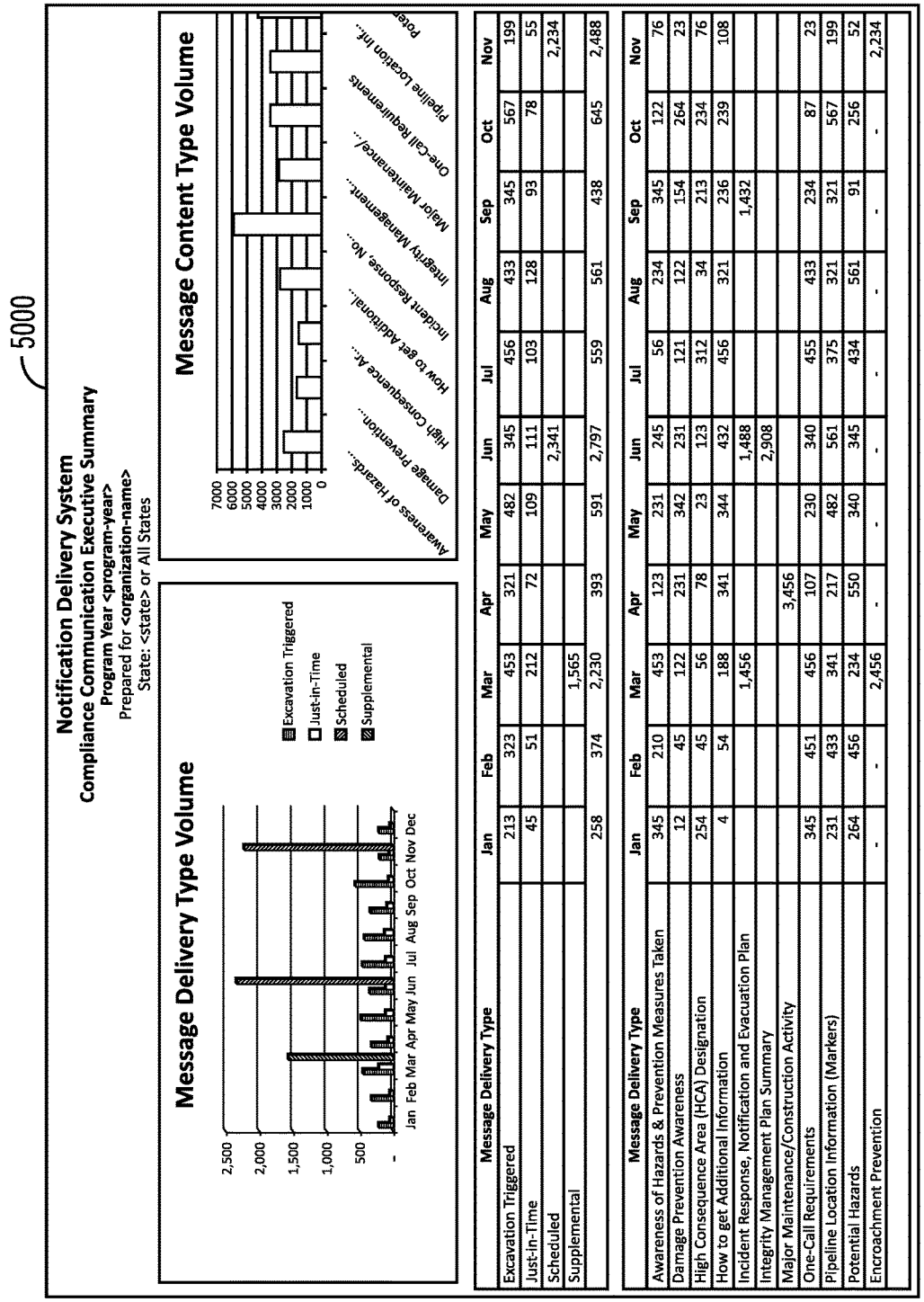
FIG. 50 illustrates a compliance communication executive summary report in accordance with certain embodiments.

FIG. 50 illustrates a compliance communication executive summary report 5000 in accordance with certain embodiments. FIG. 51 illustrates report fields and data sources/information 5100 for a compliance communication executive summary report in accordance with certain embodiments. In certain embodiments, the monthly columns within the message content type section are not totaled.

Stakeholder Compliance Communication Summary Report

The stakeholder compliance communication summary report summarizes the NDS compliance communication messages that have been delivered to stakeholders on behalf of the specified member, within the given reporting period and state or states. The stakeholder compliance communication summary report breaks the detail rows (which represent stakeholders) by state and county.

FIG. 52 illustrates a user interface 5200 provided by the NDS for generating a stakeholder compliance communication summary report in accordance with certain embodiments. The member organization drop down may be populated with organization names to which the user has access to via permissions. The reporting period may be restricted to the years allowed by these same permissions. The state dropdown may be restricted to the states allowed by these same permissions. If the any state option is selected, the stakeholder compliance communication summary report may be run for any authorized state where data for the selected member is available. If a state is selected but any county is selected for the state, then the stakeholder compliance communication summary report may be run for all counties within the selected state where data for the selected member is available.

FIG. 53 illustrates a stakeholder compliance communication summary report 5300 in accordance with certain embodiments. In certain embodiments, new stakeholders may be highlighted (e.g., in pale green) and summarized in the Period New Stakeholders subtotals. New stakeholders are contacts who are new to this member organization or who have not been assigned a compliance communication journal entry associated with the sponsoring member organization during the reporting period. The reason for highlighting new stakeholders is to help draw attention to the additional stakeholders reached on behalf of the sponsoring member organization.

Figure 54:
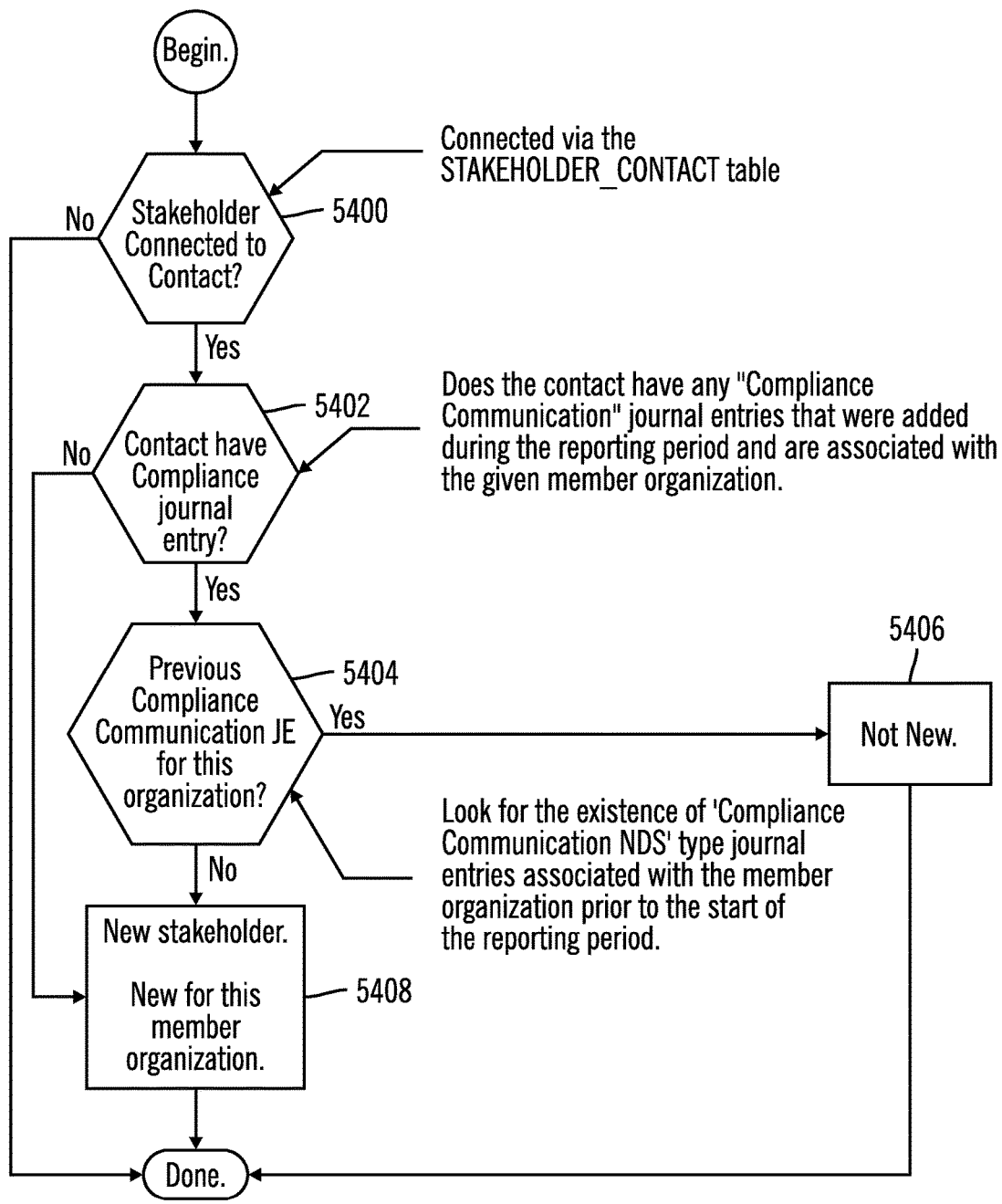
FIG. 54 illustrates, in a flow diagram, operations for determining new stakeholders in accordance with certain embodiments.

FIG. 54 illustrates, in a flow diagram, operations for determining new stakeholders in accordance with certain embodiments. Control begins at block 5400 with the NDS 110 determining whether the stakeholder is connected to the contact. If so, processing continues block 5402, otherwise, processing is done. In block 5402, the NDS 110 determines whether the contact has a compliance communication journal entry. If so, processing continues to block 5404, otherwise, processing continues to block 5408. In block 5404, the NDS 110 determines whether there was a previous compliance communication journal entry for this organization. If so, processing continues to block 5406, otherwise, processing continues to block 5408. In block 5406, the NDS 110 determines that the stakeholder is not new. In block 5408, the NDS 110 determines that the stakeholder is new for a member organization.

FIG. 55 report fields and data sources/information 5500a, 5500b for a stakeholder compliance communication summary report accordance with certain embodiments. FIG. 55 is formed by FIGS. 55A and 55B.

New Stakeholder Summary Report

The new stakeholder summary report displays a list of stakeholders who are new to the given member company during the reporting period. These new stakeholders are associated with the member company as a result of activities (e.g., excavations) that have occurred on or near the member's assets for the first time during the reporting period. In certain embodiments, "new" does not mean new to the database, just new to the given member. The new stakeholder summary report breaks the detail rows (which represent stakeholders) by state.

Figure 56:
FIG. 56 illustrates a user interface provided by the NDS for generating a new stakeholder summary report in accordance with certain embodiments.

FIG. 56 illustrates a user interface 5600 provided by the NDS 110 for generating a new stakeholder summary report in accordance with certain embodiments. The member organization drop down may be populated with organization names to which the user has access to via permissions. The reporting period may be restricted to the years allowed by these same permissions. The state dropdown may be restricted to the states allowed by these same permissions. If the any state option is selected, the new stakeholder summary report may be run for any authorized state where data for the selected member is available.

FIG. 57 illustrates a new stakeholder summary report 5700 in accordance with certain embodiments. FIG. 58 illustrates report fields and data sources/information 5800 for a new stakeholder summary report in accordance with certain embodiments.

Figure 59A:
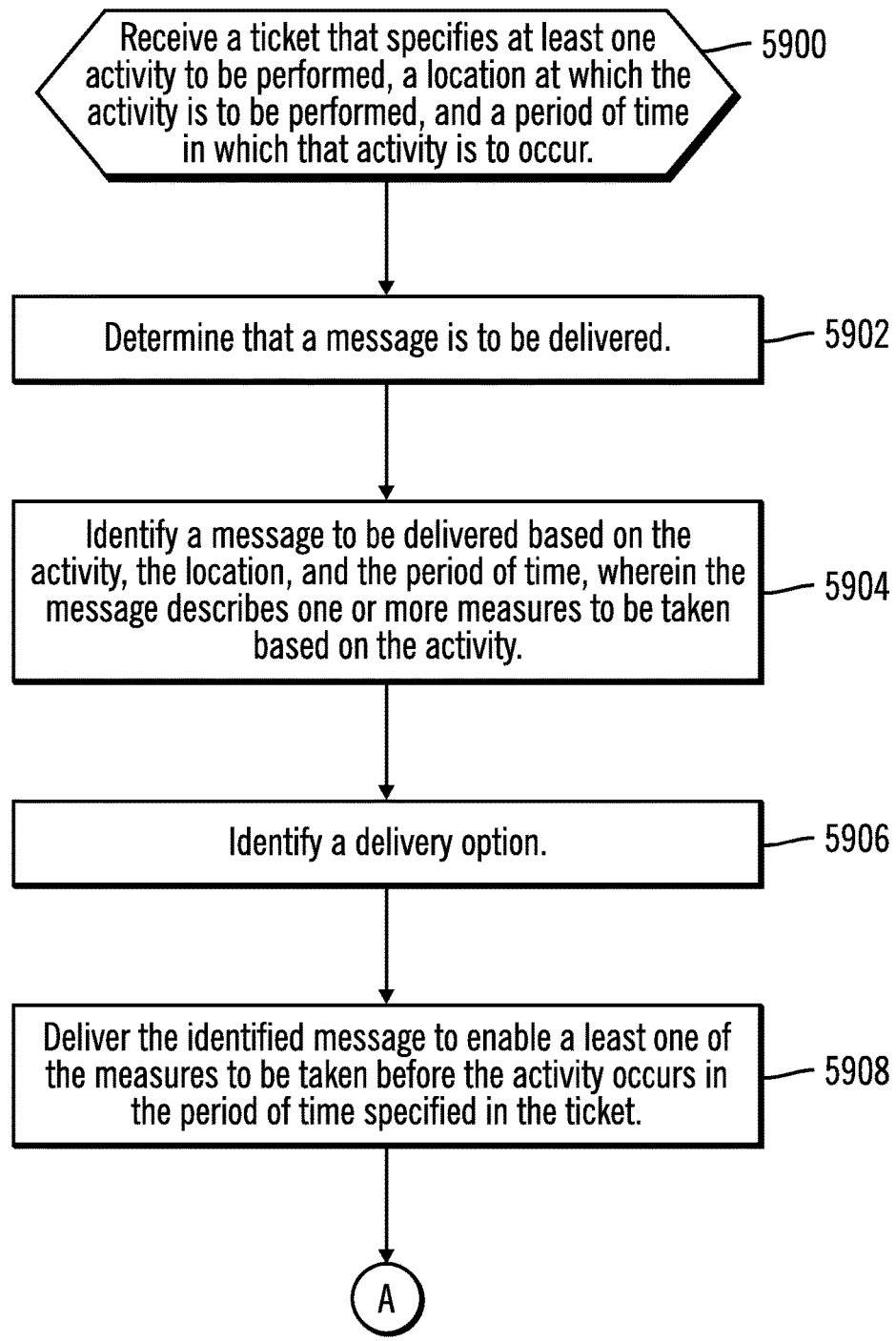
FIG. 59 illustrates, in a flow diagram, operations providing notifications in accordance with certain embodiments.
Figure 59B:
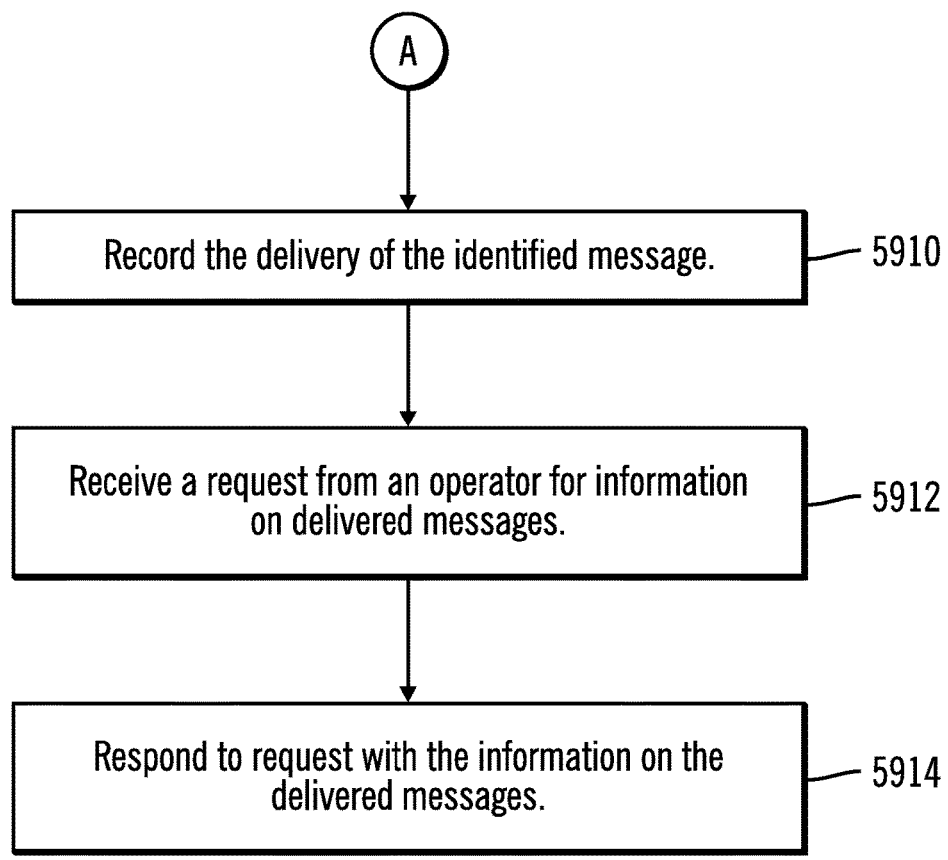

FIG. 59 illustrates, in a flow diagram, operations providing notifications in accordance with certain embodiments. FIG. 59 is formed by FIGS. 59A and 59B. Control begins at block 5900 with the NDS 110 receiving a ticket that specifies at least one activity to be performed, a location at which the activity is to be performed, and a period of time in which that activity is to occur. The ticket may be received through the one-call gateway 160 of the NDS 110 or the ticket may be generated through a third-party call center and routed to the NDS 110.

In block 5902, the NDS 110 determines that a message is to be delivered. For example, the NDS 110 determines that the message is to be delivered when there has been a ticket entry action, a ticket update action, a ticket locate action, receipt of a positive response, or based on a schedule.

In block 5904, the NDS 110 identifies a message to be delivered based on the activity, the location, and the period of time, wherein the message describes one or more measures to be taken based on the activity. In certain embodiments, the identified message is a safety message that is sent prior to an activity occurring (e.g., excavation) that could cause harm to people, animals, property etc., and the measures describe actions to be taken before the activity (e.g., put up warning notices near the excavation location), during the activity (e.g., wear safety goggles), and if a problem occurs with the activity (e.g., if the excavation breaks a natural gas pipeline, do not use cell phone near the excavation location as use of the cell phone may cause a spark). Moreover, the message is identified based on the activity, location, and period. That is, the NDS 110 has information stored on what conduits and/or facilities are at the location, and based, in part, on this, the NDS 110 can identified the message to be delivered. For example, if the activity is excavation that occurs near a pipeline carrying natural gas underground, during a two week period, then a message with measures to be taken that are appropriate for or relevant to the natural gas is identified. As another example, if the activity is building a high-rise apartment complex, and the location is near power lines above ground, for a three year period, then a message with measures to be taken that are appropriate for or relevant to the power lines is identified. Thus, in embodiments, the NDS 110 stores different messages for different activities, facilities and/or conduits at a location, etc. Also, the message may be a video, text, HTML document, PDF document, postal mail, email, facsimile, etc.

In block 5906, the NDS 110 identifies a delivery option. For example, for a ticket entry action, a ticket update action, and a ticket locate action, the message is delivered to the one-call gateway. JIT-PR and triggered messages are delivered via email or facsimile. Scheduled and supplemental messages are delivered via postal mail, email or facsimile.

In various embodiments, an individual may receive one or more messages before the period of time, one or more messages during the period of time and/or one or more messages after the period of time. In various embodiments, the time at which the messages are sent may be based on a schedule.

In block 5908, the NDS 110 the identified message to enable at least one of the measures to be taken before the activity occurs in the period of time specified in the ticket. The message may cause the individual to change behavior (e.g., stops excavating, wears safety goggles, puts up warning notices, etc.). As another example, the individual excavating in the backyard receives safety information to assist in saving lives and/or property. In this example, if the individual excavates and ruptures a pipeline carrying natural gas, the individual knows what to do based on the safety message (e.g., what not to do (e.g., do not use a cell phone near the excavation location), who to contact, what to do immediately before police/fire/ambulances arrive, etc.). Also, the identified message is delivered by the identified delivery option.

From block 5908 (FIG. 59A), processing continues to block 5910 (FIG. 59B).

In block 5910, the NDS 110 records the delivery of the identified message (e.g., in a journal entry). In block 5912, the NDS 110 receives a request from an operator for information on delivered messages. For example, an operator may have to prove compliance with regulations regarding delivery of safety messages, and the operator may request information on such delivery from the NDS 110. In block 5914, the NDS 110 responds to the request with the information on the delivered messages. The information may indicate: content of each message that was sent, which stakeholders received each message, when the stakeholders received the messages, etc.

Embodiments efficiently store, recall and update records related to such facilities and conduits. Embodiments enable a person or entity to more accurately identify the physical location of key artifacts such as underground conduit, facilities, or property lines. Embodiments automate entry of the site location, identification and data associated with the operations.

The NDS 110 provides appropriate safety information to those in need in a just-in-time fashion.

Figure 60:
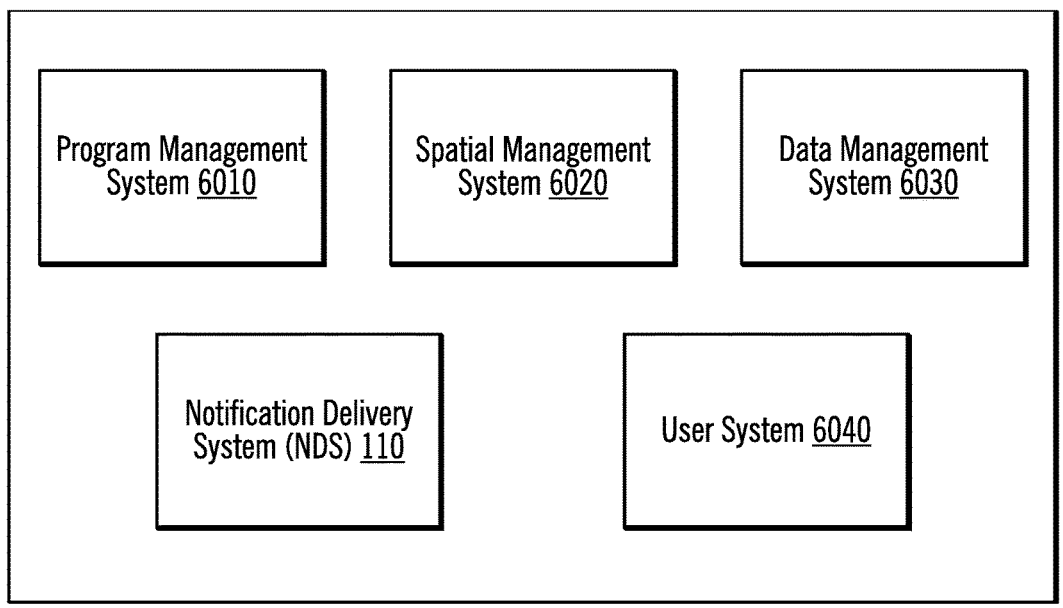
FIG. 60 illustrates an alternative computing environment in accordance with certain embodiments.

FIG. 60 illustrates an alternative computing environment in accordance with certain embodiments. The computing environment of FIG. 60 includes the NDS 110, a program management system 6010, a spatial management system 6020, a data management system 6030, and a user system 6040 (which provides a user interface). In certain embodiments, the program management system 6010 receives contact information and search criteria for a request. The program management system 6020 transmits the search criteria to the spatial management system 6020. The spatial management system 6020 performs a geocode of the search criteria and retrieves map data from the data management system 6030 corresponding to the search criteria geocode. The spatial management system 6020 transmits the map data to the program management system 6020.

The program management system 6010 transmits the map data to the user interface and, in return, receives an identification of a site location where the operation is to be performed. The program management system 6010 transmits the site location indication to the spatial management system 6020. The spatial management system 6020 geocodes the site location indication and transmits the site location geocode to the program management system 6010. The program management system 6010 creates a location ticket, which comprise the site location geocode and the contact information.

The program management system 6010 transmits the location geocode to the NDS 110, which performs a ticket search and determines the appropriate safety information, or safety message associated with the site location geocode. The program management system 6010 adds the safety message to the location ticket and transmits the ticket to excavation professionals in a just-in-time fashion.

In certain embodiments, the NDS 110 is utilized without the program management system 6010. For example, if an excavator has a location ticket without a safety message, the excavator, following state laws and government regulations, may log the ticket with the appropriate state or governmental system that is coupled to the NDS 110. The NDS 110 recalls the appropriate safety message and delivers it in the form of a short safety video or textual message after the excavator enters in the location ticket entry form; thus delivering safety information immediately before the excavation is planned. Similarly, the NDS ticket search provides safety information to excavators in a just-in-time fashion when they use the NDS 110 to look up a ticket they have logged with the state one-call gateway. Both the NDS safety search and location ticket processes have the ability to deliver operator or commodity appropriate safety messages due to the fact that the excavation location has been identified when the safety information is presented to the user. Thus, the NDS 110 provides critical safety messages just-in-time to the exact individuals who are excavating near pipelines carrying potentially volatile or toxic products.

Embodiments offer just-in-time safety messages during ticket entry and ticket display. The entire contents of US Patent Application Publication NO. 2006/0085396 A1 are incorporated herein by reference. The safety messages provided by the NDS 110 can be operator and commodity specific so as to allow the NDS 110 selected message to be very specific to the potential hazards of the excavation site. In addition, the NDS ticket search provides a mapping interface to display excavation site location information.

Thus, certain embodiments provide safety information to a user in a just-in-time fashion for a user-selected area. A program management system 6010 receives contact information and a location designation for an operation to be performed, generates map data identifying an area corresponding to the location designation, receives an indication of a site location marked by a user within the area identified by the map data where the operation is to be performed, generates computed map data comprising a selected site locator identifying the site location marked by the user where the operation is to be performed, and generates a locate ticket comprising a geocode for the site location indication and the contact information.

A spatial management system 6020 receives the location designation from the program management system 6010, retrieves the map data identifying the area corresponding to the location designation, transmits the map data to the program management system 6010, receives the site location indication from the program management system 6010, geocodes the site location indication, transmits the geocode to the program management system 6010, retrieves the computed map data, and transmits the computed map data to the program management system 6010, the computed map data comprising the selected site locator identifying the site location marked by the user where the operation is to be performed.

A data management system 6030 stores the map data and the computed map data and transmits the map data and the computed map data to the spatial management system 6020.

An NDS 110 stores safety and hazard information of a location, receives the computed map location, creates safety data messages, and transmits the safety data messages the spatial management system 6020 or to a specified user location.

A user interface receives the contact information and the location designation for the operation from the user, transmits the contact information and the location designation to the program management system 6010, receives the map data from the program management system 6010, generates the map data for display, receives the site location indication marked by the user within the area identified by the map data where the operation is to be performed, transmits the site location indication to the program management system 6010, receives the computed map data from the program management system 6010, generates the computed map data for display, and provides safety information.

It will be appreciated that the components of FIG. 60 may be used for various other applications. Moreover, the user interface may be customized for the sophistication of the user and data may be received via alternative modes including, for example, cellular telephone, mobile phone, smart phone applications, internet based systems and direct server interfaces.

In certain embodiments, the program management system transmits a location geocode to a NDS 110, which performs a NDS ticket search and determines appropriate safety information or safety message associated with the site location geocode. The program management system adds the safety information or safety message to the location ticket and transmits the ticket to excavation professionals in a just-in-time fashion.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

A computer readable storage medium may be, for example, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages.

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the flow diagrams show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Figure 61:
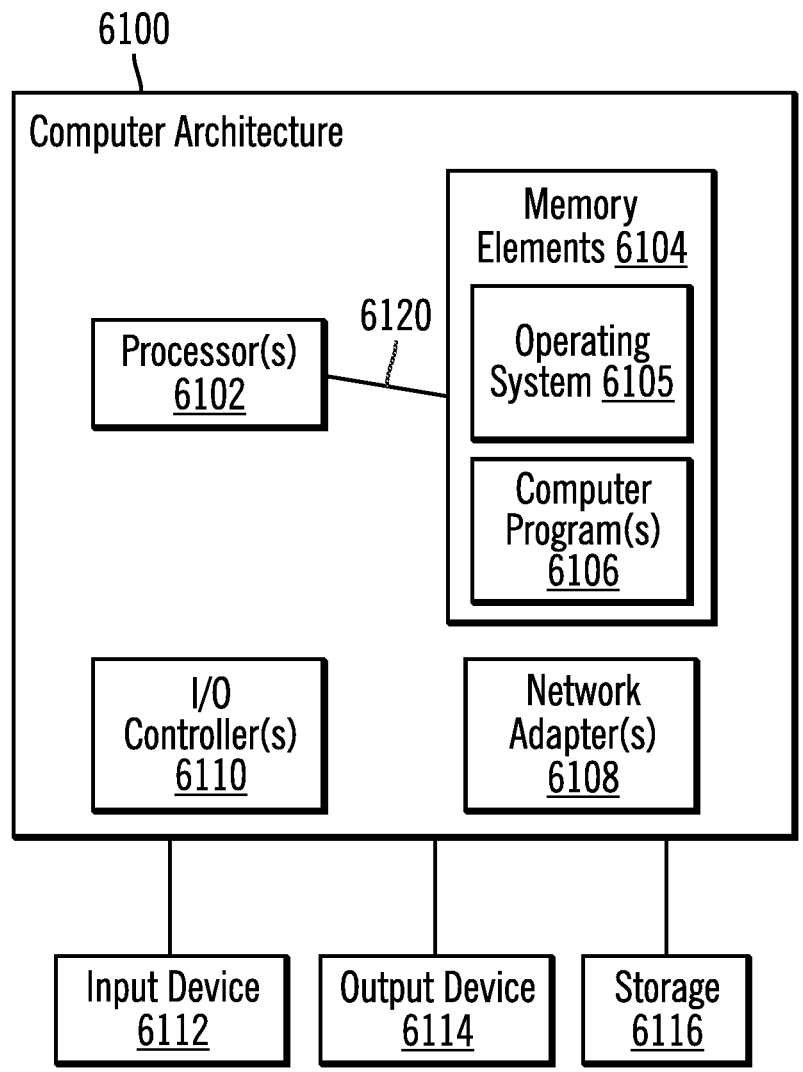
FIG. 61 illustrates, in a block diagram, a computer architecture that may be used in accordance with certain embodiments.

FIG. 61 illustrates a computer architecture 6100 that may be used in accordance with certain embodiments. Server system 100 and/or client system 150 may implement computer architecture 6100. The computer architecture 6100 is suitable for storing and/or executing program code and includes at least one processor 6102 coupled directly or indirectly to memory elements 6104 through a system bus 6120. The memory elements 6104 may include local memory employed during actual execution of the program code, bulk storage, and cache memories which provide temporary storage of at least some program code in order to reduce the number of times code must be retrieved from bulk storage during execution. The memory elements 6104 include an operating system 6105 and one or more computer programs 6106.

Input/Output (I/O) devices 6112, 6114 (including but not limited to keyboards, displays, pointing devices, etc.) may be coupled to the system either directly or through intervening I/O controllers 6110.

Network adapters 6108 may also be coupled to the system to enable the data processing system to become coupled to other data processing systems or remote printers or storage devices through intervening private or public networks. Modems, cable modem and Ethernet cards are just a few of the currently available types of network adapters 6108.

The computer architecture 6100 may be coupled to storage 6116 (e.g., any type of storage device; a non-volatile storage area, such as magnetic disk drives, optical disk drives, a tape drive, etc.). The storage 6116 may comprise an internal storage device or an attached or network accessible storage. Computer programs 6106 in storage 6116 may be loaded into the memory elements 6104 and executed by a processor 6102 in a manner known in the art.

The computer architecture 6100 may include fewer components than illustrated, additional components not illustrated herein, or some combination of the components illustrated and additional components. The computer architecture 6100 may comprise any computing device known in the art, such as a mainframe, server, personal computer, workstation, laptop, handheld computer, telephony device, network appliance, virtualization device, storage controller, etc.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The invention claimed is:

1. A method for providing notifications, comprising:
receiving, with a processor of a computer, a ticket from a stakeholder that specifies an activity to be performed, a location at which the activity is to be performed, and a period of time in which that activity is to occur
identifying a message to be delivered for display to the stakeholder based on the activity, the location, and the period of time, wherein the identified message is a safety message that describes a first safety measure to be taken before the activity occurs in the period of time, a second safety measure to be taken during the activity in the period of time, and a third safety measure to be taken in response to a problem occurring with the activity;
identifying a delivery option among delivery options including a just-in-time positive response message;
delivering the identified message to the stakeholder using the delivery option and describing the first safety measure to be taken by the stakeholder before the activity occurs in the period of time, the second safety measure to be taken by the stakeholder during the activity in the period of time, and the third safety measure to be taken in response to a problem occurring with the activity;
recording the delivery of the identified message;
receiving a request for information on the delivered message; and
responding to the request with information on the delivered message.

2. The method of claim 1, wherein the identified message to be delivered is identified based on any previously delivered messages and based on a schedule.

3. The method of claim 1,
wherein the information includes content of the identified message, identifies the stakeholder who received the identified message, and indicates when the stakeholder received the identified message.

4. The method of claim 1, further comprising:
determining that the message is to be delivered in response to one of determining that there has been a ticket entry action, a ticket update action, a ticket locate action, receipt of a positive response and based on a schedule.

5. The method of claim 1,
wherein the delivery option is one of delivery to a one-call gateway for a ticket entry action, a ticket update action, and a ticket locate action.

6. The method of claim 1,
wherein the just-in-time positive response message is sent when a positive response is received from an operator.

7. A computer program product for providing notifications, the computer program product comprising:
a non-transitory computer readable storage medium having computer readable program code embodied therein, the computer readable program code, when executed by a processor of a computer, is configured to perform:

receiving a ticket from a stakeholder that specifies an activity to be performed, a location at which the activity is to be performed, and a period of time in which that activity is to occur;

identifying a message to be delivered for display to the stakeholder based on the activity, the location, and the period of time, wherein the identified message is a safety message that describes a first safety measure to be taken before the activity occurs in the period of time, a second safety measure to be taken during the activity in the period of time, and a third safety measure to be taken in response to a problem occurring with the activity;

identifying a delivery option among delivery options including a just-in-time positive response message;

delivering the identified message to the stakeholder using the delivery option and describing the first safety measure to be taken by the stakeholder before the activity occurs in the period of time, the second safety measure to be taken by the stakeholder during the activity in the period of time, and the third safety measure to be taken in response to a problem occurring with the activity;

recording the delivery of the identified message;

receiving a request for information on the delivered message; and responding to the request with information on the delivered message.

8. The computer program product of claim 7, wherein the identified message to be delivered is identified based on any previously delivered messages and based on a schedule.

9. The computer program product of claim 7, wherein the information includes content of the identified message, identifies the stakeholder who received the identified message, and indicates when the stakeholder received the identified message.

10. The computer program product of claim 7, wherein the computer readable program code, when executed by the processor of the computer, is configured to perform:

determining that the message is to be delivered in response to one of determining that there has been a ticket entry action, a ticket update action, a ticket locate action, receipt of a positive response and based on a schedule.

11. The computer program product of claim 7, wherein the delivery option is one of delivery to a one-call gateway for a ticket entry action, a ticket update action, and a ticket locate action.

12. The computer program product of claim 7, wherein the just-in-time positive response message is sent when a positive response is received from an operator.

13. A computer system for providing notifications, comprising:

a processor; and a storage device coupled to the processor, wherein the storage device has stored thereon a program, and wherein the processor is configured to execute instructions of the program to perform operations, wherein the operations comprise:

receiving, with a processor of a computer, a ticket from a stakeholder that specifies an activity to be performed, a location at which the activity is to be performed, and a period of time in which that activity is to occur;

identifying a message to be delivered for display to the stakeholder based on the activity, the location, and the period of time, wherein the identified message is a safety message that describes a first safety measure to be taken before the activity occurs in the period of time, a second safety measure to be taken during the activity in the period of time, and a third safety measure to be taken in response to a problem occurring with the activity;

identifying a delivery option among delivery options including a just-in-time positive response message;

delivering the identified message to the stakeholder using the delivery option and describing the first safety measure to be taken by the stakeholder before the activity occurs in the period of time, the second safety measure to be taken by the stakeholder during the activity in the period of time, and the third safety measure to be taken in response to a problem occurring with the activity;

recording the delivery of the identified message;

receiving a request for information on the delivered message; and responding to the request with information on the delivered message.

14. The computer system of claim 13, wherein the identified message to be delivered is identified based on any previously delivered messages and based on a schedule.

15. The computer system of claim 13, wherein the information includes content of the identified message, identifies the stakeholder who received the identified message, and indicates when the stakeholder received the identified message.

16. The computer system of claim 13, further comprising:

determining that the message is to be delivered in response to one of determining that there has been a ticket entry action, a ticket update action, a ticket locate action, receipt of a positive response and based on a schedule.

17. The computer system of claim 13, wherein the delivery option is one of delivery to a one-call gateway for a ticket entry action, a ticket update action, and a ticket locate action.

18. The computer system of claim 13, wherein the just-in-time positive response message is sent when a positive response is received from an operator.

\* \* \* \* \*